US009028329B2

(12) United States Patent
Graham et al.

(10) Patent No.: US 9,028,329 B2
(45) Date of Patent: May 12, 2015

(54) INTEGRATING REMOTELY-HOSTED AND LOCALLY RENDERED CONTENT ON A GAMING DEVICE

(75) Inventors: Jacob Graham, Sparks, NV (US); Gregory A. Schlottmann, Sparks, NV (US); Steven G. LeMay, Reno, NV (US); Richard E. Rowe, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1377 days.

(21) Appl. No.: 11/827,060

(22) Filed: Jul. 9, 2007

(65) Prior Publication Data

US 2008/0009344 A1 Jan. 10, 2008

Related U.S. Application Data

(60) Provisional application No. 60/822,859, filed on Aug. 18, 2006.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ........... *G07F 17/32* (2013.01); *A63F 2300/534* (2013.01); *G07F 17/3223* (2013.01); *G07F 17/3239* (2013.01)

(58) Field of Classification Search

USPC ............. 463/29, 17, 16, 42; 700/45; 370/235, 370/395.21; 714/38

See application file for complete search history.

(56) References Cited

U.S. PATENT DOCUMENTS

| | | | |
|---|---|---|---|
| 3,708,219 A | 1/1973 | Forlini et al. | |
| 3,931,504 A | 1/1976 | Jacoby | |
| 4,333,715 A | 6/1982 | Brooks | |

(Continued)

FOREIGN PATENT DOCUMENTS

| | | | |
|---|---|---|---|
| AU | 1996 50576 | 4/1997 | |
| AU | 704691 | 4/1997 | ................ A63F 9/22 |

(Continued)

OTHER PUBLICATIONS

U.S. Office Action dated Apr. 15, 2011 issued in U.S. Appl. No. 11/595,774.

(Continued)

*Primary Examiner* — Steven J Hylinski

(74) *Attorney, Agent, or Firm* — Neal, Gerber & Eisenberg LLP

(57) ABSTRACT

A wager gaming machine may be configured not only to provide wagering games, but also to communicate with one or more hosts that can provide information and/or services pertaining to local wager gaming events, including but not limited to local tournaments, local restaurants, local messages (e.g., messages from other players in the gaming establishment), local social events, local sporting events, local dating opportunities, etc. Other hosts may provide information and/or services pertaining to business or finance (e.g., stock quotes), sports, news, weather, etc. Processes for conveying audio, video, etc., from host devices may be separate from processes used to control wager game presentations. At least some such processes may be able to output an associated "skin" on a video system of the wager gaming machine. These processes may involve providing one or more "widgets."

30 Claims, 24 Drawing Sheets

(56) References Cited

U.S. PATENT DOCUMENTS

| | | | | |
|---|---|---|---|---|
| 4,430,728 | A | 2/1984 | Beitel et al. | |
| 4,454,594 | A | 6/1984 | Heffron et al. | |
| 4,517,558 | A | 5/1985 | Davids | |
| 4,607,844 | A | 8/1986 | Fullerton | |
| 4,621,814 | A | 11/1986 | Stepan et al. | |
| 4,659,182 | A | 4/1987 | Aizawa | |
| 4,718,672 | A | 1/1988 | Okada | |
| 4,856,787 | A | 8/1989 | Itkis | |
| 4,911,449 | A | 3/1990 | Dickinson et al. | |
| 4,912,548 | A | 3/1990 | Shanker et al. | |
| 5,086,354 | A | 2/1992 | Bass et al. | |
| 5,113,272 | A | 5/1992 | Reamey | |
| 5,132,839 | A | 7/1992 | Travis | |
| 5,319,491 | A | 6/1994 | Selbrede | |
| 5,342,047 | A | 8/1994 | Heidel et al. | |
| 5,364,100 | A | 11/1994 | Ludlow et al. | |
| 5,375,830 | A | 12/1994 | Takemoto et al. | |
| 5,376,587 | A | 12/1994 | Buchmann et al. | |
| 5,393,061 | A | 2/1995 | Manship et al. | |
| 5,467,893 | A | 11/1995 | Landis, II et al. | |
| 5,539,547 | A | 7/1996 | Ishii et al. | |
| 5,580,055 | A | 12/1996 | Hagiwara | |
| 5,585,821 | A | 12/1996 | Ishikura et al. | |
| 5,589,980 | A | 12/1996 | Bass et al. | |
| 5,643,086 | A | 7/1997 | Alcorn et al. | |
| 5,655,961 | A | 8/1997 | Acres et al. | |
| 5,745,197 | A | 4/1998 | Leung et al. | |
| 5,752,881 | A | 5/1998 | Inoue | |
| 5,761,647 | A | 6/1998 | Boushy | |
| 5,764,317 | A | 6/1998 | Sadovnik et al. | |
| 5,851,149 | A | 12/1998 | Xidos et al. | |
| 5,910,046 | A | 6/1999 | Wada et al. | |
| 5,923,307 | A | 7/1999 | Hogle | |
| 5,951,397 | A | 9/1999 | Dickinson | |
| 5,956,180 | A | 9/1999 | Bass et al. | |
| 5,967,893 | A | 10/1999 | Lawrence et al. | |
| 6,001,016 | A | 12/1999 | Walker et al. | |
| 6,015,346 | A | 1/2000 | Bennett | |
| 6,027,115 | A | 2/2000 | Griswold et al. | |
| 6,050,895 | A | 4/2000 | Luciano et al. | |
| 6,054,969 | A | 4/2000 | Haisma | |
| 6,059,658 | A | 5/2000 | Mangano et al. | |
| 6,068,552 | A | 5/2000 | Walker et al. | |
| 6,089,975 | A * | 7/2000 | Dunn | 463/16 |
| 6,099,408 | A | 8/2000 | Schneier et al. | |
| 6,104,815 | A | 8/2000 | Alcorn et al. | |
| 6,106,396 | A | 8/2000 | Alcorn et al. | |
| 6,110,041 | A | 8/2000 | Walker et al. | |
| 6,113,495 | A | 9/2000 | Walker et al. | |
| 6,135,884 | A | 10/2000 | Hedrick et al. | |
| 6,149,522 | A | 11/2000 | Alcorn et al. | |
| 6,159,098 | A | 12/2000 | Slomiany et al. | |
| 6,190,256 | B1 | 2/2001 | Walker et al. | |
| 6,213,875 | B1 | 4/2001 | Suzuki | |
| 6,244,596 | B1 | 6/2001 | Kondratjuk | |
| 6,251,014 | B1 | 6/2001 | Stockdale et al. | |
| 6,252,707 | B1 | 6/2001 | Kleinberger et al. | |
| 6,253,374 | B1 | 6/2001 | Dresevic et al. | |
| 6,254,481 | B1 | 7/2001 | Jaffe | |
| 6,293,866 | B1 | 9/2001 | Walker et al. | |
| 6,315,666 | B1 | 11/2001 | Mastera et al. | |
| 6,337,513 | B1 | 1/2002 | Clevenger et al. | |
| 6,347,996 | B1 | 2/2002 | Gilmore et al. | |
| 6,368,216 | B1 | 4/2002 | Hedrick et al. | |
| 6,379,244 | B1 | 4/2002 | Sagawa et al. | |
| 6,398,220 | B1 | 6/2002 | Inoue | |
| 6,416,827 | B1 | 7/2002 | Chakrapani et al. | |
| 6,444,496 | B1 | 9/2002 | Edwards et al. | |
| 6,445,185 | B1 | 9/2002 | Damadian et al. | |
| 6,446,257 | B1 | 9/2002 | Pradhan et al. | |
| 6,449,687 | B1 | 9/2002 | Moriya | |
| 6,453,319 | B1 | 9/2002 | Mattis et al. | |
| 6,454,648 | B1 | 9/2002 | Kelly et al. | |
| 6,491,583 | B1 | 12/2002 | Gauselmann | |
| 6,503,147 | B1 | 1/2003 | Stockdale et al. | |
| 6,511,375 | B1 | 1/2003 | Kaminkow | |
| 6,512,559 | B1 | 1/2003 | Hashimoto et al. | |
| 6,514,141 | B1 | 2/2003 | Kaminkow et al. | |
| 6,517,433 | B2 | 2/2003 | Loose et al. | |
| 6,517,437 | B1 | 2/2003 | Wells et al. | |
| 6,547,664 | B2 | 4/2003 | Saunders | |
| 6,575,541 | B1 | 6/2003 | Hedrick et al. | |
| 6,585,591 | B1 | 7/2003 | Baerlocher et al. | |
| 6,620,047 | B1 | 9/2003 | Alcorn et al. | |
| D480,961 | S | 10/2003 | Deadman | |
| 6,645,077 | B2 | 11/2003 | Rowe | |
| 6,646,695 | B1 | 11/2003 | Gauselmann | |
| 6,652,378 | B2 | 11/2003 | Cannon et al. | |
| 6,659,864 | B2 | 12/2003 | McGahn et al. | |
| 6,661,425 | B1 | 12/2003 | Hiroaki | |
| 6,695,703 | B1 | 2/2004 | McGahn | |
| 6,702,675 | B2 | 3/2004 | Poole et al. | |
| 6,712,694 | B1 | 3/2004 | Nordman | |
| 6,715,756 | B2 | 4/2004 | Inoue | |
| 6,717,728 | B2 | 4/2004 | Putilin | |
| 6,722,979 | B2 | 4/2004 | Gilmore et al. | |
| 6,802,777 | B2 | 10/2004 | Seelig et al. | |
| 6,804,763 | B1 | 10/2004 | Stockdale et al. | |
| 6,811,486 | B1 | 11/2004 | Luciano et al. | |
| 6,817,945 | B2 | 11/2004 | Seelig et al. | |
| 6,817,946 | B2 | 11/2004 | Motegi et al. | |
| 6,887,157 | B2 | 5/2005 | LeMay et al. | |
| 6,890,259 | B2 | 5/2005 | Breckner et al. | |
| 6,906,762 | B1 | 6/2005 | Witehira et al. | |
| 6,937,298 | B2 | 8/2005 | Okada | |
| 6,969,319 | B2 | 11/2005 | Rowe et al. | |
| 7,022,017 | B1 | 4/2006 | Halbritter et al. | |
| 7,095,180 | B2 | 8/2006 | Emslie et al. | |
| 7,097,560 | B2 | 8/2006 | Okada | |
| 7,128,647 | B2 | 10/2006 | Muir et al. | |
| 7,159,865 | B2 | 1/2007 | Okada | |
| 7,160,187 | B2 | 1/2007 | Loose et al. | |
| 7,198,571 | B2 | 4/2007 | LeMay et al. | |
| 7,204,753 | B2 | 4/2007 | Ozaki et al. | |
| 7,207,883 | B2 | 4/2007 | Nozaki et al. | |
| 7,220,181 | B2 | 5/2007 | Okada | |
| 7,252,288 | B2 | 8/2007 | Seelig et al. | |
| 7,255,643 | B2 | 8/2007 | Ozaki et al. | |
| 7,309,284 | B2 | 12/2007 | Griswold et al. | |
| 7,322,884 | B2 | 1/2008 | Emori et al. | |
| 7,329,181 | B2 | 2/2008 | Hoshino et al. | |
| 7,618,319 | B2 | 11/2009 | Casey | |
| 7,619,585 | B2 | 11/2009 | Bell et al. | |
| 7,730,413 | B1 | 6/2010 | Engel et al. | |
| 7,819,747 | B2 * | 10/2010 | Kane et al. | 463/29 |
| 7,918,734 | B2 * | 4/2011 | Gould | 463/42 |
| 7,959,502 | B2 * | 6/2011 | Kane et al. | 463/17 |
| 8,029,351 | B2 | 10/2011 | Kosaka et al. | |
| 8,131,649 | B2 | 3/2012 | Yen et al. | |
| 2001/0013681 | A1 | 8/2001 | Bruzzese et al. | |
| 2001/0029528 | A1 | 10/2001 | Coutts et al. | |
| 2002/0045472 | A1 | 4/2002 | Adams et al. | |
| 2002/0142825 | A1 | 10/2002 | Lark et al. | |
| 2002/0142846 | A1 | 10/2002 | Paulsen | |
| 2002/0173354 | A1 | 11/2002 | Winans et al. | |
| 2002/0183105 | A1 | 12/2002 | Cannon et al. | |
| 2002/0194505 | A1 | 12/2002 | Muschenborn | |
| 2003/0018403 | A1 * | 1/2003 | Braun et al. | 700/45 |
| 2003/0027624 | A1 | 2/2003 | Gilmore et al. | |
| 2003/0032478 | A1 | 2/2003 | Takahama et al. | |
| 2003/0032479 | A1 | 2/2003 | LeMay et al. | |
| 2003/0064771 | A1 | 4/2003 | Morrow et al. | |
| 2003/0064801 | A1 | 4/2003 | Breckner | |
| 2003/0069074 | A1 | 4/2003 | Jackson | |
| 2003/0078103 | A1 | 4/2003 | LeMay et al. | |
| 2003/0083943 | A1 | 5/2003 | Adams et al. | |
| 2003/0087690 | A1 | 5/2003 | Loose et al. | |
| 2003/0130028 | A1 | 7/2003 | Aida et al. | |
| 2003/0162582 | A1 | 8/2003 | Gordon | |
| 2003/0176214 | A1 | 9/2003 | Burak et al. | |
| 2003/0176218 | A1 | 9/2003 | LeMay et al. | |
| 2003/0216961 | A1 | 11/2003 | Barry | |
| 2003/0222876 | A1 | 12/2003 | Giemborek et al. | |
| 2003/0236114 | A1 | 12/2003 | Griswold et al. | |

(56) References Cited

U.S. PATENT DOCUMENTS

2004/0009813 A1 1/2004 Wind
2004/0023714 A1 2/2004 Asdale
2004/0029636 A1 2/2004 Wells
2004/0048671 A1 3/2004 Rowe
2004/0063490 A1 4/2004 Okada
2004/0066475 A1 4/2004 Searle
2004/0087360 A1 5/2004 Chamberlain et al.
2004/0103444 A1 5/2004 Weinberg et al.
2004/0110557 A1 6/2004 Rowe
2004/0116178 A1 6/2004 Okada
2004/0117484 A1 6/2004 Singer et al.
2004/0127284 A1 7/2004 Walker et al.
2004/0147303 A1 7/2004 Imura et al.
2004/0150162 A1 8/2004 Okada
2004/0162146 A1 8/2004 Ooto
2004/0166925 A1 8/2004 Emori et al.
2004/0171419 A1 9/2004 Walker et al.
2004/0171423 A1 9/2004 Silva et al.
2004/0180712 A1 9/2004 Forman et al.
2004/0180721 A1 9/2004 Rowe
2004/0183972 A1 9/2004 Bell
2004/0192430 A1 9/2004 Burak et al.
2004/0198485 A1 10/2004 Loose
2004/0207154 A1 10/2004 Okada
2004/0208126 A1* 10/2004 Wassew et al. ............... 370/235
2004/0209666 A1 10/2004 Okada
2004/0209667 A1 10/2004 Emori et al.
2004/0209668 A1 10/2004 Okada
2004/0209671 A1 10/2004 Okada
2004/0209678 A1 10/2004 Okada
2004/0209683 A1 10/2004 Okada
2004/0214622 A1* 10/2004 Atkinson .......................... 463/1
2004/0214635 A1 10/2004 Okada
2004/0214637 A1 10/2004 Nonaka
2004/0219968 A1 11/2004 Fiden et al.
2004/0224747 A1 11/2004 Okada
2004/0233663 A1 11/2004 Emslie et al.
2004/0239582 A1 12/2004 Seymour
2004/0254010 A1 12/2004 Fine
2005/0020348 A1 1/2005 Thomas et al.
2005/0020358 A1 1/2005 Cram
2005/0032571 A1 2/2005 Asonuma
2005/0037843 A1 2/2005 Wells et al.
2005/0043086 A1 2/2005 Schneider
2005/0049032 A1 3/2005 Kobayashi
2005/0049046 A1 3/2005 Kobayashi
2005/0059494 A1 3/2005 Kammler
2005/0062410 A1 3/2005 Bell et al.
2005/0063055 A1 3/2005 Engel
2005/0079913 A1 4/2005 Inamura
2005/0085292 A1 4/2005 Inamura
2005/0119052 A1 6/2005 Russell et al.
2005/0125660 A1 6/2005 Raciborski
2005/0153772 A1 7/2005 Griswold et al.
2005/0153775 A1 7/2005 Griswold et al.
2005/0153776 A1 7/2005 LeMay et al.
2005/0164762 A1 7/2005 Smith et al.
2005/0192090 A1 9/2005 Muir et al.
2005/0193269 A1* 9/2005 Haswell et al. ................. 714/38
2005/0206582 A1 9/2005 Bell et al.
2005/0208994 A1 9/2005 Berman
2005/0215311 A1 9/2005 Hornik et al.
2005/0233799 A1 10/2005 LeMay et al.
2005/0239539 A1 10/2005 Inamura
2005/0266912 A1 12/2005 Sekiguchi
2005/0282638 A1 12/2005 Rowe
2005/0285337 A1 12/2005 Durham et al.
2006/0009273 A2 1/2006 Moshal
2006/0019747 A1 1/2006 Loose et al.
2006/0041586 A1 2/2006 Nassef, Jr.
2006/0063581 A1 3/2006 Harris et al.
2006/0068898 A1 3/2006 Maya
2006/0079333 A1 4/2006 Morrow et al.
2006/0089194 A1 4/2006 Joshi et al.
2006/0094508 A1 5/2006 D'Amico et al.
2006/0100014 A1 5/2006 Griswold et al.
2006/0103951 A1 5/2006 Bell et al.
2006/0105837 A1 5/2006 Walker et al.
2006/0105841 A1 5/2006 Rom et al.
2006/0125745 A1 6/2006 Evanicky
2006/0128470 A1* 6/2006 Willis et al. ..................... 463/42
2006/0135255 A1 6/2006 Roth
2006/0143085 A1 6/2006 Adams et al.
2006/0154729 A1 7/2006 LeMay et al.
2006/0166727 A1 7/2006 Burak
2006/0184626 A1 8/2006 Agapi et al.
2006/0190482 A1 8/2006 Kishan et al.
2006/0191177 A1 8/2006 Engel
2006/0217202 A1 9/2006 Burke et al.
2006/0264256 A1 11/2006 Gagner et al.
2006/0264257 A1 11/2006 Jaffe et al.
2006/0282855 A1 12/2006 Margulis
2006/0284574 A1 12/2006 Emslie et al.
2006/0287035 A1 12/2006 Walker et al.
2006/0290594 A1 12/2006 Engel et al.
2007/0004510 A1 1/2007 Underdahl et al.
2007/0004513 A1 1/2007 Wells et al.
2007/0010315 A1 1/2007 Hein
2007/0015569 A1 1/2007 Norton et al.
2007/0024002 A1 2/2007 McMain et al.
2007/0032288 A1 2/2007 Nelson et al.
2007/0043616 A1 2/2007 Kutaragi et al.
2007/0060317 A1 3/2007 Martin
2007/0180400 A1 8/2007 Zotov et al.
2007/0243925 A1 10/2007 LeMay et al.
2007/0243928 A1 10/2007 Iddings
2007/0243934 A1 10/2007 Little et al.
2008/0008188 A1* 1/2008 Buga et al. ............... 370/395.21
2008/0020816 A1 1/2008 Griswold et al.
2008/0020839 A1 1/2008 Wells et al.
2008/0020840 A1 1/2008 Wells et al.
2008/0020841 A1 1/2008 Wells et al.
2008/0076574 A1 3/2008 Okada
2008/0096655 A1 4/2008 Rasmussen et al.
2008/0113747 A1 5/2008 Williams et al.
2008/0125219 A1 5/2008 Williams et al.
2008/0200233 A1* 8/2008 Aida ............................... 463/20
2008/0318655 A1* 12/2008 Davies ............................ 463/16
2009/0098943 A1 4/2009 Weber et al.
2009/0104954 A1 4/2009 Weber et al.
2009/0156303 A1 6/2009 Kiely et al.
2009/0197684 A1* 8/2009 Arezina et al. .................. 463/42
2009/0209350 A1 8/2009 Kelly et al.
2009/0233705 A1 9/2009 LeMay et al.
2010/0105454 A1 4/2010 Weber et al.
2010/0190553 A1 7/2010 Buchholz et al.
2011/0003642 A1 1/2011 Russell et al.

FOREIGN PATENT DOCUMENTS

AU 775882 B2 8/2004
EP 0 454 423 10/1991
EP 0 484 103 5/1992
EP 0 769 769 4/1997 .............. G07F 17/32
EP 0 997 857 10/1999
EP 1 195 184 4/2002
EP 1 255 234 A2 11/2002 .............. G07F 17/32
EP 1 260 928 11/2002
EP 1 282 088 2/2003
EP 1 462 152 9/2004
EP 1 492 063 12/2004
EP 1 524 617 4/2005
GB 1 464 896 2/1977
GB 2 120 506 11/1983
JP 2004-220276 8/1992
JP 06-043425 2/1994
JP 2006-043425 2/1994
JP 07-124290 5/1995
JP 2007-124290 5/1995
JP 2000-300729 10/2000
JP 2000-350805 12/2000
JP 2001-062032 3/2001
JP 2001-238995 9/2001
JP 2001-252393 9/2001

(56) References Cited

FOREIGN PATENT DOCUMENTS

| | | | |
|---|---|---|---|
| JP | 2001-252394 | 9/2001 | |
| JP | 2002-085624 | 3/2002 | |
| JP | 2004-089707 | 3/2004 | |
| JP | 2004-105616 | 4/2004 | |
| JP | 2004-166879 | 6/2004 | |
| JP | 2005-253561 | 9/2005 | |
| JP | 2005-266387 | 9/2005 | |
| JP | 2005-266388 | 9/2005 | |
| JP | 2005-274906 | 10/2005 | |
| JP | 2005-274907 | 10/2005 | |
| JP | 2005-283864 | 10/2005 | |
| JP | 2006-346226 | 12/2006 | |
| WO | WO 98/52665 | 11/1998 | |
| WO | WO99-42889 | 8/1999 | |
| WO | WO99-44095 | 9/1999 | |
| WO | WO01-15127 | 3/2001 | |
| WO | WO01-15128 | 3/2001 | |
| WO | WO01-15132 | 3/2001 | |
| WO | WO01-09664 | 8/2001 | |
| WO | WO 02/073501 | 9/2002 | ............. G06F 19/00 |
| WO | WO03-023647 | 3/2003 | |
| WO | WO03-039699 | 5/2003 | |
| WO | WO2004-001486 | 12/2003 | |
| WO | WO2004-102520 | 11/2004 | |
| WO | WO 2006/033986 | 3/2006 | |
| WO | WO2006-034192 | 3/2006 | |
| WO | WO2006-038819 | 4/2006 | |
| WO | WO2006-039132 | 4/2006 | |
| WO | WO2007-032916 | 3/2007 | |
| WO | WO 2007/040413 | 4/2007 | |
| WO | WO 2007/075278 | 7/2007 | |
| WO | WO2007-120444 | 10/2007 | |
| WO | WO2007-120450 | 10/2007 | |
| WO | WO 2008/056844 | 5/2008 | |
| WO | WO2008-061068 | 5/2008 | |
| WO | WO2009-009269 | 1/2009 | |
| WO | WO2009-036445 | 3/2009 | |
| WO | WO2009-140096 | 5/2009 | |
| WO | WO 2009/143274 | 11/2009 | |
| WO | WO 2010/056418 | 5/2010 | |
| WO | WO 2010/120451 | 10/2010 | |

OTHER PUBLICATIONS

U.S. Office Action dated Aug. 3, 2011 issued in U.S. Appl. No. 12/426,165.

U.S. Office Action dated Jun. 24, 2011 issued in U.S. Appl. No. 12/209,608.

U.S. Office Action dated Jul. 26, 2011 issued in U.S. Appl. No. 12/271,884.

U.S. Office Action dated Jan. 20, 2011 issued in U.S. Appl. No. 11/983,770.

U.S. Office Action Final dated May 16, 2011 issued in U.S. Appl. No. 11/983,770.

U.S. Office Action Final dated Apr. 14, 2011 issued in U.S. Appl. No. 11/595,798.

U.S. Office Action Supplemental dated Apr. 29, 2011 issued in U.S. Appl. No. 11/595,798.

PCT International Preliminary Report on Patentability and Written Opinion dated Oct. 14, 2008 issued in PCT/US2007/007617.

Australian Examiner's First Report dated May 25, 2011 issued in AU 2007239023.

Chinese First Office Action dated May 18, 2010 issued in CN 200780021740.1.

PCT International Search Report dated Aug. 3, 2010 issued in PCT/US2010/028368 (WO 2010/120451).

PCT International Preliminary Report on Patentability and Written Opinion dated Mar. 16, 2010 issued in PCT/US2008/076428 (WO 2009/036445).

PCT International Preliminary Report on Patentability and Written Opinion dated May 17, 2011 issued in PCT/US2009/057551.

PCT International Preliminary Report on Patentability and Written Opinion dated May 12, 2009 issued in PCT/US2007/084459 (WO 2008/061068).

Australian Examiner's first report dated Jul. 7, 2011 issued in AU 2007319331.

PCT International Preliminary Report on Patentability and Written Opinion dated Nov. 25, 2010 issued in PCT/US2009/042741.

PCT International Search Report dated Jul. 24, 2009 issued in PCT/US2009/044716.

PCT International Preliminary Report on Patentability and Written Opinion dated Dec. 2, 2010 issued in PCT/US2009/044716.

PCT International Preliminary Report on Patentability and Written Opinion dated Oct. 14, 2008 issued in PCT/US2007/007857 (WO 2007/120450).

Australian Examiner's first report dated May 25, 2011 issued in AU 2007239029.

Chinese First Office Action dated Mar. 25, 2010 issued in CN 200780021699.8.

Chinese Second Office Action dated Aug. 24, 2010 issued in CN 200780021699.8.

Chinese Third Office Action dated Dec. 3, 2010 issued in CN 200780021699.8.

Chinese Fourth Office Action dated Feb. 23, 2011 issued in CN 200780021699.8.

Chinese Fifth Office Action dated May 25, 2011 issued in CN 200780021699.8.

PCT International Preliminary Report on Patentability and Written Opinion dated Jan. 12, 2010 issued in PCT/US2008/067543.

PCT International Search Report and Written Opinion dated Dec. 4, 2009 issued in PCT/US2009/057551.

European Examination Report dated Oct. 28, 2009 issued in EP07845059.0.

PCT International Search Report and Written Opinion dated May 2, 2008 issued in PCT/US2007/084459 (WO2008-061068).

International Search Report mailed Sep. 21, 2007 from International Application No. PCT/US2007/007617, including Notification of Transmittal, 5 pp.

Written Opinion of the International Searching Authority mailed Sep. 21, 2007 from International Application No. PCT/US2007/007617, 8 pp.

International Search Report mailed Sep. 21, 2007 from International Application No. PCT/US2007/007857, including Notification of Transmittal, 5 pp.

Written Opinion of the International Searching Authority mailed Sep. 21, 2007 from International Application No. PCT/US2007/007857, 7 pp.

U.S. Office Action dated Feb. 10, 2009 issued in U.S. Appl. No. 11/595,774.

U.S. Examiner Interview Summary dated May 22, 2009 issued in U.S. Appl. No. 11/595,774.

U.S. Office Action Final dated Aug. 26, 2009 issued in U.S. Appl. No.

U.S. Office Action—Supplemental Final dated Sep. 16, 2009 issued in U.S. Appl. No. 11/595,774.

U.S. Office Action dated Jun. 19, 2009 issued in U.S. Appl. No. 11/682,253.

U.S. Examiner Interview Summary dated Aug. 14, 2009 issued in U.S. Appl. No. 11/682,253.

U.S. Office Action Final dated Nov. 30, 2009 issued in U.S. Appl. No. 11/682,253.

U.S. Office Action dated Sep. 30, 2011 issued in U.S. Appl. No. 12/435,962.

U.S. Office Action Final dated Oct. 14, 2011 issued in U.S. Appl. No. 11/595,798.

European Examination Report dated Apr. 20, 2009 issued in EP 07754175.3; 6 pgs.

PCT International Search Report and Written Opinion dated Dec. 11, 2008 issued in PCT/US2008/076428, 8 pgs. (W02009-036445).

PCT International Search Report and Written Opinion dated Sep. 8, 2009 issued in PCT/US2009/042741.

Chinese Sixth Office Action dated Dec. 7, 2011 issued in CN 200780021699.8.

European Examination Report dated Apr. 20, 2009 from EP0 7754383.3, 7 pgs.

"Light Valve". Retrieved from the internet URL http://www.meko.co.uk/lightvalve.shtml [retrieved on Nov. 15, 2005, 1 page.

(56) References Cited

OTHER PUBLICATIONS

"Liquid Crystal Display". Retrieved from the internet URL http://en.wikipedia.org/wiki/LCD [retrieved on Nov. 16, 2005, 6 pages.
Bonsor, Kevin, "How Smart Windows Will Work," Howstuffworks, Inc. 1998-2002, http://www.howstuffworks.com/smart-window.htm/printable Printed Nov. 25, 2002 (5 pages).
"What is SPD?" SPD Systems, Inc. 2002, http://www.spd-systems.com/spdq.htm. Printed Dec. 4, 2002 (2 pages).
"Debut of Let's Make a Deal Slot Machine," Let's Make a Deal 1999-2002, http://www.letsmakeadeal.com/pr01.htm. Printed Dec. 3, 2002 (2 pages).
Living in a flat world? Advertisement written by Deep Video Imaging Ltd., published 2000.
Novel 3-D Video Display Technology Developed, News release: Aug. 30, 1996, www.eurekalert.org/summaries/1199.html, printed from Internet Archive using date Sep. 2, 2000.
Time Multiplexed Optical Shutter (TMOS): A Revolutionary Flat Screen Display Technology, http://web.archive.org/web/19991006064049/http://www.vea.com/TMOS.html, Apr. 8, 1999, printed from Internet on Oct. 6, 1999.
Time Multiplexed Optical Shutter (TMOS): A Revolutionary Flat Screen Display Technology, http://web.archive.org/web/20010814143641/www.tralas.com/TMOS.html, printed from internet on Apr. 11, 2001.
Bosner, "How Smart Windows Work," HowStuffWorks, Inc., www.howstuffworks.com, 1998-2004, 9 pages.
Saxe et al., "Suspended-Particle Devices," www.refr-spd.com, Apr./May 1996, 5 pages.
"SPD," Malvino Inc., www.malvino.com, Jul. 19, 1999, 10 pages.
U.S. Office Action Final dated Oct. 14, 2011 issued in U.S. Appl. No. 11/595,774.
U.S. Office Action Final dated Feb. 17, 2012 issued in U.S. Appl. No. 12/426,165.
U.S. Office Action dated Jan. 26, 2012 issued in U.S. Appl. No. 11/682,253.
U.S. Office Action Final dated Jul. 17, 2012 issued in U.S. Appl. No. 11/682,253.
U.S. Office Action Final dated Mar. 16, 2012 issued in U.S. Appl. No. 12/209,608.
U.S. Office Action Final dated Apr. 27, 2012 issued in U.S. Appl. No. 12/271,884.
U.S. Office Action dated Feb. 15, 2012 issued in U.S. Appl. No. 12/120,191.
U.S. Office Action Final dated Jun. 7, 2012 issued in U.S. Appl. No. 12/120,191.
U.S. Office Action Final dated Apr. 16, 2012 issued in U.S. Appl. No. 12/435,962.
U.S. Office Action dated Feb. 12, 2009 issued in U.S. Appl. No. 11/595,798.
U.S. Examiner Interview Summary dated May 22, 2009 issued in U.S. Appl. No. 11/595,798.
U.S. Office Action Final dated Sep. 24, 2009 issued in U.S. Appl. No. 11/595,798.
Australian Patent Examination Report No. 2 dated Jun. 20, 2012 issued in AU 2007239023.
Chinese Second Office Action dated Nov. 16, 2011 issued in CN 200780021740.1.
Chinese Third Office Action dated Apr. 17, 2012 issued in CN 200780021740.1.
Chinese Fourth Office Action dated Sep. 13, 2012 issued in CN 200780021740.1.
PCT International Preliminary Report on Patentability and Written Opinion dated Oct. 27, 2011 issued in PCT/US2010/028368 [WO 2010/120451].
Australian Patent Examination Report No. 1 dated Jul. 11, 2012 issued in AU 2008298501.
Australian Notice of Acceptance and Allowed Claims dated Aug. 20, 2012 issued in AU 2007319331.
Great Britain Examination Report dated Feb. 15, 2012 issued in GB1020135.8.
Great Britain Examination Report dated Oct. 18, 2012 issued in GB1020135.8.
Australian Patent Examination Report No. 2 dated Jun. 20, 2012 issued in AU 2007239029.
PCT International Search Report and Written Opinion dated Sep. 26, 2008 issued in PCT/US2008/067543.
Australian Examiner's First Report dated May 25, 2012 issued in AU 2008275477.
United Kingdom Examination Report dated Sep. 14, 2012 issued in GB 0916718.0.
Miser, Brad, "Using Mac OS 8.5," (Nov. 1998) Que Publishing accessed at <http://www.netlibrary.com/nlreader.dll?bookid=8218&filename=Page_ii.html>, 29 pp.
Regulation 14 of Regulations of the Nevada Gaming Commission and State Gaming Control Board, Regulation 14.230 adopted 7/89, Nevada Gaming Commission and State Gaming Control Board, 15 pp.
Non-Final Office Action for U.S. Appl. No. 12/426,165 dated Oct. 24, 2013.
Non-Final Office Action for U.S. Appl. No. 11/595,798 dated Sep. 19, 2013.
Non-Final Office Action for U.S. Appl. No. 11/595,774 dated Sep. 18, 2013.
Office Action for Chinese Application No. 201080027463.7 (and it's English translation), mail date Jul. 10, 2013, 16 pps.

* cited by examiner

INTEGRATING REMOTELY-HOSTED AND LOCALLY RENDERED CONTENT ON A GAMING DEVICE

CROSS-REFERENCE TO RELATED APPLICATIONS

This application claims priority to U.S. Provisional Patent Application No. 60/822,859, filed Aug. 18, 2006, naming Little, et al., as inventors, and titled "Remote Content Management and Resource Sharing on a Gaming Machine and Method of Implementing Same," which is incorporated herein by reference and for all purposes.

This application is related to U.S. patent application Ser. No. 11/595,774, entitled "Method and Apparatus for Integrating Remotely-Hosted and Locally Rendered Content on a Gaming Device" and filed on Nov. 10, 2006, which claims priority under 35 U.S.C. §119(e) from U.S. Provisional Patent Application No. 60/792,082, filed Apr. 13, 2006, naming Little, et al., as inventors, and titled "Remote Content Management and Resource Sharing on a Gaming Machine," and from U.S. Provisional Patent Application No. 60/822,859, filed Aug. 18, 2006, naming Little, et al., as inventors, and titled "Remote Content Management and Resource Sharing on a Gaming Machine and Method of Implementing Same," each of which is incorporated herein by reference and for all purposes.

This application is also related to co-pending U.S. patent application Ser. No. 11/595,798, filed on Nov. 10, 2006, naming Little, et al. as inventors, and titled, "Remote Content Management and Resource Sharing on a Gaming Machine and Method of Implementing Same," which is also incorporated herein by reference and for all purposes.

COPYRIGHT NOTICE

A portion of the invention of this patent document contains or may contain material which is subject to copyright protection. The copyright owner has no objection to the photocopy reproduction by anyone of the patent document or the patent invention in exactly the form it appears in the Patent and Trademark Office patent file or records, but otherwise reserves all copyright rights whatsoever.

TECHNICAL FIELD

The present invention relates generally to gaming devices and systems, and more specifically to remote content management on a gaming machine.

BACKGROUND

Casinos and other forms of gaming comprise a growing multi-billion dollar industry both domestically and abroad, with electronic and microprocessor based gaming machines being more popular than ever. A gaming entity that provides gaming services may control gaming devices that are globally distributed in many different types of establishments. For example, gaming machines may be placed in casinos, convenience stores, racetracks, supermarkets, bars and boats. Further, via a remote server, a gaming entity may provide gaming services in locale of a user's choosing, such as on a home computer or on a mobile device carried by the user.

Electronic and microprocessor based gaming machines can include various hardware and software components to provide a wide variety of game types and game playing capabilities, with such hardware and software components being generally well known in the art. For example, bill validators, coin acceptors, card readers, keypads, buttons, levers, touch screens, displays, coin hoppers, player tracking units and the like are examples of hardware that can be coupled to a gaming machine. Software components can include, for example, boot and initialization routines, various game play programs and subroutines, credit and payout routines, image and audio generation programs, security monitoring programs, authentication programs and a random number generator, among others.

The functions available on a gaming machine may depend on whether the gaming machine is linked to other gaming devices. For instance, when configured for communication with other gaming devices, a gaming machine may provide progressive jackpots, player tracking and loyalty points programs, cashless gaming, and bonusing among other items. Many of these added components, features and programs can involve the implementation of various back-end and/or networked systems, including more hardware and software elements, as is generally known.

In a typical casino-based electronic gaming machine, such as a slot machine, video poker machine, video keno machine or the like, a game play is initiated through a wager of money or credit, whereupon the gaming machine determines a game outcome, presents the game outcome to the player and then potentially dispenses an award of some type, including a monetary award, depending upon the game outcome. In this instance, the gaming machine is operable to receive, store and dispense indicia of credit or cash as well as calculate a gaming outcome that could result in a large monetary award. The gaming machine is enabled to operate in this manner because it is placed typically in a location that is monitored (e.g., a casino), the gaming machine hardware and software components are secured within a locked cabinet and the gaming machine includes a security system for detecting fraud or theft attempts.

Because gaming machines can be operable to accept, store, dispense and/or award large sums of money, gaming machines are often the targets of theft attempts. Thus, besides including a security system, gaming software and gaming hardware are designed and/or selected to resist theft attempts and include many security features not present in personal computers or other gaming platforms. For example, a hardware-based security method for preventing illegal software modification is to store gaming software on an unalterable memory, such as an on EPROM, a read-only CD/DVD optical disc or a read-only disk memory with write capability disabled. As another example, a software-based security method for preventing/detecting illegal software modifications is to execute authentication routines that compare information stored and programs executed on the gaming machine against known and trusted information. The trusted information and authentication routines can be stored in a trusted memory location such as a verified EPROM on the gaming machine.

One advantage of utilizing the hardware and software based security methods described above is that the potential for fraud and theft is greatly reduced. Further, for gaming software approved by a gaming regulator to ensure fairness, another advantage is that the hardware and software based security methods can be used to detect any subsequent modifications to the gaming software that might put a player at an unfair disadvantage. One disadvantage of the security methods described above is that the ability to later alter or expand gaming software to add additional features or correct errors is somewhat limited. For instance, for gaming machines that utilize EPROM's to store executable gaming software, the EPROM has to be physically replaced in the gaming machine to alter the gaming software.

A gaming entity may provide gaming services to tens of thousands of users. For instance, a single land-based casino may include thousands of gaming machines. Players' gaming interests are constantly changing. The ability of a casino operator to maximize their operating profits and keep their customers happy is directly linked to their ability to provide a stimulating and exciting gaming experience. However, it can be challenging and expensive to provide new presentations and/or content in the context of prior art wager gaming devices.

SUMMARY

Various methods and devices are provided herein for improving the state of the prior art. According to some embodiments of the invention, a wager gaming machine may be configured not only to provide wagering games, but also to communicate with one or more hosts that can provide information and/or services. The hosts may comprise one or more devices, including but not limited to servers, storage devices, personal computers, etc.

The hosts may be local hosts or remote hosts, either of which may or may not be associated with the gaming establishment within which the wager gaming machine is located. Accordingly, the information and/or services provided by the hosts may or may not involve wager gaming, the gaming establishment or the local area. For example, some hosts may provide information and/or services pertaining to local wager gaming events, including but not limited to local tournaments, local restaurants, local messages (e.g., messages from other players in the gaming establishment), local social events, local sporting events, local dating opportunities, etc. Other hosts may provide information and/or services pertaining to business or finance (e.g., stock quotes), sports, news, weather, etc.

According to some preferred implementations of the invention, processes for conveying audio, video, etc., from host devices may be separate from processes used to control wager game presentations. For example, some processes may be operable to output video images and/or audio data via a wager gaming machine. Such processes may be controlled (at least in part) by a host, according to instructions, data or combinations thereof. At least some such processes may be able to output an associated "skin" on a video system of the wager gaming machine. These processes may involve providing one or more "widgets," as described in detail below.

One or more other processes may be operable to generate outcomes for wager-based games, to output game play video and/or audio images related to the play of the wager-based games, etc. In some preferred implementations, at least a threshold level of one or more wager gaming machine resources (e.g., CPU usage, memory usage, graphics processing usage, network bandwidth usage, sound card usage, video card usage, power usage and/or peripheral device usage) will be made available to wager game presentations and related functions.

In some implementations, widgets may be presented in the same display device used for wager game presentations. If so, there may or may not be predetermined areas of the display device within which a widget may be displayed. In alternative implementations, widgets may be presented in a display device not used for wager game presentations. For example, widgets may be provided in a display device (sometimes referred to herein as a "virtual glass" or the like) used for presenting a game theme "skin." Widgets may also be presented in a display device used for implementing, at least in part, a player loyalty system.

Some preferred implementations allow a player to choose and/or customize widgets. In some such implementations, a player may select from among a plurality of widgets and indicate the widget(s) to be activated during wager gaming sessions. The player may be able to customize the selected widget(s) according to desired content, skin appearance, etc. Such preference data may, for example, be associated with a player's player loyalty account and stored in a storage device. A gaming device, such as a wager gaming machine, may be configured to receive player loyalty account information, e.g., via a player loyalty card reader, an input device, etc.

Some embodiments of the invention provide a wager gaming machine, comprising: a video system comprising at least one display device; an interface system comprising at least one interface configured for communicating with remote hosts, the remote hosts including at least one content provider; a credit input mechanism for receiving indicia of credit for making wagers on a wager-based game; a credit output mechanism for outputting indicia of credit; a memory system comprising a random access memory; and a logic system.

The logic system may comprise at least one processor, programmable logic device, etc. The logic system may be configured to perform the following tasks: control a wager-based game played on the wager gaming machine; communicate with a remote host via the interface system; execute a first process operable to output first video images to the video system. Content of the first video images may be, e.g., controlled by a remote host. The first process may be further operable to output a first skin on the video system associated with the first process and to receive from the remote host first instructions, first data or combinations thereof that allow the first process to output the first video images.

The logic device may be further configured to execute a second process operable to generate an outcome to the wager-based game and to output game play video images to the video system related to the play of the wager-based game. The logic device may also be configured to execute a third process operable to control access of the first process and/or the second process to at least one wager gaming machine resource. For example, the third process may be operable to ensure that the second process can access at least a predetermined level of at least one wager gaming machine resource. The gaming resource(s) may be, for example, CPU usage, memory usage, graphics processing usage, network bandwidth usage, sound card usage, video card usage, display device usage, power usage and/or peripheral device usage.

The logic system may be further configured to select the first process from among a plurality of processes according to a player preference indication. The wager gaming machine may include apparatus for implementing (at least in part) a player loyalty system, comprising: means for obtaining player loyalty account information; and apparatus for determining player preference data pertaining to the first process and associated with the player loyalty account information. The obtaining apparatus may, for example, comprise a player loyalty card reader and/or an input device. 31. The determining apparatus may comprise a player loyalty device. The player loyalty device may comprise a player loyalty card reader.

The interface system may comprise at least one interface configured for communicating with a local host. If so, the logic system may be configured to do the following: execute a second process operable to output second video images to the video system, content of the second video images being controlled by the local host, the second process being further operable to output a second skin on the video system associated with the second process; and receive from the local host second instructions, second data or combinations thereof that allow the second process to output the second video images.

The second video images may, for example, comprise dating service images. The dating service images may comprise information relating to a person operating another wager gaming machine in a gaming establishment that includes the wager gaming machine. For example, the wager gaming machine may be operated by a first person of a gaming establishment and the dating service images may comprise information relating to a second person in the vicinity of the gaming establishment. The second person's characteristics may match those sought by the first person, e.g., as indicated by preference data for the first person and/or the second person. The local host may comprise a server associated with a gaming establishment.

The first video images may comprise stock quote images, sports score images, news images and/or weather images. The logic system may be further configured to execute $2^{nd}$ through $N^{th}$ processes operable to output $2^{nd}$ through $N^{th}$ video images to the video system. Content of the $2^{nd}$ through $N^{th}$ video images may be controlled by the remote host. The $2^{nd}$ through $N^{th}$ processes may be further operable to output $2^{nd}$ through $N^{th}$ skins on the video system associated with the $2^{nd}$ through $N^{th}$ processes. The second video images may comprise at least one of local tournament images, local restaurant images, local message images, local social event images or local wager gaming event images. The wager gaming machine may further comprise apparatus for determining the $2^{nd}$ through $N^{th}$ processes according to profile data associated with a person. The interface system may comprise at least one interface configured for communicating with a server that is configured to provide the profile data to the determining apparatus.

The wager gaming machine may further comprise an audio system with one or more audio components. The first process may involve outputting first audio data via the audio system. Content of the first audio data may be controlled by the remote host. The first audio data may be associated with the first skin on the video system. First commands, first instructions, first data (or combinations thereof) received by the logic system may allow the first process to output the first audio data. The logic system may be further operable to receive a download of the commands, the instructions, the data or the combinations thereof while the wager-based game is being played. The download may change the content of the first video images.

The logic system may be further configured to monitor at least one wager gaming machine resource utilized by the first process. The logic system may prevent the first process from utilizing more than a predetermined amount of the gaming resource(s). The gaming resource(s) may be, e.g., CPU usage, memory usage, graphics processing usage, network bandwidth usage, sound card usage, video card usage, power usage and/or peripheral device usage. The logic system may be further operable to send information to the remote host indicating an amount of one or more wager gaming machine resources that the first process is allowed to utilize while it is generated on the wager gaming machine.

The logic system may be operable to separate information into a first part that includes the first commands, the first data and the combinations thereof, that allow the first process to output the first video images and a second part that includes secure gaming machine transactions. The first part and the second part may be communicated using different communication protocols. The secure gaming machine transactions may comprise transactions related to credits, transactions related to money handling and/or transactions related to a state of the wager-based game.

The wager gaming machine may further comprise one or more peripheral devices, such as a touch screen sensor, a card reader, a bill validator, a bonus device, a mechanical button, a wireless interface, a ticket reader, a key pad, a radio frequency identification ("RFID") reader, a player loyalty device, an audio device, a display device and/or a coin acceptor. The first process may be operable to communicate with one or more peripheral devices. The wager gaming machine may include a touch screen sensor coupled to a video display of the video system. The first video images may include components corresponding to one or more active areas of the touch screen sensor.

The first process and the second process may be operable to output video images on a single display device of the video system. The first process may, for example, be operable to display the first video images in a first portion of the single display device and the second process may be operable to display the game play video images in a second portion of the single display device. However, the video system may comprise at least a first display device and a second display device. The first process may be operable to output the first video images on the first display device and the second process may be operable to output the game play video images on the second display device.

Alternative implementations of the invention provide a method that includes these steps: receiving player loyalty account information; providing a graphical user interface indicating widget options; receiving an indication regarding a desired widget; and enabling the desired widget. The step of receiving an indication may comprise receiving an indication of a desired widget type and/or receiving information for customizing a desired widget. The enabling step may comprise forming and/or activating the desired widget. The desired widget may be, e.g., a news aggregation widget. The step of receiving the indication may comprise receiving at least one desired news type.

The step of receiving player loyalty account information may comprise receiving player loyalty account information at a wager gaming machine. The graphical user interface may be provided on the wager gaming machine. The method may involve providing a wagering game on the wager gaming machine, wherein enabling the desired widget may comprise activating the widget on the wager gaming machine while the wagering game is being provided.

The desired widget may comprises a social networking widget. The step of receiving the indication may comprises receiving at least one desired characteristic for members of a social network. The social networking widget may, for example, comprise a dating widget. The step of receiving the indication may comprise receiving at least one characteristic of a desired person. The social networking widget may comprise a game coordinating widget. The step of receiving the indication may comprise receiving at least one characteristic of a desired game.

The process of receiving the player loyalty account information may involve reading a player loyalty account instrument and obtaining widget preference data from a player loyalty account. The process of receiving the player loyalty account information may comprise receiving player loyalty account information via a network at a first device. The method may involve associating information regarding the desired widget with the player loyalty account information. The graphical user interface may be provided on a second device.

Alternative implementations of the invention provide a wager gaming machine that includes the following elements: apparatus for providing wagering games; apparatus for determining when a jurisdictional limitation applies to a wagering game; and responsible gaming apparatus for monitoring and/or reporting wagering game data when a jurisdictional limitation applies to the wagering game.

The responsible gaming apparatus may be further configured to provide an indication when the wagering game data are approaching a jurisdictional limitation. The responsible gaming apparatus may be further configured to control the apparatus for providing wagering games according to the jurisdictional limitation. The responsible gaming apparatus may be further configured to control at least one device of the providing apparatus for reporting wagering game data.

The responsible gaming apparatus may be configured for monitoring and/or reporting wagering game data via a widget enabled on the wager gaming machine. The responsible gaming apparatus may, for example, be configured for monitoring and reporting wagering game data while the providing apparatus is providing a wagering game. The wagering game data may comprise wagering time data and/or wagering amount data.

The wager gaming machine may further comprise a network interface. The responsible gaming apparatus may be configured for reporting wagering game data to a regulatory agency via the network interface.

The wager gaming machine may further comprise a display device in addition to (or as part of) the providing apparatus. The responsible gaming apparatus may be further configured to control the display device for reporting wagering game data.

Still other embodiments of the invention provide a gaming device that includes the following elements: a gaming interface comprising a plurality of input devices and a at least one output device for displaying an outcome to a wager-based game played on the gaming device; a communication interface for allowing communications with a remote host; and a logic system.

The logic system may be configured to provide a first resource partition associated with first gaming resources. The first gaming resources may include, e.g., a processor, a memory and a portion of the gaming interface. The logic system may be configured to provide a second resource partition associated with second gaming resources. The logic system may be configured to allow execution of an interface process in the first resource partition. For example, the interface process may only be allowed to utilize the first gaming resources.

The logic system may be configured to receive information from the remote host that allows the remote host to utilize the portion of the gaming interface via the interface process. The logic system may be further configured to allow execution in the second resource partition of one or more gaming processes for generating the wager-based game on the gaming device. The logic system may be configured to prevent the interface process from using more than an allocated amount of the first gaming resources. Moreover, the logic system may be configured to establish a communication session with the remote host that enables the remote host to send the information that allows the remote host to utilize the portion of the gaming interface via the interface process.

The logic system may be further configured to determine a utilization of the first gaming resources, a utilization of the second gaming resources or combinations thereof. The logic system may be configured to prevent the interface process from using more than the allocated amount of CPU cycles, memory, graphics processor cycles, network bandwidth, sound card usage, video card usage, power usage, peripheral device usage or combinations thereof. In addition, the logic system may be configured to arbitrate control of a device associated with the portion of the gaming interface, e.g., when it is determined that the interface process and a first gaming process of the one or more gaming processes are requesting control of the device. The portion of the gaming interface may include a video system. The interface process may be operable to receive the information from the remote host (comprising commands, instructions, data or combinations thereof) that allow the interface process to generate video images for the video system.

Some embodiments of the present invention provide a gaming system. The gaming system may comprise a number of host devices in communication with one or more gaming machines. The gaming machines may be operable to provide wagering on an outcome of a game of chance, display the outcome of the game of chance, accept cash or an indicia of credit and dispense an award, such as cash or indicia of credit, to a player utilizing the gaming machine.

In particular embodiments, the gaming machine may be operable to establish a communication link with a host device that enables content provided by the host device to be output on the gaming machine. To output the content provided by a host, a host-controlled process that may be authenticated by the gaming machine and executed in a secure memory location such that it may be isolated from other processes executing on the gaming machine may be utilized. The host-controlled processes may be decoupled from the process used to execute the game of chance played on the gaming machine such that the content output by the host-controlled process does not alter the play of game of chance.

In addition, the gaming machine may monitor the resources utilized by the host-controlled process to prevent the game play from being less than optimal. For instance, a host-controlled process could overburden the CPU on the gaming machine resulting in less than optimal graphical output for the game of chance or host-process could produce audio output that clashed with the audio output related to the play of the game of chance to produce an unpleasant gaming experience. In each of these instances, to prevent the game play experience on the gaming machine from degrading, the gaming machine may limit and/or prevent access to certain resources (e.g., CPU usage may be limited) and actively monitor resources utilized by the host-controlled process to insure that adequate game play performance is maintained.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

In one embodiment, each gaming machine in the gaming system disclosed herein may be operable to provide one or more locally controlled games (i.e., wagering games controlled by the master gaming controller which may comprise a gaming machine CPU or one or more processors) and also provide one or more externally controlled processes (i.e., processes controlled by an external host device), wherein each externally controlled process must be authorized by the master gaming controller to maintain the integrity of the locally controlled game. In one such embodiment, if the externally controlled process is authorized by the master gaming controller, then the externally controlled process provides: (a) one or more services to the player; (b) one or more enhanced functions or features of the gaming machine to the player; (c) one or more outcomes to a player; or (d) a combination of such services, functions and outcomes to a player, wherein the externally controlled process may be based, at least in part, on one or more aspects of the locally controlled games. In other embodiments, if the externally controlled process is authorized by the gaming machine processor, then independent of the locally controlled games, the externally controlled process provides: (a) one or more services to the player; (b) one or more enhanced functions or features of the gaming machine to the player; (c) one or more outcomes to a player; or (d) a combination of such services, functions and outcomes to a player.

This embodiment may enable the gaming system to provide at least one outcome from a process (or one more process threads), which has previously obtained approval from a regulatory gaming commission (i.e., the game and game outcomes generated by the gaming machine's processor which utilize one or more approved random number generators and approved accounting procedures) and also provide at least one outcome from a process which has not previously obtained approval and may not require approval from a regulatory gaming commission (i.e., the outcome generated by a host device).

In a particular embodiment, the master gaming controller that controls wager-based games played on a gaming machine may execute an interface program. The interface program may be approved for execution by the master gaming controller. The executed interface program may be utilized under control of one or more host devices, which may include a server, to provide an interface on the gaming machine. The host device(s) may provide data, such as multimedia content and other instructions for utilizing capabilities of the executed interface program. The executed interface program may be designed/configured and utilized in a manner, such that, it may be unable to affect the outcome of the wager-based game played on the gaming machine.

The executed interface program may utilize various gaming machine resources (e.g., displays, input devices and output devices, storage devices, processors, communication interfaces, etc.). The utilization of these resources may occur while the gaming machine may be operable to provide play of the wager-based game of chance. In particular, the executed interface program may be used to output video and audio content provided from a host device and receive input from devices coupled to the gaming machine, such as a touch screen. In this case, the executed program and its associated capabilities may be approved for execution on the gaming machine by the master gaming controller but specific instantiations of the interface provided by the executed program may not be pre-approved or even require jurisdiction approval. This capability allows the master gaming controller and gaming devices coupled to the gaming machine to be utilized to provide dynamically adjustable and customizable content on the gaming machine without requiring all of the content processed by the master gaming controller to be pre-approved for execution by the master gaming controller as has been done in the past.

In another embodiment, the gaming machine may not have to authorize an externally controlled process (or alternatively the externally controlled process may be pre-authorized by the gaming machine processor). In one such embodiment, the gaming device includes a separate display (or other devices) dedicated or substantially dedicated to providing any externally controlled processes to the player. In an alternative embodiment, one or more externally controlled processes may have a continuing or standing authorization. In one such embodiment, the authorization exists for one or more defined time periods. It should be appreciated that by utilizing the master gaming controller for at least one determination (i.e., the game of chance award determination described above) and by utilizing a host device for at least another determination (i.e., a determined service, a determined enhanced gaming machine feature and/or a determined outcome provided via the externally controlled process), the gaming system disclosed herein may be operable to provide a plurality of determined aspects of the player's gaming experience wherein at least one determined aspect may be performed by a gaming machine and at least one determined aspect may be performed by an external device.

Accordingly, it should be appreciated a gaming device including a primary game operable upon a wager by a player, at least one display device, at least one input device, and a master gaming controller including at least one local processor may be provided. The master gaming controller may be programmed to communicate with a at least one host device, to enable the player to wager on a play of the primary game, generate a primary game outcome for the play of the primary game, cause all or a part of the display device to display the play of the primary game, and receive at least one request from a host device to provide at least one remotely affectable process on the display device where the remotely affectable process may be executed by the master gaming controller. If the at least one request to provide the remotely affectable process is received, the master gaming controller may be programmed to determine an availability of at least one gaming device resource, such as all or a portion of the display. In a particular embodiment, when the gaming device resource is available and the gaming device resource is a display device, the master gaming controller may be programmed to accept the request to provide the remotely affectable process; and may enable a host device to cause a portion of the display device to display content via the remotely affectable process, where the content displayed via the remotely affectable process is displayed simultaneously with the play of the primary game on the display device. If the gaming device resource is not available, the local processor may be programmed to reject the request to provide the remotely affectable process.

In another embodiment of the gaming system disclosed herein, the gaming system enables one or more players at one or more gaming machines to interact with the gaming machine and/or a host device via a customizable interface under control of a host device. In one embodiment, one or more aspects of the customizable interface may be affected in accordance with functions provided by a host device and one or more aspects of the customizable interface may be affected in accordance with functions provided by the gaming machine. In this embodiment, the result of at least one player input via the customizable interface may cause a change related to the locally controlled game via a communication between the remote host and the gaming machine. For example, bonus credits won on the customizable interface may result in the bonus credits added to the credit meter on the gaming machine and subsequently displayed. Further, a result of at least another player input related to the play of the game or some other function on the gaming machine separate from the features provided by the customizable interface may affect a configuration of the customizable interface. For example, after a win of a large jackpot, a host device may be notified and in response alter the configuration of the customizable interface, such as displaying a congratulatory message. This configuration enables different customizable features performed by different processors at different locations to be simultaneously displayed and altered by the player, thus enhancing the player's gaming experience.

In certain embodiments the devices and methods described herein include, but are not limited to any combination of two or more, three or more, or four or more, of the elements or features described above and/or any combination of two or more, or three or more, or four or more of the elements or features described herein.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing a customizable interface and remote management of content on a gaming machine. These drawings in no way limit any changes in form and detail that may be made to the invention by one skilled in the art without departing from the spirit and scope of the present invention.

DETAILED DESCRIPTION

Figure 1A:
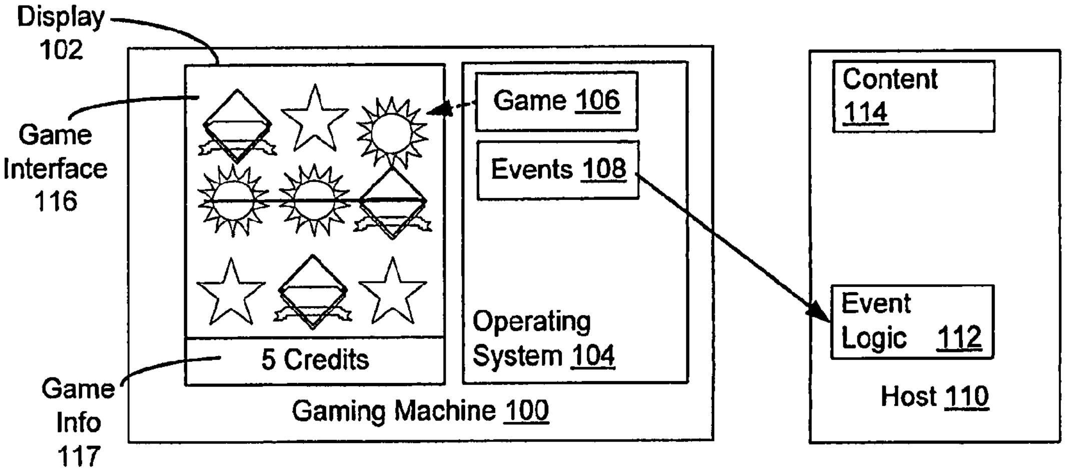
FIGS. 1A, 1B, and 1C are block diagrams illustrating an interaction between a host and gaming machine for one embodiment of the present invention.

Exemplary applications of systems and methods according to the present invention are described in this section. These examples are being provided solely to add context and aid in the understanding of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

In the following figures, method and apparatus applicable to various gaming system configurations and their associated components are described. The gaming systems may comprise a network infrastructure for enabling one or more hosts to communicate with gaming machines. The gaming machines may be operable to provide wagering on a game of chance. A plurality of gaming devices, such as bill/ticket validators, printers, mechanical displays, video displays, coin hoppers, light panels, input buttons, touch screens, key pads, card readers, audio output devices, etc., may be coupled to the gaming machine. The gaming devices may be controlled by a master gaming controller executing authenticated software to provide a gaming interface for a game play experience on the gaming machine.

Externally-Controlled Interface Processes

In particular embodiments, the gaming devices on the gaming machine may be controlled by software executed by a master gaming controller 46 (see at least FIG. 6) on the gaming machine in conjunction with software executed by an external logic system (e.g., a logic system of a host device such as a central server or a central controller) in communication with the gaming machine. The master gaming controller may execute externally-controlled interface (ECI) processes, described in more detail below, that enable content generated and managed on a host device to be output on the gaming machine. The gaming machine may receive and send events to a host that may affect the content output by one or more ECI processes as well as enable an ECI process to be initiated on the gaming machine.

The master gaming controller may be configured to limit the resources that can be utilized by the ECI processes executing on the gaming machine. Specific resource limitations may be predetermined, negotiated with a host device controlling an ECI prior to the execution of the ECI on the gaming machine or combinations thereof. To enforce any established resource limitations, the master gaming controller may constantly monitor resources utilized by the ECI processes and other gaming processes executing on the gaming machine.

The ECI's may be executed while a gaming machine is operable to provide a play of wager-based game of chance (During operation, one or more games and one or more executed simultaneously, one or more games may be executed without execution of an ECI or one or more ECIs may be executed while a game is not being played). Therefore, the resources may be limited to ensure that a gaming experience on the gaming machine is optimal while access to gaming resources is granted to a host. The resources allocated to ECI's may be limited for many reasons, such as ensuring the game play experience is adequate or for security purposes, and the examples described herein, which are provided for illustrative purposes only. For instance, the CPU cycles provided to executing ECI processes may be limited to ensure a minimal graphically rendered frame rate is maintained on the gaming machine. As another example, the ECI processes may not be allowed to directly control or access certain devices, such as money handling devices, to prevent the ECI from allowing cash or an indicia of credit to be input or output from the gaming machine.

It should be appreciated that the gaming device resources utilized by the ECI processes include, but are not limited to: graphic resources of the gaming machine (i.e., what graphical real estate is available on the display device without interfering with the graphics of the primary game), audio resources of the gaming machine (i.e., what audio content may be provided by the gaming machine without interfering with the audio of the primary game), timing resources available (i.e., has the primary game ended or is the primary game beginning), and/or CPU processing resources of the gaming machine. In one embodiment, access to such resources may be based on a priority system configured to maximize an optimal gaming experience for each player.

In particular embodiments, the host-controlled ECI processes may be decoupled from the processes used to generate the game of chance played on the gaming machine such that the content output by the host-controlled ECI processes does not alter the play of game of chance. Thus, the logic for the game processes may be designed such that information regarding the state or content generated by the ECI processes is not needed to generate the game of chance and/or the game and related processes may not recognize any information produced by the ECI's. The ECI processes may be designed in a similar manner.

An advantage of ECI software and game software decoupled in this manner may be that content may be provided from a host device that enhances the functionality and features available on the gaming machine. The content can be easily varied with little or no modification to the gaming software resident on the gaming machine. For instance, many features and services on a gaming machine can be provided using a generic ECI that enables access to a display and a touch screen on the gaming machine (e.g., see at least FIGS. 5A and 5B). Externally controlled interfaces, the interaction between one or more host devices and a gaming machine, embodiments of hardware and software architectures on a gaming machine related to ECI's are described with respect to the following figures.

Figure 1B:
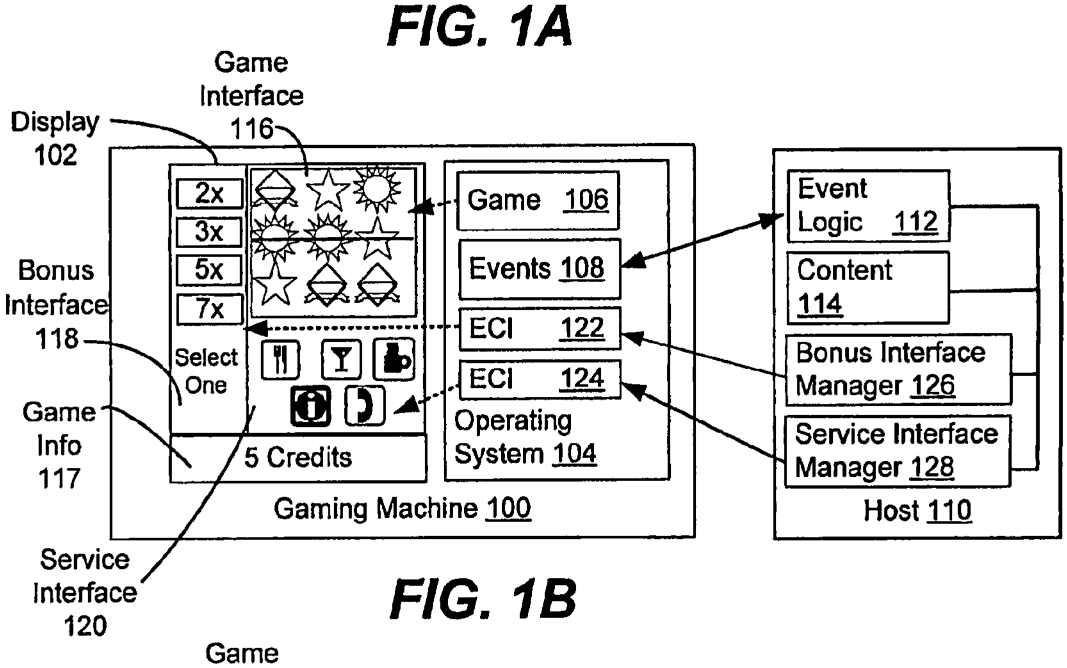
Figure 1C:
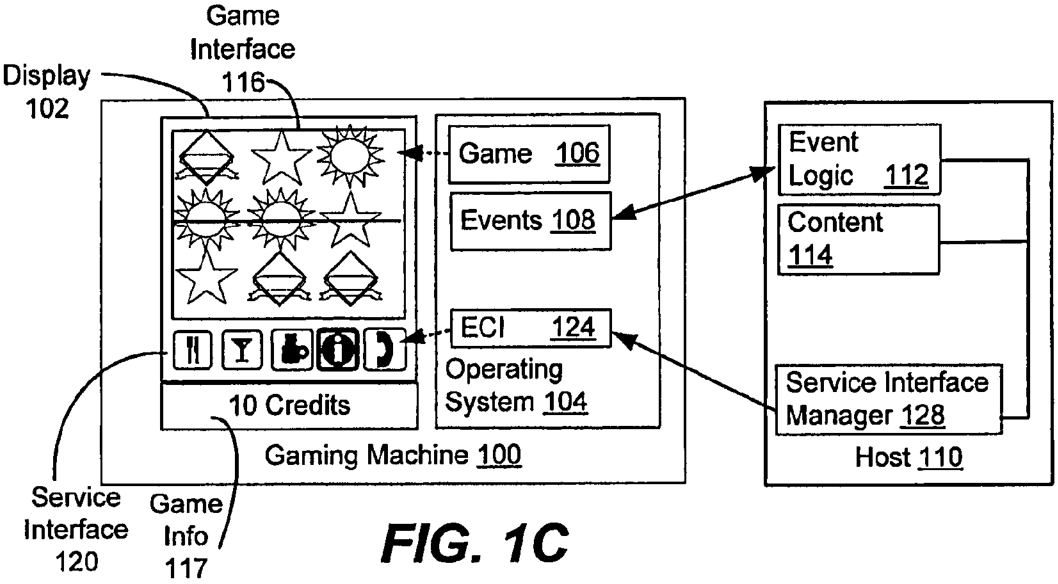

FIGS. 1A to 1C are block diagrams illustrating an interaction between a host and gaming machine for one embodiment of the present invention. In FIG. 1A, a block diagram of a gaming system comprising a gaming machine 100, a host 110 (which may comprise one or more devices) and a network that enables for communication between the gaming machine and the host 100 (not shown) is illustrated. The gaming system is provided for illustrative purposes only. Gaming systems comprising multiple gaming machines and multiple hosts are possible. Further, in some embodiments, the gaming machine 100 may perform functions of the host 110, the host 110 may be a game server providing games that are output on other gaming devices or the host 110 may be a gaming machine similar to gaming machine 100. Further details of embodiments of gaming systems and gaming devices that may be used are described with respect to FIGS. 2-9D.

The gaming machine 100 comprises a touch screen display 102 that may be a component of a game interface 116. The game interface 116 comprises the components on the gaming machine 100, such as input buttons (not shown), audio output devices (not shown), etc., that enable a game to be played on the gaming machine 100. An operating system 104 executes a number of processes including game logic 106 for providing a game on the game interface 116, event logic 108 and communication logic for communicating with the host 110 (not shown). Further details of gaming machines and game play are described with respect to FIGS. 2 to 9D.

In FIG. 1A, the game interface 116 may be divided into two regions on the touch screen display 102. A first region includes symbols and paylines for a video slot game. A second region 117 includes game information including the number of credits available for wagering on the slot game. In the game state illustrated in the figure, five credits are available for wagering.

The host 110 comprises a processor, memory and a communication interface (each not shown). Content 114 that may be output on the gaming machine 100 and event logic 112 that enables the host 110 to respond to events and information received from the gaming machine and/or generate events to send to the gaming machine 100. Additional details of hosts are described below, e.g., with respect to FIGS. 2, 4 and 7.

In FIG. 1A, the event logic 108 detects an event message and sends an event message with information describing the event to the host 110. As is described with respect to FIG. 1B, in this example the host 110 responds to the event by requesting the gaming machine to launch an externally controlled interface (ECI) that enables content 114 stored on the host 110 to be output on the gaming machine. A few examples of events occurring on the gaming machine 100 that may trigger an instantiation of an ECI to be launched on the gaming machine 100 include, but are not limited to, the following: (1) a deposit of credits on the gaming machine, (2) a player tracking card inserted into a card reader, (3) information being read from a portable instrument carried by a player (e.g., a cell phone, RFID tag or other wireless device), (4) an actuation of button, such as a mechanical button or a touch screen button, (5) an event triggered from a play of the game

106, (6) a cash-out command detected on the gaming machine, (7) an input of a wager, (8) an initiation of the game 106, (9) a number of credits available on the gaming machine, (10) the result of one or more games, (11) the result of the generation of one or more symbols, (12) a designated win amount, (13) a player cashing out available credits, and (14) a player tracking card removed from a card reader. As is described in more detail with respect to FIG. 2, an event generated on a host device may also trigger the launch of an ECI on the gaming machine.

The event sent from the gaming machine is evaluated by the event logic 112 on the host 110. In response to the receiving the event, the host 110 sends a message requesting access to resources on the gaming machine 100. In response, the gaming machine 100 may send a message to the host 110 describing the resources it has available for external control and any usage limitations that are associated with the resources, such as a portion of the display 102 including its dimensions that may be utilized by the remote host.

The host 110 may use the resource information provided by the gaming machine 100 to determine what content to send to the gaming machine 100. For example, video content to be output on the portion of the display 102 allocated for use by a host may be generated and/or selected to be compatible with the size of the display window. The process of establishing a resource sharing arrangement between the host 110 and the gaming machine 100, which may involve a negotiation between the host 110 and gaming machine 100, are described in further detail with respect to FIGS. 2 to 4.

In FIG. 1B, a state of the gaming machine 100 and the host 110 is illustrated where the gaming machine 100 has launched two ECI's, 122 and 124, that enable the host 110 to output content for a bonus interface 118 and a service interface 120 on touch screen display 102. The bonus interface 118 may be just one example of an interface that may be provided. A multimedia player, such as a Flash Player™ by Adobe™ (Adobe Systems Incorporated, San Jose, Calif.), may be one example of software that may be used as an ECI, such as 122 and 124. The multimedia player may allow, as one of its features, multimedia content received from the host 110 to be displayed on the touch screen display 102 and/or output on other gaming devices, such as speakers coupled to the gaming machine.

The host may download the multimedia content as part of application files that are utilized by the ECI's, 122 and 124. The application files may include embedded content, data, scripts and other instructions for accessing the capabilities of the ECI to be utilized. For example, the Flash Player™ runs and/or parses flash files which may include Adobe Flash Action Script.™ The flash files may include information relating to utilizing raster or vector graphics, a scripting language to control functions of the player and information for providing bidirectional streaming including audio and video information. In particular, an ECI may be operable to receive video and/or audio streaming of content from a host. The multimedia player and associated files, such as the Flash Player™ may be a component of a "Rich Internet Application," (RIA).

Rich Internet applications are typically interface applications provided by a host to a client with downloadable components that have the features and the functionality of locally installed and executed programs. RIAs typically transfer the processing necessary for the interface generated by the application to the client but keep the bulk of the data (i.e., maintaining the state of the program, the data etc) back on the host. RIA's are not limited to web-based applications applied over the Internet and may be utilized in other network architectures. In an RIA involving a host device and a client device (e.g., host 110 may be considered a "host" and gaming machine 100 may be considered a "client" in particular embodiments), an application for generating an interface executed on the client may be operable to perform functions independently of the host, such as computations, send and retrieve data in the background, store data locally, redraw sections of the screen, and/or use audio and video in an integrated manner, etc.

The application for generating the interface may also share data with other applications locally executing. For example, two ECIs executing on gaming machine 100 may share data. The shared data may affect the content displayed on one or both ECIs. In particular embodiments, the ECIs may be prevented from directly sharing data with other processes executing on the gaming machine. For example, to share data with a non-ECI process, the ECI may have to send the information to a host first, which then may or may not perform additional processing on the data before communicating it back to the gaming machine.

Returning to FIG. 1B, after the ECI's, 122 and 124, have been launched by the operating system 104, the touch screen display 102 may be divided into four regions. The game interface 116 may be displayed in a first region, the bonus interface 118 may be displayed in a second region, the service interface 120 may be displayed in a third region and the game information 117 in a fourth region. The game interface 116 is configured to fit in a smaller region as compared to FIG. 1A, which may affect the graphical presentation of the game and may affect a mapping of touch screen buttons to the display 102 associated with the game interface 116. However, in alternative implementations, content from a host may be displayed in a region of a display device in which a game is being presented.

In general, a master gaming controller in the gaming machine may be operable to provide content to display regions of different sizes. To provide content to display regions of different sizes, the gaming machine may perform one or more of the following, 1) select from among stored content, such as bitmaps, movies, animations, geometric models, etc., according to which content is more appropriate for a given display size, 2) rearrange a position of one or more components in a display window relative to one another, 3) scale content, 4) stretch content, 5) interpolate content, 6) generate new content, 7) adjust parameters of a 3-D graphical environment used to generate content and 8) combinations thereof.

In one embodiment, the wager-based games played on the gaming machine may be configured such that the manner in which a game is played or the manner in which an outcome is generated for the game may not be altered via any information from any instantiation of an ECI on the gaming machine 100. For example, in one embodiment, the bonus interface 118 may be used to provide a bonus multiplier for an award associated with an outcome of a game played on the gaming machine, such as a ten times bonus. In this example, the bonus multiplier does not affect how the game is played or how the outcome to the game is generated. However, the bonus multiplier does affect the award for the game, i.e., it is multiplied by a factor of ten.

In the example described in the preceding paragraph, the gaming program may include logic to generate a simple message that a bonus multiplier has been provided, such as a simple text message, e.g., "You have won a bonus Multiplier." The bonus interface ECI 118 may be used to enhance and customize the presentation of the award of the bonus multiplier. For instance, in a particular embodiment, the bonus multiplier may be provided by a local casino and bonus interface ECI 118 may be used to display one or more of a casino logo, a custom message from the casino and a theme based presentation, such as a casino theme or a holiday theme as part of a presentation for the bonus multiplier award.

In many gaming jurisdictions, after a game is approved, the content of the game may not be altered without subsequent regulatory approval. Thus, to customize a game for a particular casino or a particular gaming entity, customized content would have to be added to the game and then submitted to an associated gaming jurisdiction for approval at which point the content would be fixed The approval process is time consuming and expensive.

Prior to the approval process for a particular game, the gaming software provider for the particular game often does not know which casinos or other gaming entities are going to purchase the particular game. For instance, game purchasers often wait and see how the particular game is performing at other casinos before they choose to buy it. Thus, the desire for a customized version of the particular game generally arises after the content of the game has been fixed by the approval process. To provide desired customization after the approval process, the customized game would have to be resubmitted for approval, which is very expensive.

One advantage of using ECIs is that a presentation of a game may be enhanced using an ECI, such as by providing a presentation for a bonus multiplier, as described above, in conjunction with the presentation of the game. The content of the ECI may be customized and altered after the release of the game while the presentation provided by the game may not be altered after its release. The presentation provided via an ECI may be designed to look like a component of an associated game, e.g., it may use the same theme and may be displayed on the same screen, and thus, to the player may appear as another component of the presentation of the associated game even though as will be discussed further, the ECI may be a logical entity decoupled from the associated game. Thus, using an ECI, the appearance of game customization may be provided to a user without having to customize the actual game that is submitted for jurisdiction approval.

In yet another embodiment, the gaming device utilizes a plurality of display devices to display the game interface and one or more ECIs. For example, a first display device may display the game interface and a second display device may display each ECI communicated from a host. In one such embodiment, each display device may be controlled by one or more different processors such that each display device may generate and display information or data independently of (or alternatively dependent on) information or data displayed by the other display devices.

In another embodiment, a host may be in communication with each such processor to oversee (and possibly control) what may be displayed on one or more display devices of each gaming device in the gaming system. In this embodiment, the host may be either in direct communication with or indirect communication with (such as through a player tracking system) each gaming device in the gaming establishment. This configuration provides that even if the host is not directly in communication with a designated gaming device's CPU, the host may be still operable to communicate with and provide such designated gaming device (and other gaming devices in the gaming establishment) one or more ECIs as described herein. Examples of display devices that may be controlled via an ECI are described with respect to U.S. application Ser. No. 10/756,225, filed Jan. 12, 2004, entitled, "Virtual Glass for a Gaming Machine," by Lemay, et al, which is incorporated herein in its entirety and for all purposes.

The bonus interface 118 may enable a player to win a bonus award. In one embodiment, a player may be afforded an opportunity to select between a number of bonus multipliers where a probability of an award of the selected multiplier varies from multiplier to multiplier and may be calculated based upon which multiplier is selected. In one embodiment, the logic for determining whether the selection of a particular multiplier may reside on a host device, such as host 110. In another embodiment, the logic for determining the selection of a particular multiplier resides on a host and uses data communicated from the gaming device, such as data based on a player tracking information.

When the player selects one of the multipliers, raw touch screen input data may be sent via event logic 108 and using necessary communication logic (not shown) to the event logic 112 on the host 110. When the ECI 122 for the bonus interface 118 is instantiated, a portion of the touch screen display 102 that may be used by the ECI 122 may be determined. This information provides a mapping in regards to which regions of the display are assigned to ECI's. With this information, the operating system 104 may determine whether a touch input received at a particular location is in a region assigned to an ECI and when it is determined that the input is in a region assigned to a particular ECI, route the touch information to a host controlling the particular ECI.

In another embodiment, the ECI, may be designed or configured to perform some data handling received from the touch screen. For instance, the ECI may be configured to receive raw touch screen data and determine whether a button has been activated. It may be possible to specify, prior to execution of the ECI what portion of a display screen is available to the ECI and its associated dimensions/coordinates. Thus, a host device, such as a device of host 110, may download an application file including desired content for use by the ECI, such as 122 and 124, that allows the ECI to process touch input. For example, the application file may include a mapping of coordinate locations for each active area (i.e., an area for accepting touch inputs such as buttons on displayed on the display behind the touch screen). The mapping may allow the ECI to process the raw touch data and then send higher-level information to its external controller, i.e., host 110, such as, "Button A activated."

Input processing logic may be provided with an ECI for input devices other than a touch screen. For instance, as part of an instantiation of an ECI controlled by a first host, it may be agreed that when input from one or more input devices, such as a touch screen, card reader, a mechanical key pad, mechanical input buttons and combinations thereof, is detected, the input information is to be sent to the first host as long as the ECI is active or sent to the ECI for processing, which then may forward the processed information to the host. Thus, in general, as part of the initial instantiation of an ECI, information regarding what input devices are associated with the ECI and/or what types of input information to route to the ECI and/or to route directly to the host associated with the ECI may be determined and stored on the gaming machine. The information regarding what input devices are associated with the ECI may be determined during an initial negotiating process between the host and the gaming machine.

In another embodiment, the ECI may provide initial processing of information. For example, during the negotiation process, the gaming machine may specify information regarding inputs it receives from various input devices that it will share with the ECI. The specified information may include, but is not limited to, the type of device, manufacturer of the device, one or more inputs generated from the device and a format for the information for each the inputs. Using the specified information, the host may generate application files for an ECI or generate a new ECI application that performs the proper processing/filtering of the inputs received from the gaming machine and routes needed information to the host or to other hosts associated with the ECI.

As described in the previous paragraph, the gaming machine may or may not pass along information regarding all of the inputs it receives from devices coupled to the gaming machine. For instance, in some preferred implementations the gaming machine may not pass along input information generated by a bill validator or money handling devices coupled to the gaming machine. In one embodiment, the gaming machine may include logic for providing a standard set of device descriptions and associated inputs that may be provided to an ECI. In another embodiment, the gaming machine device descriptions and associated inputs may be varied depending on the host that is requesting resources for an ECI.

As described above, even when the host or ECI is to receive input from an input device, not all of the input information received from an input device may be routed to the ECI and/or the host controlling the ECI. For instance, the host may specify that information read from a player tracking card is to be sent directly to the host or routed through the ECI but not information from a credit card. As another example, the host may specify that it is looking for input only from a portion of the mechanical input buttons on the gaming machines and that only input from the specified buttons is to be directly routed to the host or routed through the ECI but not other buttons. In yet another example, the host may specify that if the player inserts a ticket into the bill validator while the ECI is active that the gaming machine is to directly route the ticket information to the host or route it through the ECI.

Returning to FIG. 1B, after the host 110 receives from the gaming machine 100 the raw touch input corresponding to the selection of one of the bonus multipliers, in one embodiment, the bonus interface manager 126 on the host 110 determines that the raw touch input corresponds to a selection of the "2×" multiplier illustrated in FIG. 1B. In another embodiment, the raw touch input may be routed to ECI 122, which process the raw touch input and then notifies the host that the "2×" multiplier has been selected.

In response to the selection of the "2×" multiplier, the bonus interface manager may send updated content to gaming machine 100 that indicates the "2×" multiplier was selected, which may be displayed by the ECI process 122 to the display screen. For instance, the "2×" multiplier may be highlighted or emphasized in some manner in the bonus interface 118 on the touch screen display 102. In another embodiment, the ECI 122 may have the capability to update the display to indicate the "2×" multiplier has been selected without receiving additional content or instructions from the bonus interface manager 126.

In this example, the bonus interface manager 126 next generates a random number and determines that the player has won the "2×" multiplier. In response, the bonus interface manager 126 sends updated content indicating the player has won the "2×" multiplier, which may be displayed by the ECI process 122 to the display screen. Next, the host 110 may send two events to the gaming machine 100 which may be received and processed by the event logic on the gaming machine.

In this example, the first event received from the host 110 may cause the gaming machine 100 to double the credits in the credit meter stored on the gaming machine. The first event may be processed by event logic 108 on the gaming machine. When the credit meter has been doubled, as shown in FIG. 1C, the gaming machine 100 may send a message to the host 110 indicating the amount credited to the player. Both the gaming machine 100 and the host 110 may store a record of this event (i.e., the award of the additional credits) for auditing and dispute resolution purposes to secure memory location, such as a non-volatile memory. It should be appreciated that this first event illustrates an occurrence of an ECI (in this case, a 2× multiplier) modifying one or more aspects of the locally controlled game of chance.

The second event sent from the host 110 causes the gaming machine 100 to close down or hide the bonus interface 118 and terminate the ECI process 122 associated with the bonus interface (see at least FIG. 1C). The host 110 terminates the bonus interface manager 126 used to send content associate with the ECI 122 to the gaming machine 100 (see at least FIG. 1C). During the termination process, the gaming machine 100 and host 110 may exchange messages with information indicating the ECI 122 is no longer active and session termination information, such as a session associated with the ECI 122 ended at a certain time, date, etc.

In one embodiment, the gaming machine enables the player at least partial control in when to open and close down (or hide) the ECI. In one such embodiment, a player may open and close an ECI via a button connected to (or otherwise associated) with the remote host. In this embodiment, the master gaming controller may receive a message from the remote host indicating a desire to close down or hide the ECI. In another embodiment, a player may open and close an ECI via a button connected to (or otherwise associated) with the master gaming controller. For example, a dedicated mechanical input switch/button may be provided on the gaming machine that generates a signal indicating a desire to open or close an ECI.

When an ECI is initiated or terminated on the gaming machine, in response to an input from an input device on the gaming machine, such as the actuation of an input switch as described in the preceding paragraph, in response to some other event generated on the gaming machine, or in response to an event generated on a host device, in one embodiment, the gaming machine may initiate a session with a remote host that is to provide the ECI or terminate a session with the host that provided the ECI.

In another embodiment, when a request is received to terminate an ECI, the gaming machine may maintain the session with the host but place the ECI into an inactive or hibernating state and notify the remote host of the ECI status. For example, when the ECI is used to output content to a portion of a display and a request is received to terminate the ECI, the gaming machine may display other content in the portion of the display previously utilized by the ECI, such as resizing the game interface to fit into this portion of the display, place the ECI into an inactive state and notify the host of its inactive state without terminating the session. When it is later determined that the ECI is to be reopened, the gaming machine may open the ECI in the display again and notify the host of the active status of the ECI. At this time, the gaming machine may or may not renegotiate resources for the ECI.

Returning to FIGS. 1B and 1C, after the bonus interface 118 and ECI 122 are terminated, additional resources related to the touch screen display 102 become available on the gaming machine. In this example, ECI 124 associated with the service interface 120 may be still active after the ECI 122 is terminated. Thus, the gaming machine 100 and the host 110 may renegotiate the resources assigned to ECI 124.

As is illustrated in FIG. 1C, after the renegotiation of resources, the game interface 116 and/or the service interface 120 may be resized and assigned to different areas of the touch screen display 102. In response, service interface manager 128 on the host 110 generates new content from the content 114 stored on the host 110 for the service interface 120 that is consistent with the new display area. In particular, the icons displayed in the service interface 120 may be rearranged as compared to FIG. 1B, to fit into the new display region and the host 110 may generate a new touch screen mapping that corresponds to the rearranged icons. The host 110 may download content, information, applications files, etc, to the gaming machine to implement or all or a portion of the specified changes. The content provided from the host may be output on the gaming machine 100 via the ECI 124 associated with the service interface 120.

As illustrated in FIGS. 1B and 1C, the service interface 120 includes a number of icons that enable a user to select a service. These icons include food, drinks, coffee, information and communications with another person, such as another game player or a concierge associated with a casino. The types of icons displayed may depend on personal preferences and game play habits of the game player at gaming machine 100 as well operating conditions specified at the casino. For instance, a more valued game player may have access to food, drinks and coffee while a less valued game player may have access to only drinks and coffee. Accordingly, for the less valued game player, the food icon would not be displayed on the service interface 120. Additional details regarding service interfaces are described with respect to FIGS. 5A and 5B.

To personalize an ECI, such as 124, if the host 110 does not store player information, the host 110 may receive player information from another gaming device, such as a player tracking server, that enables the ECI's controlled by the remote host to be personalized. The player information may include information regarding game play history for a particular player. In addition, while games are being played on the gaming machine 100, the host 110 may directly receive from the gaming machine 100 or via an intermediary device, game play information, such as wager amounts, amounts won, amounts lost, types of games played, amounts deposited to the gaming machine, number of games played, game started, game completed, etc. The game play information may or may not be associated with a particular player.

When an icon on the service interface 120 is selected, the touch screen input data may be sent to the host 110 which determines what selection was made, i.e., food, coffee, drink, etc. In response, as further described with respect to FIGS. 5A and 5B, the service interface manager 128 on the host 110, may generate new content to send to the gaming machine 100. For example, in response to a selection of the food icon, new content regarding food choices may be sent to the gaming machine 100. These food choices may be displayed in the service interface 120 region on the touch screen display 102 instead of the icons illustrated in FIGS. 1B and 1C.

After a food choice is selected, in one embodiment, the host 110 may contact a casino entity providing the food services and may place an order for the food. When the food is ready, it may be delivered to the gaming machine 100. In another embodiment, after the food choice is selected, the host 110 may place an order for the food and instruct the gaming machine 100 to print a ticket and/or display information indicating a time and/or a location where the food may be picked up by the game player.

As previously described, the host 110 may download information/content in an appropriate format, such as application files including embedded content, such as video and audio files, and other information and/or instructions for an ECI, such as 122 and 124. The application files may be stored locally on the gaming machine 100. In addition, when resources are available (resource monitoring is described with respect to at least FIGS. 2 and 3A), one or more application files or one or more portions of an application file may be stored on the gaming machine 100 even after an ECI has completed execution.

The gaming machine 100 and/or host 110 may include logic in regards to storing or purging files. For example, some commonly used files may be stored permanently, other files may be stored for a certain time period, other files may be stored only as long as a particular ECI is active and yet other files may be stored as long as storage space is available. When application files executed are downloaded from the host 110 to the gaming machine, the host may provide information that helps the gaming machine manage it applications files. For example, the host 110 may designate some application files that are used regularly or are likely to be needed in the future. The gaming machine may use this information when determining where to store the application file or when determining a purge schedule for application files.

One advantage of saving one or more application files on the gaming machine may be that download times may be reduced. For example, if all or a portion of the application files used to generate the bonus interface 118 used by ECI 122 are stored on the gaming machine after the bonus interface is terminated, then a similar bonus interface 118 may be later instantiated on the gaming machine using the one or more stored application files rather downloading all of the need files in total each time.

Further, in some embodiments, two or more ECIs may be able to share application files or a portion of the data stored in an application file. For instance, a video image for a casino logo may be shared by the bonus interface 118 and the service interface 120. Thus, once the video image of the casino logo is downloaded and stored for either bonus interface 118 or the service interface 120, it may be possible to reduce a size of the download by letting the host 110 know that this video image is already available on the gaming machine. In particular embodiments, the gaming machine 100 or the host 110 may initiate a process where information regarding the application files or other content stored locally on the gaming machine 100 that may be utilized with an ECI is communicated between the host 110 and the gaming machine 100. The host 100 may use this information to determine what information/content/instructions, such as application files or application file components to download to the gaming machine 100.

In yet another embodiment, ECIs, such as 118 and 120 may be operable to directly share information with one another. For example, the bonus interface 118 may allow a player to win a free meal. When a player has won a free meal, the ECI 122 generating the bonus interface 118 may be operable to share this information with the ECI 124 generating the service interface 120. The service interface 120 may be operable to provide dinner reservations. Thus, in response to information received from ECI 122, the service interface 120 may be modified to ask the player if they wish to make a reservation at the restaurant and to display information about the restaurant where the free meal was awarded.

In FIGS. 1A-1C, the display screen 102 is divided into a number of portions where the size of the portions and the processes used to provide the content to the portions vary with time. The arrangement of display portions and their associated processes are provided for illustrative purposes only. In a particular embodiment, pixel dimension or screen coordinates for a display portion used to output content may be selected to provide various shapes, such as substantially circular, diamond shaped, triangular shaped, star-shaped, etc. For example, an ECI may be operable to output content to one or more of the diamonds or stars on the game interface 116 in FIG. 1A, 1B or 1C. In this example, the ECI may be operable to display content within a moving symbol. In general, the ECI may be operable to display content within a display portion that moves around the screen. For example, the display portion assigned to the ECI may be a shape that moves, such as a shape that appears to bounce, and the ECI may output content to this remote shape.

In another embodiment, one display portion may surround, be surrounded by or overlap another display portion. For example, a first ECI or other process may output content to a rectangular display portion with a "hole" in it. The hole may simply be another display portion at the location of the hole that is controlled by a second ECI or other process, such as a game process. In one embodiment, the first ECI may be aware of the "hole" and arrange its content so that it does not fall with the hole. In yet other embodiments, the gaming machine may be operable to provide display portions for utilization by an ECI, as "pop-up" windows that overlap or overlay one or more other display portions. The gaming machine may include logic that prevents a pop-up window from blocking an important gaming component on the display, such as a touch screen input button for a game that is being played, or from blocking important game information on the display, such as an outcome of a game that is being played. Whether the gaming component or the game information is important may vary with time, such as when a game is being played or not being played.

In general, the gaming machine may allow for "pop-up" windows (also, non-overlapping windows) that may be controlled by in certain locations in a time dependent manner. For instance, when a gaming machine has been idle for a particular amount of time, the gaming machine may allow a pop-up window for an "attract" feature where the attract feature is provided in the pop-window by an ECI and where the pop-up window blocks a portion of the game interface. The pop-up window for the attract feature may be closed when the gaming machine detects an event that may indicate that a player wishes to play a game, such as when a bill validator or coin acceptor is activated or when a card insert is detected at a card reader. In another example, a "pop-up" window that is controlled by an ECI may be allowed after an event indicating a player no longer wishes to play a game, such as when a player has pressed a cash-out button at this point a pop-up window or non-overlapping window, may appear where a remote host via an ECI provides content in the pop-window or non-overlapping window that may entice a player to continue playing (e.g., promotional credits, free spin, etc.) or to spend their winnings in some manner (redeem their winnings for a prize).

In particular embodiments, an ECI may be utilized to output content to a display portion on the display that is non-contiguous. For instance, the ECI may be permitted to output content to a display portion comprising a rectangular bar across the top of the display and a rectangular bar across the bottom display where the rectangular bar at the top of the display and the rectangular bar across the bottom of the display do not overlap.

In yet particular embodiment, an ECI may be utilized to output content across a display portion that spans multiple displays. For instance, the ECI may be utilized to display content on all or a portion of a secondary display separate from display 102 and a portion of display 102. Thus, in one example, content may be provided that appears to move from one display to the other. As another example, the separate secondary display may not include a touch sensor while the portion of display 102 does include a touch sensor. Thus, the portion of the display 102 controlled by the ECI may be used to provide input buttons that affect content that is displayed on the secondary display controlled by the ECI when the ECI controls a portion of the touch screen display 102 and all or a portion of the secondary display.

Multiple Hosts

Figure 2:
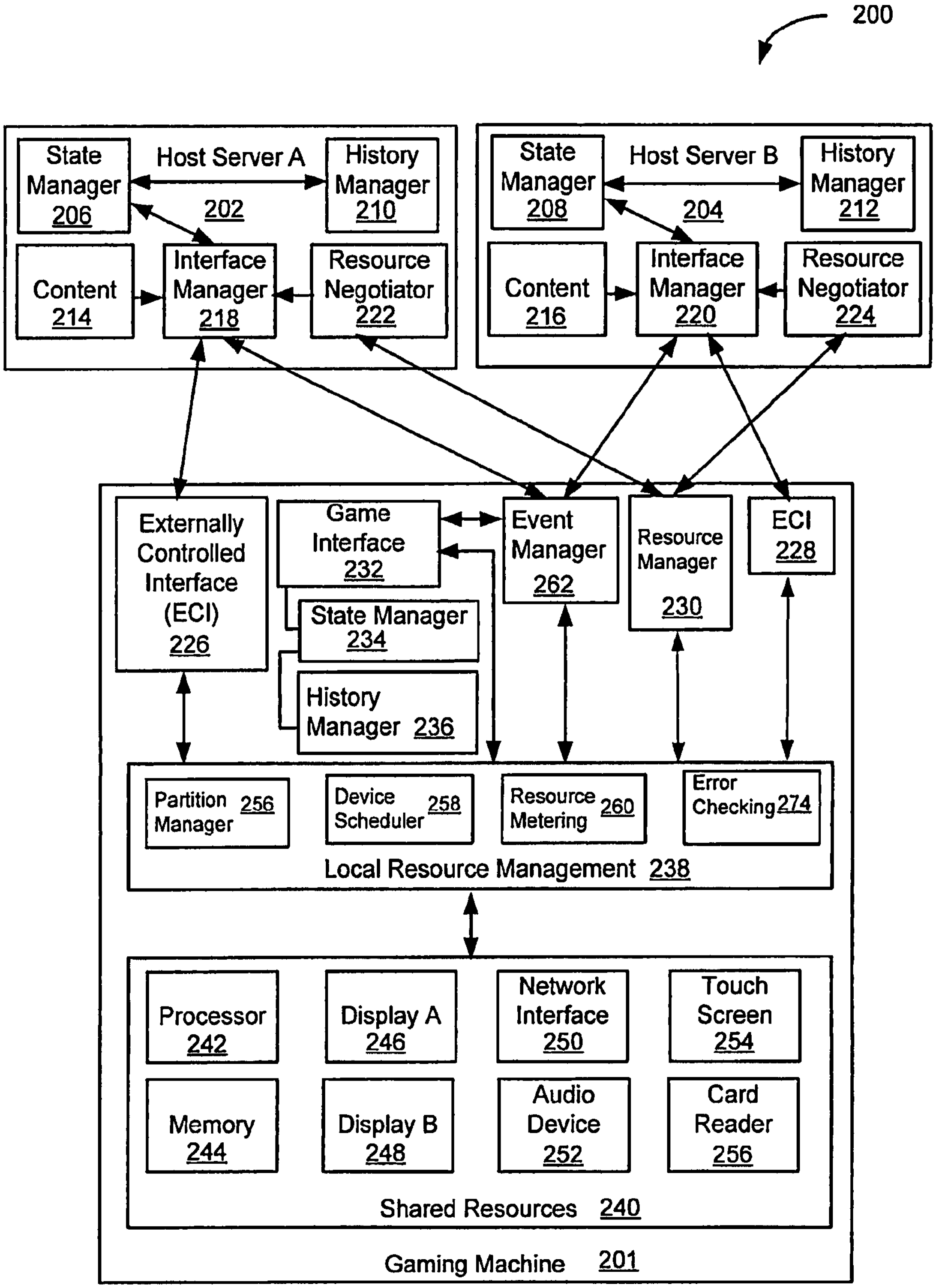
FIG. 2 is a block diagram illustrating an interaction between two hosts and a gaming machine for one embodiment of the present invention.

FIG. 2 is a block diagram illustrating an interaction between two hosts, 202 and 204, and a gaming machine 201 for one embodiment of the present invention. Each host controls an ECI on gaming machine 201. Host 202 controls ECI 226 and host 204 controls ECI 228. The hosts, 202 and 204, may control their respective ECIs, 226 and 228, in an independent or a dependent manner with respect to one another. In the independent case, events generated with respect to the execution of one ECI do not affect the execution of the other ECI. In the dependent case, one or both ECIs may generate events that affect one another. In one embodiment of the present invention, two hosts, such as 202 and 204, may share access to a single ECI and may alternately or simultaneously provide content for the ECI. Further, as previously described, the ECIs, such as 226 and 228, may directly share information without routing it through their respective hosts.

In this example, each host includes a state manager (206 and 208), content (214 and 216), a history manager (210 and 212), an interface manager (218 and 220) and a resource negotiator (222 and 224). The state manager may maintain a state of the ECI on the gaming machine. In some instances, there may be a malfunction on a) the gaming machine, b) the host or c) in the network between the host and the gaming machine. The state manager may be designed to store information that enables the host, to restore an ECI on the gaming machine 201 to a state proximate to the state immediately prior to an occurrence of the malfunction. In one embodiment, the gaming machine maintains its own state via state manager 234 but not the state of any of the ECIs executing on the gaming machine 201. In other embodiments, the gaming machine may maintain some state information regarding the content displayed in the ECI. For example, the gaming machine may capture frames output to its display that include information from an ECI controlling a portion of the display.

The hosts, 202 and 204, may each provide content to ECIs executing simultaneously on a plurality of gaming machines. The content provided on each gaming machine may be different (e.g., the content may be personalized using information regarding the player at each machine or the hosts may be dynamically responding to events generated on each gaming machine and adjusting content accordingly) and the gaming machines served by each host may be different (e.g., host 202 may provide content to gaming machines A, B and C while host 204 is providing content to gaming machines B, C, D). For each gaming machine that the host provides content via an ECI, the hosts, 202 and 204, may maintain a state of the content. The content, as described above, may comprise data and/or instructions provided as application files that are run and/or parsed by the ECI. The application files may include information/data used by the ECI and commands/instructions for utilizing one or more functions of the ECI. For instance, an ECI may be operable to receive command/instructions in regards to utilizing vector graphic capabilities of the ECI. In addition, when vector graphics are applied, the ECI may be operable to apply edge smoothing the vector-based graphics.

In regards to vector graphics, computers may display graphics in two formats: vector and bitmap. Bitmaps are made up of discrete units called pixels. Each pixel contains a single color. When combined, the variations in pixel color create the patterns that make up an image. Bitmaps contain color information for each pixel in an image plus the dimensions for the image, and transmit images pixel by pixel. To change the size of a bitmap image, i.e., to fit into a display region with different dimensions than the original bitmap, the bitmap image may be regenerated at the desired dimensions or the image may be stretched, usually with undesirable results.

By comparison, vector graphics store a series of commands/instructions necessary to create an image using lines and curves. The commands, called vectors, dictate attributes of lines and curves such as thickness, direction, color, and position. A logic device, such as a processor associated with the master gaming controller, may be utilized to process the commands locally to generate a specified vector image. For instance, the master gaming controller may execute an ECI that is operable to parse vector graphic instructions and generate the image specified by the instructions.

Vector graphics allow for fine detail and may be easily be resized without losing definition. An image generated with vector graphics may be modified by changing the attributes of the lines and curves comprising the image. Vector graphics are best for displaying simple shapes with flat areas of color, such as icons, logos, and cartoon-style drawings. Both vector and bitmap graphics may be drawn on request, but vectors may generally use much smaller file sizes and can be drawn much more quickly. When downloaded, bitmaps are transmitted pixel by pixel, so file size and download time are proportional to an image's dimensions. Vector graphics transmit instructions, which are then carried out by a logic device, so that file size and rendering speed are determined by the complexity of the instructions, not the size of the graphic. In various embodiments, various graphical techniques and data may be utilized for providing video content to an ECI including vector graphics, bit map images, movies, etc.

The state managers, 206 and 208, may each generate information that is sent to their history manager, 210 and 212, for dispute resolution and auditing purposes. In the event of a dispute, for example, a player may dispute an event that happened three games ago on the gaming machine when ECI 226 and ECI 228 were executing. The gaming machine 201 may include logic that enables the gaming machine to contact each host and request information regarding one or more states of the ECI it supported during the disputed game. The host may send the requested information to the gaming machine for display.

To enable for dispute resolution, the gaming machine 201 and the hosts 202 and 204 may exchange information, such as time stamps, game start time, game finish time, ECI start time, ECI finish time, event occurred at time A, etc., that enable content generated by each device and stored by the history manger to be recalled and correlated to one another. This information may be exchanged while the ECI is executing and then again later when requests for stored information are received by one of the hosts.

As an example of state history management and access, the gaming machine 201 may store a start and stop time for each game, whether one or more ECIs were executed during the game and when at least one ECI is executed during a particular game, information needed to contact the host that provided content for the ECI. Thus, the gaming machine 201 may be able to contact one of the hosts and request ECI states during a time period, which corresponds to a particular game. In response, the host may send the requested information to the gaming machine.

The gaming machine 201 may provide a number of shared resources 240 that may be utilized by an ECI, such as 226. For instance, in one embodiment, the gaming machine 240 may be operable to share a) processing resources from a processor, such as 240, b) memory 244 which may comprise volatile memory, such as RAM or non-volatile memory, such as flash memory or a hard drive, c) one or more displays, such as display A 246 or display B, 248, d) one or more communication interfaces, such as a network communication interface 250 or a wireless interface (not shown) that allows the gaming machine to communicate with wireless devices located proximate to the gaming machine 201, e) audio devices 252, such as speakers, amps and signal codecs for processing sound files, f) input/output devices, such as a touch screen 254 or card reader 256.

Prior to launching the ECI, a negotiation may take place between the gaming machines and one or more hosts in regards to the resources that may be utilized by the ECI while it is executed on the gaming machine. In one embodiment, when an ECI, such as 226, is shared or controlled by two or more hosts or where each host controls its own ECI but the ECIs share common resources and/or resource limitations based on the combined usage of resources used by the ECIs controlled by each host, a resource negotiation may take place between the two or more hosts to determine what resources are needed by each host. The host-to-host negotiation may allow the hosts to provide content/instructions to a shared ECI or to each of their ECIs in an integrated manner so that each host has enough resources to display their content/instructions on the shared ECI or each of their respective ECIs.

For example, if a first ECI controlled by a first host utilizes display 246 and a second ECI controlled by a second host utilizes display 246 each host may only need a portion of the display 246 rather than the whole display. If one or both hosts try to utilize the entire display then both hosts may not be able to have content displayed via their ECIs simultaneously. But, if the first and the second host agree to share the display by utilizing only a portion of it via a resource negotiation, then the first and second host may be able to display content via their ECIs on the display 246 at the same time. In general, the gaming machine may be the final arbiter of what resources are assigned to each ECI and the host-host negotiations may take place in the context of negotiations with the gaming machine.

In particular embodiments, the resource negotiators 222 and 224 may communicate with the resource manager 230 on the gaming machine 201 or each other to determine what resources are available for the ECI that each host controls, such as 226 or 228 or for an ECI which the hosts share. The one or more hosts may use this information to adjust the content that is sent to the gaming machine for its respective ECI. For instance, display 246 and display 248 may be of different sizes. Thus, at some times, a host may be provide access to display 246 and provide content to an ECI formatted to be compatible with the resolution of display 246 while at other times display 246 may not be available and the host may provide content formatted to be compatible with the resolution of display 248 (The content provided at different times to the displays 246 and 248 may be the same or different content). Further details of resource management are described with respect to at least FIGS. 3A and 3C.

In yet another embodiment, the hosts, 202 and 204, may compete for access to resources on the gaming machine. For example, host 202 may provide one advertising stream/content and host 204 may provide another advertising stream/content. The gaming machine may allow only one advertising stream/content at a time. Thus, the gaming machine 201 may initiate negotiations where access to its resources goes to the host that is the highest bidder.

The gaming machine may notify potential hosts when resources become available and solicit bids for the resources from two or more hosts. In one embodiment, while displaying content from one host the gaming machine 201 may receive a bid for resources from another host and switch access to the gaming machine from a first host, such as 202, to a second host, such as 204, after receiving a better bid for resources from the second host 202.

In yet another embodiment, the gaming machine 201 may provide information regarding various resource packages with various costs to potential hosts. The cost of a resource package may affect the amount of resources and priority of access of resources afforded to a host providing an ECI. For instance, access to a larger portion of a display that is shared may cost more than access to a smaller portion of the display. As another example, access to a display where control of the display is not to be switched to another host provided ECI or taken over by the gaming machine for a particular time period may cost more than sharing access to the display with another host and allowing the gaming machine to intermittently use the display.

The interface managers, 218 and 220, may be responsible for determining what content to send each ECI and sending the content. Further, the interface managers may be designed to respond to events generated on the gaming machine. For example, when interface manager 218 receives information indicating a touch screen has been activated on the gaming machine via the event manger 262, the interface 218 manager may determine whether the touch screen is activated in a display area that it controls and whether content displayed on ECI 226 needs to be adjusted. As another example, when the interface managers, 218 or 220, receive information regarding the resolution of a particular display and visual content is to be displayed, the interface managers, may select content stored on their respective host that is closet to a needed resolution, reformat (if needed) the content, generate new content to fit the resolution of the particular display or locate and/or download needed content from another source, such as another host.

In particular embodiments, an ECI and/or host may not be granted access to all of the features of the shared resources. For example, when the card reader is operable to read/write data to a card, such as a smart card. The ECI may be allowed to receive data read from a card but not write data to the card. In one embodiment, during the negotiation phase, the gaming machine may provide a) a list of available shared resources, b) features of the shared resources that may be controlled by the host directly and/or via an ECI including commands and data formats that allow the features to be utilized, c) under what conditions the features may be utilized, etc.

In one embodiment, the data formats, commands and/or instructions that an ECI or host may utilize may be incorporated in a communication protocol that is utilized by both the ECI and/or host and gaming machine (or gaming device). In particular embodiment, the commands/instructions that the ECI and the host may communicate to the gaming machine, such as to control a device, may be high-level commands that are translated by the gaming machine to low-level instructions that are used to actually perform the operation that is requested. For instance, to spin a bonus wheel coupled to the gaming machine, a host and/or ECI may send a "spin wheel" command to the gaming machine. The gaming machine may translate the command to a number of low-level instructions that a stepper motor coupled to the gaming machine to be controlled. In another embodiment, the ECI and/or host may be operable to provide low-level instructions that allow a device to be directly controlled. For instance, the ECI and/or host may be able to send the low-level instructions for controlling the stepper motor directly to the bonus wheel without needing the gaming machine to translate.

In a particular embodiment, the communications between the gaming machine and the host may be separated into two parts. The first part of the communications may include information regarding gaming machine transactions, such as money handling, metering, game outcomes, random number generation, player identification information. In general, the first part of the communications may include information that is generated as a result of game play from a primary game of chance executed on the gaming machine. In one embodiment, the gaming machine transaction information may be communicated using the G2S protocol approved by the Gaming Standards Association (Fremont, Calif.). The second part of the communications between the gaming machine and the host may enable the communications between the remote host and the ECI, such as commands, instructions and/or data sent between the remote host and the ECI, which may include content for the ECI to output.

One advantage separating the communications in this manner is that the ECI may be isolated from game play information. When the ECI is isolated from game play information, it may result in a more secure system. The higher level of security is based on the assumption that if a process executing on the gaming machine is unaware of game play information, such as the state of a game, it will more difficult for the process to affect the game in unacceptable manner. It is noted that although the ECI may not be aware of game play information, as described in the previous paragraph, the host may be aware of game play information.

The game play information described in the previous paragraph may be related to information generated as a result of play of a primary game of chance generated on the gaming machine. Further, in some embodiments, the ECI itself may provide the play of games separate from the primary game. Nevertheless, the ECI may not be aware that is providing the play of a game and may be still unaware of any game play information that is generated. From the perspective of the ECI, it is simply outputting content utilizing commands, instructions and data provided by a host where the ECI does not distinguish between game related content and non-game related content.

In particular embodiments, the ECI may be operable to process input generated as a result of the play of the game provided by the ECI but may not be operable to distinguish this input from other types of input, i.e., it may not be configured to determine the function associated with the input. For instance, the ECI may be instructed by the host to generate a bet button on a touch screen display for a game output utilizing the ECI. The ECI may be operable to receive input from the touch screen and determine that a particular button has been pressed. The ECI may forward this information to the host and the host may determine that this button corresponds to a bet button. The ECI may be unaware the button for a bet has been pressed or activated, i.e., it is unaware of the function of the button.

In particular embodiments, when an ECI and/or host is access or control is prohibited for one or more resources, such as utilizing a peripheral device or utilizing one of the features of the peripheral device coupled to the gaming machine, and the ECI and/or host generates an instruction that tries to utilize or control the resource, then the gaming machine may respond in various manners. For example, in one embodiment, if the device or device feature the ECI and/or host is trying to access or control is not critical, then the gaming machine may simply ignore the command or instruction and possibly notify the device that it is trying to perform a function that is not available to it. For instance, the ECI and/or host may send instructions to a gaming machine to flash lights when this function is not available to it, and the gaming machine may simply ignore the instructions.

In another embodiment, the ECI and/or host may try to access or control a critical device in a manner that is prohibited. For instance, ECI or host could try to send a command to a printer to print a cashless ticket of a particular value, which is not allowed. In some possible responses, the gaming machine may 1) log the event, 2) terminate the connection with the ECI, 3) enter a tilt state or 4) combinations thereof. Some details of tilt handling that may be utilized with various embodiments are described in U.S. Pat. No. 6,890,259, entitled, “Modular Tilt Handling,” which is incorporated by reference and for all purposes.

In particular embodiments, the available resources that may be utilized by a host as part of an ECI may vary from gaming device to gaming device. For example, a casino-type gaming machine with random number generation capability may have more capabilities that may be utilized in an ECI than a portable hand-held device. Further, in other embodiments, the capabilities of a gaming device, such as gaming machine 201, that may be offered to a host for utilization may vary depending on the host. For example, some hosts may be more trusted than other hosts and thus may be afforded greater access to devices on the gaming machine than other hosts.

During operation of an ECI, the gaming machine may check the resources utilized by an ECI to determine whether the resources utilized by the ECI are in compliance with limits established for the ECI, such as during the negotiation phase. The gaming machine 201 may utilize its local resource management 238 including the partition manager 256, the device scheduler 258 and the resource metering 260 on the gaming machine 201 to check the resource utilization of one or more ECIs individually or a group of ECIs in combination against resource allocations for each individual ECI or the group of ECIs. When resource allocation for an ECI is exceeded, a number of remedial actions may be taken. For instance, when CPU resources are exceeded, the ECI may be denied further CPU cycles and the display characteristics of the ECI may slow down and become jerky. Further, the gaming machine may notify the ECI that it has it exceeded it resource requirements. As another example, when resources are exceeded, the gaming machine may terminate a session with the host and stop execution of the ECI on the gaming machine. The execution of the ECI may be stopped permanently or may be stopped temporarily until more resources become available on the gaming or until the host adjusts the content of the ECI.

As examples, an ECI may exceed its allocated resources because the gaming machine downwardly adjusted the resources available to the ECI after the start of an ECI session or because the host didn’t correctly estimate an amount of resources it needed. In response to learning it is exceeding resources it has been allocated on the gaming machine, the host, such as 202 or 204, may adjust their content to consume less resources on the gaming machine. In particular embodiments, the hosts, such as 202 and 204, may be operable to dynamically adjust the content that is sent to the gaming machine for utilization by an ECI after a session has been initiated (at the start of the session an initial resource allocation may be specified) 1) to satisfy changing resource allocations on the gaming machine, which may change, and thus, to prevent it from exceeding its resource allocation.

Since the manner in which an ECI and/or host may be allowed to access or utilize a gaming machine may vary, such as from one host to another, from one time to another and different gaming machine may have different capabilities (e.g., a gaming machine may have different capabilities than a portable), the gaming machine may include logic for checking instructions and/or data received from an ECI and/or host to comply with their access privileges. For example for illustrative purposes only as a communication protocol does not have to be utilized, when the instructions and/or data are codified in a communication protocol, the gaming machine may first check to see whether the instructions and/or data is a recognized part of the protocol. Then, even if the instructions and/or data is part of the protocol, the gaming machine may not offer the capability requested, thus compatibility of instructions and/or data with the gaming machine capabilities may be checked (At the negotiation phase, the instructions and/or data that the gaming machine is capable of utilizing, which may be a subset of the instructions and/or data that may be communicated as part of the communication protocol may be established.) Then, the instructions and/or data may be checked against the access privileges for the particular ECI and/or host. For each host and its associated ECI, information regarding resource access privileges may be stored (The information may have been generated at the negotiation phase or at some other time). The privilege and/or error checking may be performed by the privilege checking logic 274 in the local resource management 238.

Resource Allocation

Figure 3A:
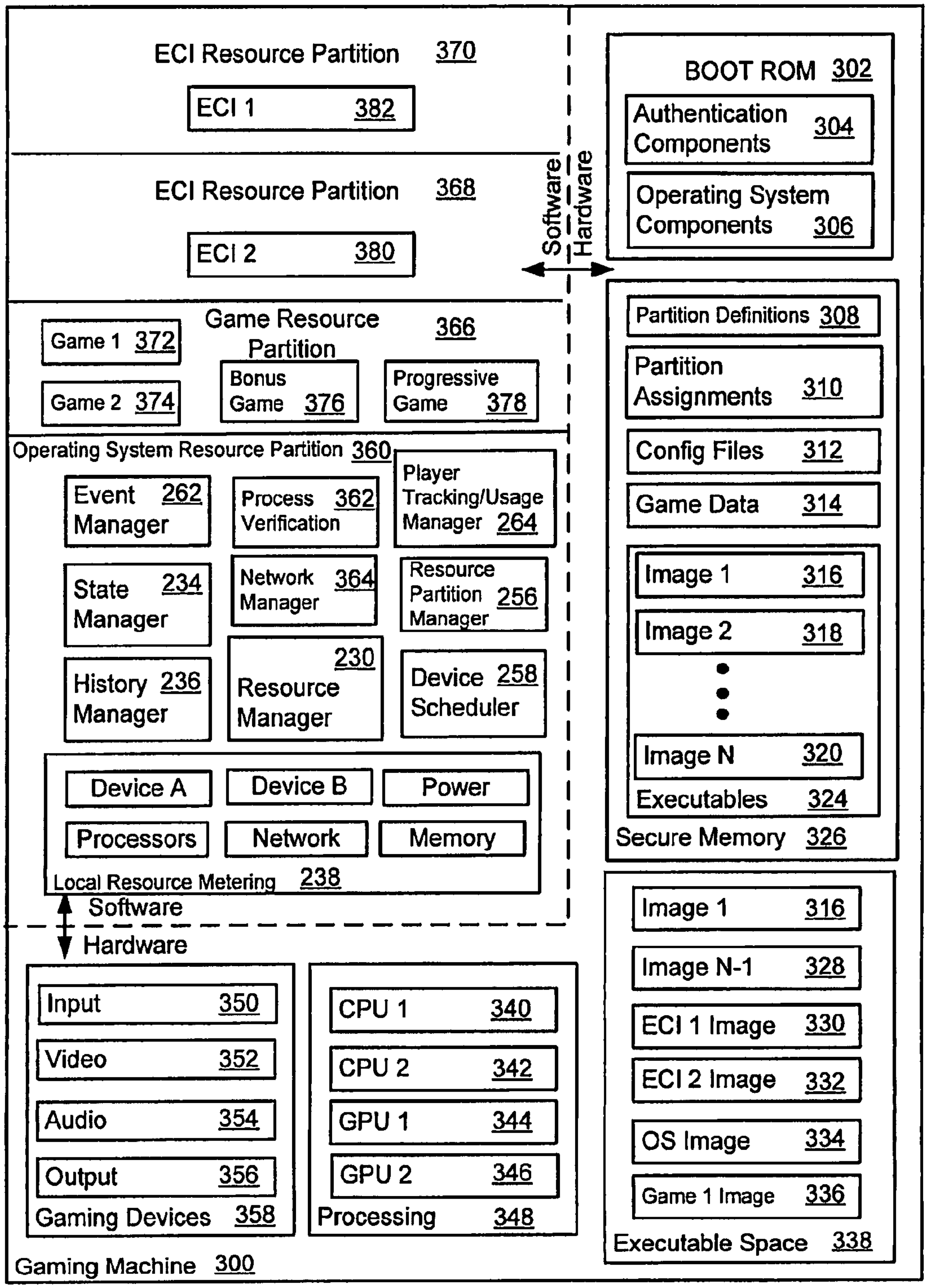
FIGS. 3A, 3B, and 3C are block diagrams showing hardware and software components and their interactions on a gaming machine for embodiments of the present invention.
Figure 3B:
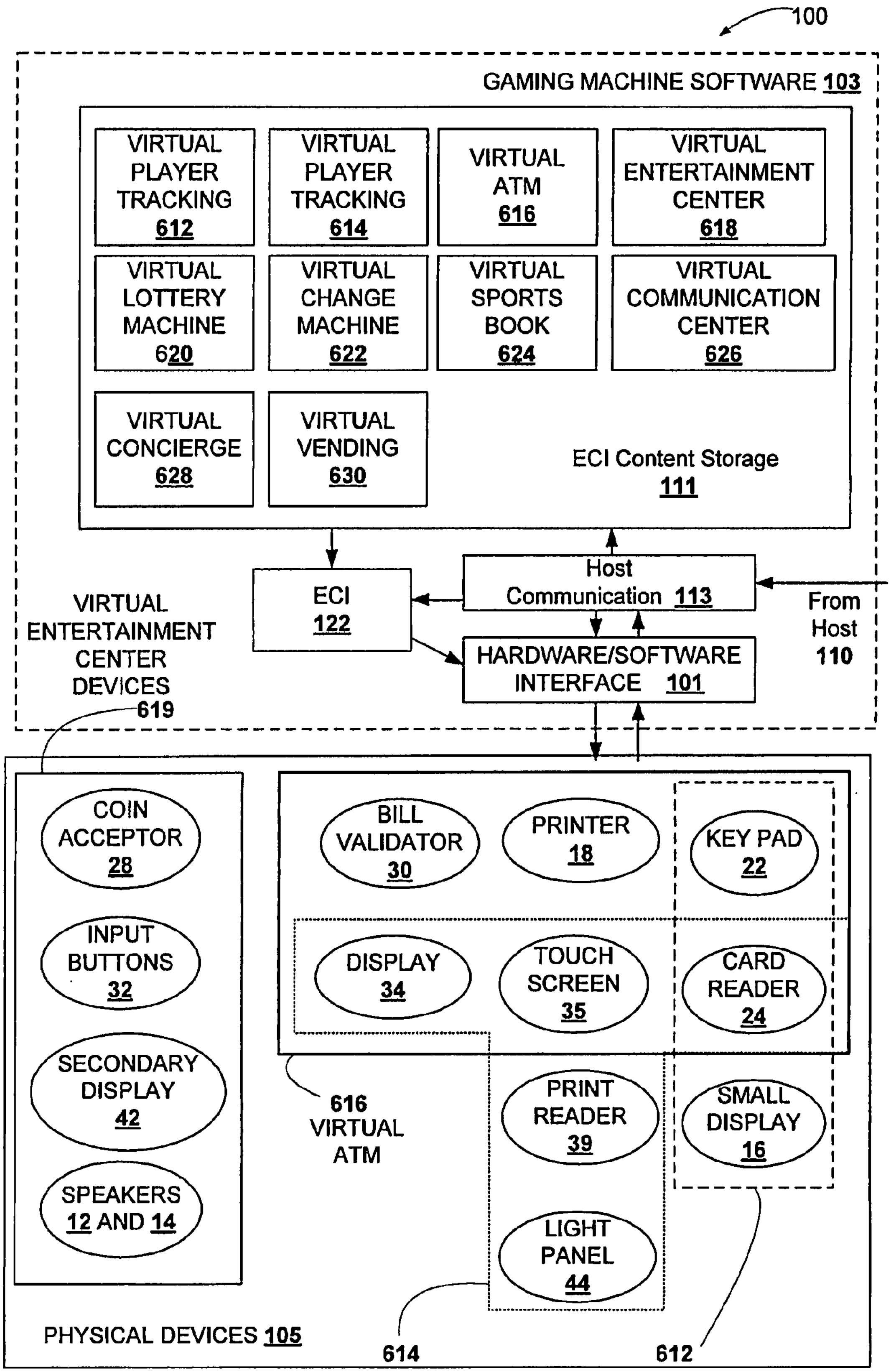
Figure 3C:
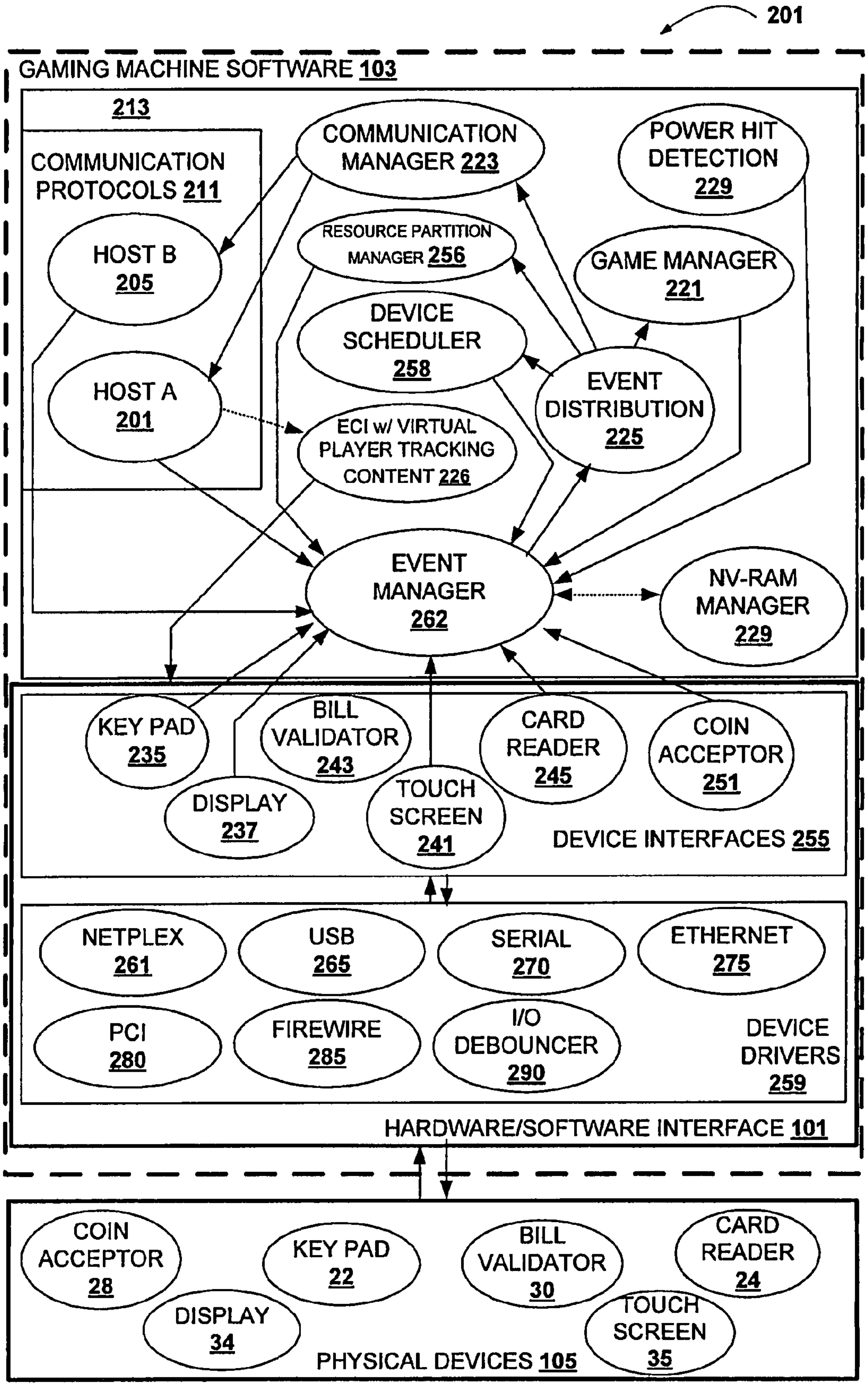

FIGS. 3A to 3C is a block diagram showing hardware and software components and their interactions on a gaming machine for embodiments of the present invention. In embodiments of the present invention, the operating system may maintain “resource partitions.” A resource partition may be logical abstraction implemented in the operating system logic that enables the operating system to monitor and limit the resources used by all of the process or process threads executing in each resource partition. At any given time, a resource partition may include one or more member processes or member process threads. For example, in one embodiment of the present invention, a QNX operating system (Ottawa, Canada) may be employed. With QNX, each thread of execution may be individually assigned to a different resource partition. Thus, one process may have several threads each running in different partitions. In general, the operating system may be a POSIX compliant operating system, such as Unix and Linux variants, Windows™ NT, 2000, XP, Vista, etc.

Resource partitioning is one example or aspect of virtualization. Virtualization is the process of presenting a logical grouping or subset of computing resources so that they can be accessed in ways that give benefits over the original configuration. In particular, virtualization may provide techniques for hiding the physical characteristics of computing resources from the way in which other systems, applications, or end users interact with those resources. These techniques may include making a single physical resource (such as a server, an operating system, an application, or storage device) appear to function as multiple logical resources; or it can include making multiple physical resources (such as storage devices or servers) appear as a single logical resource. Virtualization may refer to the abstraction of resources in many different aspects of computing and may include virtual machines and systems management software. Thus, the examples of resource partitioning and other virtualization examples are provided for illustrative purposes only and are not intended to limit the invention to virtualizations providing only resource partitioning or the other examples of virtualization mentioned herein.

As noted above, threads may be assigned to different partitions in some embodiments of the present invention. A thread may be short for a thread of execution. Threads are a way for a program to split itself into two or more simultaneously (or pseudo-simultaneously) running tasks. Threads and processes differ from one operating system to another, but in general, the way that a thread is created and shares its resources may be different from the way a process does.

Multiple threads may be executed in parallel on many computer systems. This multithreading may be provided by time slicing, where a single processor switches between different threads, in which case the processing is not literally simultaneous, for the single processor is only really doing one thing at a time. This switching can happen so fast as to give the illusion of simultaneity to an end user. For instance, a typical computing device may contain only one processor, but multiple programs can be run at once, such as an ECI for player tracking alongside an a game program; though the user experiences these things as simultaneous, in truth, the processor may be quickly switching back and forth between these separate threads. On a multiprocessor system, threading can be achieved via multiprocessing, wherein different threads can run literally simultaneously on different processors.

In embodiments of the present invention, multiprocessor systems with multiple CPUs may be used in conjunction with multiprocessing. For example, an ECI process or ECI thread may be executed on one or more CPUs while a game is executed on one or more different CPUs. In a particular embodiment, in a multiprocessor system, CPU accessibility may be limited according to the application. For instance, ECIs may be only executed on certain processors and games on other processors. The ECIs may be prevented from utilizing processors dedicated to executing games or other applications.

Threads are distinguished from traditional multi-tasking operating system processes in that processes are typically independent, carry considerable state information, have separate address spaces, and interact only through system-provided inter-process communication mechanisms. Multiple threads, on the other hand, typically share the state information of a single process, and share memory and other resources directly. Although, as noted above, threads of the same process may be assigned to different resource partitions. Context switching between threads in the same process may be typically faster than context switching between processes.

In general, the term, "process" refers to a manipulation of data on a device, such as a computer. The data may be "processed" in a number of manners, such as by using logical instructions instantiated in hardware, by executing programming logic using a processor, or combinations thereof. Thus, a "process" for the purposes of this specification may describe one or more logical components instantiated as hardware, software or combinations thereof that may be utilized to allow data to be manipulated in some manner. Therefore, the terms "process" and "process thread" as described are provided for the purposes of clarity only and are not meant to be limiting.

Four resource partitions, 360, 366, 368 and 370 are illustrated in FIG. 3A. An operating system resource partition 360 that includes processes (or process threads) executed by the operating system. A game resource partition 366 from which game processes (or process threads) are executed. An ECI resource partition 382 from which a first ECI process 382 (or ECI process thread) may be executed and an ECI resource partition 368 from which a second ECI process 380 (or ECI process thread) may be executed. As noted above, resource partitioning may be performed at the process level, the process thread level or combinations thereof.

In one embodiment, resource partition definitions 308, such as resources allocated to each resource partition and processes that are enabled to execute in each partition (e.g. partition assignments 310) may be stored in the secure memory 326. Data stored in the secure memory may have been authenticated using the authentication components 304 stored on the Boot ROM 302. When a process is launched by the operating system, it may check to see which resource partition to assign the process using the partition assignments 310, which may include a list of processes that may be executed in each partition. In one embodiment, some processes may be assigned to more than one resource partition. Thus, when the resources associated with a first resource partition are being fully utilized, the process may be executed from a second resource partition with available resources.

In another embodiment, the partition assignment information may be stored with each executable image, such as images, 316, 318 and 320. When a process or process thread is launched, the operating system may determine which partition to assign the process or the process thread (In general, each process will have at least one process thread). With this method, new executable images may be downloaded to the gaming machine from a device that are not listed in the partition assignments 310 and still be assigned to a resource partition.

In a particular embodiment, the operating system may only allow one ECI process or ECI process thread to execute in a partition at one time. In other embodiments, a plurality of ECI processes may be executed from a single partition at one time. When only a single ECI process is allowed to execute from a partition at one time, the amount of resources available to the ECI process occupying the partition may be more predictable. This type of architecture may be valuable when ECIs are provided from two or more different hosts simultaneously where each host does not necessarily know the resource requirements utilized by an ECI from another host. When two or more ECIs are allowed to occupy a single partition and execute simultaneously, the resources provide to each ECI, respectively, may be more vary more if each respective ECI is competing for a limited amount of resources.

The resource competition may be become more acute when the resources needed by two or more ECIs are near or greater than one or more resources (e.g., CPU cycles or memory) provided in a partition. In some embodiments, the gaming machine may prioritize resource utilization by each ECI process. For instance, an execution priority may be assigned to each ECI process executing in a resource partition such that based on the priority one ECI process is favored over another ECI process when they are both competing for resources.

The priority assigned to each ECI process may be based on another factors. A priority to resources may be assigned to an ECI process based upon its function. For instance, an ECI for providing a bonus interface may be given a higher priority to resources than an ECI for providing advertising. In another embodiment, a priority may be assigned to an ECI process in accordance with a price paid to allow the ECI process and its content to be presented on the gaming device. In general, prioritization for utilizing resources is another way of providing virtualization on a gaming device.

Resources that may be monitored and limited for each partition include but are not limited CPU usage, memory usage, such as RAM usage, NV-RAM usage, disk memory usage, etc., GPU (graphics processing usage), network bandwidth, sound card usage and access to gaming devices, such as displays, audio devices, card readers, bill validators (e.g., as described with respect to FIG. 2, for some resource partitions, for security purposes, access to certain devices, such as bill validators and cashless devices, or device features may not be available). Resources that may be monitored on the gaming machine 300 include the executable space 338, the processing devices 348, the gaming devices 358 and the secure memory 326. The local resource metering process 238 may monitor resource usage for each partition. In FIG. 3A, the local resource metering process 238 is shown monitoring, device A, device B, network bandwidth usage, processor usage of processors, 340 and 342, power usage, and memory usage.

The local resource metering process 238 may report information to the resource partition manager 256. In particular embodiments, based upon limits placed on each resource partition, the resource partition manager 256 may prevent new processes from executing in a particular resource partition or may even terminate certain processes to free up resources processes executing in other partitions. For example, if the output of the game on the gaming machine 300 is less than optimal because of the resources utilized by the ECI 380 or ECI 382, the gaming machine may suspend execution or terminate execution of one or both of the ECI 380 or ECI 382.

In particular embodiments of the present invention, prior to enabling a host to control an ECI on the gaming machine 300 and based on its resource partitioning system, the gaming machine 300 may notify the host of information regarding the resources it may have available to use while the ECI it wishes to control is executing on the gaming machine 300. In one embodiment, the resource manager 230 may report this information to the host. In another embodiment, the gaming machine may broadcast its available resources to a plurality of hosts that may control an ECI on the gaming machine 300. These messages may be broadcast at regular intervals and change depending on a current resource utilization on the gaming machine.

The resource information may include information regarding an upper limit of resources that may be available (e.g., a maximum of 10% CPU usage, 100 MB of RAM), a lower limit of resources that may be available (e.g., a minimum of 5% CPU usage, 50 MB of RAM, no audio capabilities), a prediction of a range of resources that may be available over time (e.g., at least 400×300 pixel window with periodic access to a 1600×1200 pixel window and at least 4 channels of 32 channel sound card with periodic access to all channels), a prediction of platform performance based on the available resources (e.g., an output frame rate of 25 frames per second at 60 Hz screen refresh rate using 16 bits of color). An upper and lower limit of resources may be provided because the resources available on the gaming machine may change with time while an ECI is executing.

Additional partitioning information may include a display mode, such as a translucent overlay of the game screen or a display location (e.g., left third of the display screen). Further, information sent to the host may include game theme, graphics and sound information currently executing on the gaming machine 300. The host may utilize this information to customize content for an ECI executing on the gaming machine 300 that is thematically consistent with a game executing on the gaming machine 300.

In addition, the gaming machine may send file information to the host information regarding files, such as application files executed by an ECI, stored in the resource partitions. The files may have been previously downloaded from the host or a different host at an earlier. One or more files or information/data/commands within the one or more files may be of use to the host and thus, the host may structure a download based on the file information. For instance, the host may download files/data/content that is only needed in addition to the files/data/content already stored on the gaming machine.

In response to the resource information it receives from the gaming machine, the host may determine whether the resources are adequate to output the content it wishes to present on the gaming machine via the ECI. In some embodiments, the host may adjust the content to output via the ECI to account for the available resources. For instance, when resources are limited, pre-rendered images, 2-D graphics or vector-based graphics may be used instead of dynamically rendered 3-D graphics. As another example, if network traffic is high, such that the network bandwidth is limited, the host may reduce the amount of data sent to gaming machine. Details of graphical related apparatus and methods that may be utilized in embodiments of the present invention are described with respect to U.S. Pat. No. 6,887,157, filed Aug. 9, 2001, by LeMay, et al., and entitled, "Virtual Cameras and 3-D gaming environments in a gaming machine," which is incorporated herein and for all purposes.

In a particular embodiment, the host may request additional resources than the gaming machine 300 has said are available. In response, the gaming machine 300 may temporarily create a resource partition, such as 370 or 368, or another type of virtualization (e.g., a virtual machine) that enables the host to access the additional requested resources while the ECI is executed. In other embodiments, the resources available on the gaming machine may not be suitable for the content that the host has available and the host may decide not to control an ECI, such as 382 or 380.

One advantage of using a virtualization, such as resource partitions, may be that a host in control of an ECI on a gaming machine may be enabled to control of resources while guaranteeing adequate game performance. A gaming machine operator always wants a game player to be presented with a quality game experience including presentations with desirable graphics and sounds. If providing access to gaming machine resources via an ECI results in an excessive degradation of the game experience (e.g., the graphics become jagged or jumpy), then sharing of gaming resources using an ECI would not be desirable. New gaming machine are becoming increasingly powerful in their capabilities. The use of ECIs in combination with resource partitioning enables under utilized gaming machine resources to be used in an effective manner while insuring that a quality game experience is always is provided to a game player.

Another advantage of using a virtualization, such as resource partitions, may be that testing requirements related to the development of game software and ECI software may be simplified. One method of ensuring a quality game experience is maintained on a gaming device while a game process for generating a game is executing on the gaming device while one or more ECI processes are executing is to extensively test the one or more ECI processes and game process under a variety of conditions. Testing every possible ECI process in combination with one or more possible ECI process in conjunction with every different game variation quickly becomes very unattractive in terms of both cost and time.

Using virtualization, where the maximum resources allowed to be utilized by one or more ECI processes are prevented from exceeding a set limit, the gaming software for generating a game on the gaming machine may be tested where a maximum resource utilization allowed for the one or more ECI processes is simulated while the game is being executed. The game may be tested under a variety of operational conditions, such as when it is using a maximum number of CPU cycles or graphic processor cycles, to ensure that the generated game is adequate at the maximum resource utilization condition allowed for the one or more ECI processes. After the testing, it may be concluded that the game performance will be adequate for any combination of one or more ECI processes using up to the maximum allowable resources for the ECIs. Thus, new ECI processes may be developed after the game is released without having to test the performance of the game in combination with each new ECI.

In addition, each ECI process may be tested to determine whether they perform adequately under various resource conditions up to the maximum resources allowed for a single ECI on a gaming device. This process may allow ECI developers to develop and test ECIs and associated content that are appropriate for different resource ranges up to the maximum allowed resources without needing to test them in combination with each possible game. Further, the developer may develop multiple ECIs and associated content to perform a particular function using different amount of resources with the knowledge that each ECI will perform adequately after testing. For example, a first ECI may use vector graphics to provide an animation, which requires less memory and allows for a faster download time, as compared to a second ECI that uses pre-rendered bitmaps to provide the animation where the function of the first and second ECI are the same.

As described above, in regards to virtualization, the present invention is not limited to resource partitioning. Other examples of virtualization that may be employed in embodiments of the present invention are described as follows. Via Intel's Virtualization Technology (or the corresponding AMD technology), these microprocessor vendors have introduced features in their micro-architectures that may improve the processor's ability to run multiple operating systems and applications as independent virtual machines. Using this virtualization technology, one computer system can appear to be multiple "virtual" systems. Thus, in various embodiments, a gaming environment utilizing virtual gaming machines where the operating systems may vary from virtual gaming machine to virtual gaming machine may be employed. In a particular embodiment, a virtual gaming machine may use a core of a multi-core processor.

A virtual gaming machine may use a virtual machine monitor (VMM) A virtual machine monitor may be a host program that allows a single computer to support multiple, identical execution environments. All the users may see their systems as self-contained computers isolated from other users, even though every user is served by the same machine. In this context, a virtual machine may be an operating system (OS) that may be managed by an underlying control program.

Low interrupt latency, direct access to specialized I/O, and the assurance that a VMM will not "time slice away" the determinism and priority of real-time tasks may be important for a real-time virtual gaming machine used in a gaming environment. In one embodiment of the present invention, the combination of multi-core CPUs and Intel VT or a related technology may be used to build a real-time hypervisor based on dynamic virtualization.

A real-time hypervisor may be a VMM that uses hardware virtualization technology to isolate and simultaneously host general-purpose operating systems and real-time operating systems. Unlike a static virtualization, the dynamic virtualization implemented by a real-time hypervisor may use an "early start" technique, to take control of the hardware platform. Thus, operating systems may only be allowed to "boot" only after the real-time hypervisor has constructed a virtual machine for them. The guest operating system may be associated with a particular game provided by a software provider. Thus, in the present invention, a gaming platform may support games provided by multiple software vendors where different games may be compatible with different operating systems.

In the processors that include Intel VT an overarching operating-mode has been added, called VMX root, where a hypervisor executes with final control of the CPU hardware. A hypervisor that uses Intel VT may intercept key supervisor-mode operations executed by any software operating outside of VMX root without requiring a prior knowledge of the guest OS binaries or internals. Using this Intel VT hardware assist for virtualization, one may build a hypervisor VMM that hosts protected-mode operating systems executing in ring 0 without giving up control of key CPU resources. Also, Intel VT provides a way for the VMM to implement virtual interrupts.

In the present invention, static and dynamic virtualization may be used. Nevertheless, two advantages to building a multi-OS real-time system by using dynamic virtualization rather than static virtualization may be: first, a wide range of operating systems, both general-purpose and real-time, may be supported and, second, the boot sequence for each guest OS may be under the control of the hypervisor. The second advantage means it may possible, in embodiments of the present invention, to restart one guest OS while other guest operating systems continue to run without interruption.

TenAsys provides an example of a hypervisor that may be used in embodiments of the present invention. The hypervisor may be capable of supporting the demands of a Real-time operating system (RTOS) while simultaneously hosting a general-purpose operating system (GPOS), like Windows or Linux. The hypervisor may enhance real-time application responsiveness and reliability in a "multi-OS, single-platform" environment, by providing control over interrupt latency and partitioning of I/O resources between multiple guest operating systems.

In various embodiments, the hypervisor may be used to distinguish between resources that may be multiplexed by the VMM and those that are exclusive to a virtual machine. For example, When user interface I/O is not associated with time-critical events, input devices like the keyboard, mouse, console, disk, and an enterprise Ethernet interface may be multiplexed and shared between all virtual machines. However, hardware that is specific to a real-time control application, such as a video capture card, fieldbus interface, or an Ethernet NIC designated for communication with real-time I/O devices, may not be multiplexed between virtual machines. Using the hypervisor, specialized real-time I/O may be dedicated to its real-time virtual machine, so the RTOS and application using that I/O can maintain real-time determinism and control.

In one embodiment of a VMM some or all of the memory in each virtual machine may be swapped to disk, in order to more efficiently allocate limited physical RAM among multiple virtual machines. In another embodiment, a real-time hypervisor may be used to guarantee that each real-time virtual machine is locked into physical RAM, and is never swapped to disk. This approach may be used to insure that every real-time event is serviced consistently, with deterministic timing. In yet another embodiment, the hypervisor may used to dedicate a core in a multi-core processor to a virtual machine, such as a virtual gaming machine.

FIG. 3B is a block diagram of a gaming machine 100 including hardware and software components for one embodiment of the present invention. The gaming machine 100 may include RNG software or the gaming machine 100 may be a terminal in a central determination system where the random numbers are generated in a device other than the gaming machine or combinations thereof (see at least FIGS. 6 and 7 for more possible gaming machine/device embodiments). ECIs that may be used in conjunction with various gaming devices coupled to, or in communication with, the gaming machine to provide gaming services on the gaming machine 100 under control of a host are described. The ECI's may be a component of gaming machine software 103 and may be executed as processes by a gaming operating system on the gaming machine 100 (see at least FIGS. 1A and 4).

In one embodiment, the gaming operating system is part of the master gaming controller of the gaming machine. The master gaming controller also controls the play of a game of chance on the gaming machine 100. In another embodiment, logic devices separate from the master gaming controller, such as a logic device on a player tracking unit, may also be used to execute the ECI processes.

In one such embodiment, a player tracking unit including a logic device executing an operating system and coupled to the gaming machine may also be used to host ECI processes controlled by host that includes a logic device. That is, the gaming machine disclosed herein may be associated with or otherwise integrated with one or more player tracking systems. In this embodiment, the gaming machine and/or player tracking system tracks the player's gaming activity at the gaming machine. In one such embodiment, the gaming machine and/or associated player tracking system timely tracks when a player inserts their player tracking card to begin a gaming session and also timely tracks when a player removes their player tracking card when concluding play for that gaming session. In another embodiment, rather than requiring a player to insert a player tracking card, the gaming machine may utilize one or more portable devices carried by a player, such as a cell phone, a radio frequency identification tag or any other suitable wireless device to track when a player begins and ends a gaming session. In another embodiment, the gaming machine may utilize any suitable biometric technology or ticket technology to track when a player begins and ends a gaming session.

During one or more gaming sessions, the gaming machine and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In another such embodiment, the host maintains or keeps track of the play and/or other activity on or relating to the gaming machines in the gaming system. In one embodiment, the host keeps track of the play on each gaming machine including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. In another embodiment, each gaming machine includes a separate coin-in, wager meter or pool which tracks the total or partial coin-in or wagers placed at that gaming machine. It should be appreciated that the player playing a designed gaming machine may change during this tracking and that this tracking can be independent of the specific player playing the designated gaming machine. It should be further appreciated that the wagers placed may be tracked in any suitable compatible or comparable manner such as credits wagered (i.e., if all of the system gaming machines are of the same denomination) or monetary units (e.g., total dollars or other currency) wagered. It should be further appreciated that tracking in monetary units may account for gaming machines having multi-denominations and/or for gaming machines of different denominations and/or gaming machines which accept different currencies.

Via the host communication 113, the ECI 124 may receive content from a host 110. As described with respect to at least FIG. 2, a first ECI may receive content from a first host and a second ECI may receive content from a second host. In a particular embodiment, the content received from the host 110 comprises video and/or audio content that may be output on display devices, such as 16, 34, and 42 and audio devices, such as 12 and 14, coupled to the gaming machine 100. Further, the host 110 may send via the host communication 113 instructions for controlling the physical devices 105 and also receive input from the physical devices 105. The host 110 may send via the host communication 113 content/instructions to the ECI and instructions for controlling one or more of the physical devices 105. The instructions for the physical devices 105 from the host 110 may be routed from the host communication to the hardware/software interface 101 and then to the physical devices 105.

A program, such as an Adobe™ flash player or compatible player, may be used to output content received from the host. The program may be used to output content for a number of different game services, such as player tracking, ATM, communications, lottery, concierge, reservations and entertainment. In some embodiments, the gaming machine may not store content related to a particular ECI. After the ECI is launched, the ECI may loaded into a memory device or a protected memory space on the gaming machine 100, then the gaming machine 100 may load content received from the host directly into volatile memory. After the ECI is terminated, the downloaded content associate with the ECI may be lost and the volatile memory used by the ECI may be assigned to other processes. In one embodiment, streaming of information, such as video and audio information, may be employed.

In one embodiment, the memory device of the gaming machine includes, but is not limited to, random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming machine disclosed herein. In one alternative embodiment, part or all of the program code and/or operating data described above can be stored in a detachable or removable memory device, including, but not limited to, a suitable cartridge, disk, CD ROM, DVD, flash memory, or USB memory device.

In another embodiment, the content associated with a particular ECI may be loaded into volatile memory but may also be stored to a non-volatile memory, such as disk memory or flash memory. In FIG. 3B, content related to a number of ECI's is stored on the gaming machine and illustrated as ECI content storage 111. An advantage of this approach is that when a host provides a game service multiple times on the gaming machine 100, the host may be able to use some content previously stored on the gaming machine and thus, reduce a size of a download that is needed to provide the game service.

Storage of previously used ECI content, such as ECI content storage 111, may lead to additional communications between the host 110 and the gaming machine 100. For example, the host 110 and the gaming machine 100 may comprise logic that enables the host 110 to 1) determine and validate the ECI content 111 stored on the gaming machine 100 and 2) direct the ECI 122 to load content from the ECI content storage 111. The ECI 122 may load content storage 111 in combination with content received directly from the host 110 to provide a game service.

In another example, the host 110 and/or the gaming machine 100 may comprise logic that determines what content to save to the ECI content storage 111 and what content to delete from the ECI content storage 111. In one embodiment, content may be deleted from the ECI content storage 111 when a storage limit is reached. In another embodiment, content may be deleted when it becomes old or outdated. The host may send information to gaming machine that prioritizes what content to delete first. Thus, for example, when a storage limit is reached, the gaming machine may delete content with a lower priority prior to deleting content with a higher priority. In another example, stored content may relate to upcoming events that may eventually pass or linked to a holiday period that may pass. As another example, the stored content may be simply changed to maintain player interest. In yet another example, the gaming machine track a last time content was utilized or a frequency of utilization and delete content items that were last used a long time ago versus recently used content items or delete content items that are used more frequently before deleting content items used less frequently.

ECI Applications

Examples stored ECI content include but are not limited to 1) virtual player tracking 612 and 614 which may be used to provide player tracking services, 2) a virtual Automatic Teller Machine (ATM) 616 which may enable the gaming machine to provide fund transfers and monetary account management, 3) a virtual entertainment center 618 which may enable the gaming machine to provide one or more entertainment services besides game play to the game player, 4) a virtual lottery machine 620 that may enable a player to purchase a lottery ticket of some sort at the gaming machine, 5) a virtual change machine 622 that may enable a player to obtain change at a gaming machine, 6) a virtual sports book 624 that may enable a player to make a wager on an event at the gaming machine, to monitor events, to receive results and to cash out a winning event ticket, 7) a virtual communication center 625 that may enable a player to a) communicate with other game players, other individuals or a casino host, b) send and receive e-messages and/or c) locate other players, 8) a virtual concierge 628 that enables a player to a) learn about and obtain various hotel/casino, restaurant, entertainment and travel services and b) make reservations, 9) a virtual vending machine 628 that enables a player to purchase various vending items at the gaming machine and 10) a virtual kiosk (not shown) that enables for a) Internet enabled services, such as web-browsing, b) registration services such as for a loyalty program and c) comping and prize redemption associated with a loyalty program. As is described above, the ECI content does not have to be permanently stored on the gaming machine and may be received directly from the host 110 and stored temporarily in a non-volatile memory, such as a RAM while the ECI 124 is executed. Additional applications that may be adapted to provide embodiments using ECIs on a gaming machine are described with respect to U.S. Pat. No. 6,712,698, titled, "Game Service interfaces for Player Tracking Touch Screen Display," originally filed, Sep. 20, 2001, U.S. Pat. No. 6,942,574, entitled, "Method and Apparatus for Providing Entertainment Content on a Gaming machine," originally filed Sep. 19, 2000 and U.S. Pat. No. 6,997,803, entitled, "Virtual Gaming Peripherals for a gaming machine, originally filed Mar. 12, 2002 each of which are incorporated herein by reference and for all purposes.

The virtual vending machine 628 may enable a gaming machine to dispense items directly to the player, enable the player to order an item, which is brought to the player or sent to the player, or dispense a media that is redeemable for the item. In addition, the virtual vending machine 628 may be used to redeem or order prizes or merchandise. The virtual player tracking ECI's, 612 and 614, may be used to provide player tracking services. Addition details of player tracking services that may be incorporated into an ECI are described in co-pending U.S. application Ser. No. 09/642,192, filed Aug. 18, 2000, by LeMay, et al. and entitled, "Virtual Player Tracking and Related Services," which is incorporated herein in its entirety and for all purposes.

As described above, the ECI may output its content to a combination of gaming devices in the physical gaming devices 105 to provide a gaming service and present its content. In one embodiment, the ECI process may control or issue commands to devices and the host controlling the ECI may also issue commands to physical devices in conjunction with the ECI. Four examples of gaming device combinations are shown for illustrative purposes. The device combinations utilized by an ECI and a host may vary according to the gaming devices available on a particular gaming machine.

As an example of device combinations that may be used with an ECI and a host 110, the host may control the virtual ATM ECI 616 in conjunction the bill validator 30, the printer 18, the key pad 22, the display 34, the card reader 24 and the touch screen 35 to provide ATM services. The card reader 22 may be used to accept an ATM card. The key pad 22 may be used to enter a pin number. The bill validator 30 may be used to accept cash or printed tickets with a cash value. Funds entered into the gaming machine may be transferred to a bank account. The display 34 and the touch screen 35 may be used to display and select various ATM services. The printer 18 may be used to provide receipts and print cashless tickets, which may be used for game play in other gaming machines.

A virtual sports book ECI 624 and the virtual lottery machine ECI 620 may also provide services using the combination of devices described for the virtual ATM ECI 616. However, the context in which the devices are used may be different. For instance, the printer 18 may be used to print a lottery ticket for the virtual lottery machine 620 and a wager ticket for the virtual sports book 164 instead of a receipt. Also, the display 34 and touch screen 35 may be used to display and make lottery and sports bets selections instead of ATM selections. Logic residing on the host 110 may enable it determine the context the device is being used.

As another example, a virtual entertainment center peripheral ECI 618 may control a payment or coin acceptor 28, input buttons 32, the secondary display 42 and speakers 12 and 14 to provide entertainment sources to a player. In one embodiment, the virtual entertainment center ECI 618 may act as a musical video jukebox. Using the input buttons 32, a player may select musical videos, which are output on the secondary display 42 and speakers 12 and 14. In another embodiment, the player may be able to select a musical format, which is output on speakers 12 and 14. In yet another embodiment, the player may be able to watch a sporting event on the secondary display while playing a game on the gaming machine. In some cases, the player may be required to deposit money via the payment acceptor 28 to use the virtual entertainment center.

In yet another embodiment, a player may be enabled to win or purchase entertainment content and then download the entertainment content to a portable device carried by the player. An interface for communicating with the portable device, such as a wireless interface, may be coupled to the gaming machine to enable the download to the portable device. In another example, the player may receive a voucher valid for the entertainment content that is redeemable at another location.

In yet another example of a gaming service provided by an ECI, a virtual player tracking ECI, such as 612 and 614, may be used to provide player tracking services. Different combinations of gaming devices may be used to provide the same gaming service. For instance, the first virtual player tracking ECI 612 uses the key pad 22, the card reader 24 and the small display 16 to provide player tracking services. In another embodiment, instead of the small display 16, a portion of the large display 34, may also be used to output player tracking information.

To start a player tracking session, as described above, the player may insert a player tracking card in the card reader 24, enter a PIN number using the key pad 22 and receive player tracking information via the small display 16. The second virtual player tracking ECI 614 uses the display 34, the touch screen 35, the card reader 24, a finger print reader 39 and a light panel 44. To start a player tracking session, the player may insert a player tracking card in the card reader 24, provides finger print information via the print reader 39 and receives player tracking information via the display 34. Using the touch screen 35, the player may be able to select choices from player tracking service menus and interfaces displayed on the display 34, enter a PIN or provide other alphanumeric input. The light panel 44 may be used to convey to a player operational information. For example, the light panel may change color or flash when a player has inserted their player tracking card incorrectly in the gaming machine.

In one embodiment, one or more ECI processes described above are available to non-player tracking carded players. In one such embodiment, the gaming system provides one or more ECI processes to a non-carded player and informs the player of the different ECI processes that would become available to the player if the player were to obtain a player tracking card. In one embodiment, the gaming system enables the player to enroll in the player tracking system at the gaming machine.

In the present invention, one or more ECI processes and game play processes on the gaming machine may share the same gaming device. For instance, the card reader 24 may be used by the virtual ATM ECI 616, the first virtual player tracking peripheral 612 and the second virtual player tracking peripheral 614. As another example, the bill validator 30 may be used by the virtual ATM peripheral 616 and by the master gaming controller on the gaming machine.

Traditionally, gaming devices have not been shared by different software elements or processes executing on the gaming machine and the functions of a particular gaming device have been fairly limited. For example, card readers on gaming machine are typically used only to read player tracking information from player tracking cards. Further, the card readers have been in player tracking units with a separate logic device from the master gaming controller that provide control and have not been accessible to a master gaming controller on the gaming machine. As another example, the bill validator 30 is typically used only to insert credits into the gaming machine. Thus, conflicts between different gaming processes wishing to use a gaming device at the same time have not generally had to be considered on gaming machines.

Since a given gaming device may be shared by multiple software entities, the context in which a given device is being used may be important. For example, a player tracking session may be usually initiated when a player inserts a player tracking card into the card reader 24. When a card is inserted into the card reader 24, one of the virtual player tracking peripherals (e.g., 612 or 614) may detect the insertion of the card and initiate the player tracking session. When the virtual ATM peripheral 116 is active, the player may insert an ATM card into the card reader 24 to begin ATM services (inserting the card may also activate the ATM peripheral if it is not active). Thus, one possible scenario using the card reader 24 is that the player has requested an ATM service, the virtual ATM peripheral 116 may be given control of the card reader 24 and the virtual ATM peripheral 116 is waiting for the player to insert an ATM card into the card reader 24. If the player mistakenly inserts a player tracking card into the card reader 24, the virtual ATM peripheral 116 may generate an error because the player tracking card is not an ATM card. In another embodiment, the gaming system disclosed herein may enable credits to be downloaded from a player's account via a player tracking card (and utilizing a designated pin specific to that player). When the virtual ATM peripheral 116 and the virtual player tracking peripheral (112 or 114) may be operating simultaneously, logic on the gaming machine may be required to determine in the situation described above whether a player tracking session is to be initiated or an error is to be generated.

In a particular embodiment, an ECI process executing on the gaming machine may be limited to only outputting video and/or audio content. For instance, the ECI may be limited to outputting only video content on a portion of display 34 and audio content on speakers 12 and 14. In another example, the ECI may be limited to outputting only video content on a portion of display 34.

Operating System

In general, when a gaming device is shared by two or more entities, such as two or more ECI's or an ECI and another gaming process executed on the gaming machine, and when situations occur where the two or more entities may want to simultaneously use the same shared gaming device, shared gaming device logic may be required to arbitrate control of the shared gaming device. In traditional gaming machines, arbitrating control of a shared gaming device is generally not an issue because most gaming devices are usually either controlled by a single process or used for a single purpose. Control of the shared gaming device may be determined according to the context in which the device is being used. For instance, using the payment acceptor 28 in the context of entering credits to the gaming machine may be given priority over using the coin acceptor in the context to make change using the virtual change machine 622 or to purchase items from the gaming machine using the virtual vending machine 628. Device scheduling and resource management are described with respect to at least FIGS. 2 and 3A.

FIG. 3C is a block diagram illustrating further details relating to the hardware and software shown in FIG. 3B for one embodiment of the present invention. An exemplary software architecture including a number of processes that may be executed by the operating system 213 are shown. The ECI w/virtual player tracking content 226 is a "process" executed by an operating system 213 residing on the gaming machine. In a particular embodiment, a protected "process" may be defined as a separate software execution module that is protected by the operating system and executed by a logic device on the master gaming controller 224. When a process, including the ECI 226, is protected, other software processes or software units executed by the master gaming controller cannot access the memory of the protected process. A process may include one or more process threads associated by the process.

The operating system 213 used to implement the gaming software architecture of the present invention may be one of a number of commercially available operating systems, such as QNX by QNX Software Systems, LTD of Kanata, Ontario, Canada which is Unix-like, Windows NT, 2000, XP, Vista by Microsoft Corporation of Redmond, Wash. or Linux or a Linux variant, such as by Redhat, Durham, N.C., which is an open source Unix based operating system. Different operating systems may use different definitions of processes. In QNX, the processes are protected. With other operating systems, a “process” may be dedicated logic that is executed. Using different operating systems, many different implementations of the present invention are possible and the present invention is not limited to the constraints of a particular operating system.

A few details of the processes that may be executed on gaming machines of the present invention are as follows. The NV-RAM manager 229 controls access to the non-volatile memory on the gaming machine. By using the NV-RAM manager 229, the gaming processes may share the non-volatile memory resource at the same time. Thus, the non-volatile memory usage is optimally used which may lower the costs associated with adding new functions to the gaming machine. In some embodiments, ECI processes may be prevented from accessing non-volatile memory for security purposes in other embodiments the ECI processes may be enabled to send and receive information stored in a non-volatile memory on the gaming machine.

Other processes that may be considered part of the operating system include but are not limited to a communication manager 223, a partition manager 256, an event manager 263, a game manager 221, a power hit detection process 228, a device scheduler 258 and an ECI process 226, which for illustrative purposes provides player tracking content. The player tracking ECI process 226 in conjunction with logic executed on a host may be used to provide player tracking services using the card reader 24, the key pad 22, the fingerprint reader 39 and the light panel 44 as described with respect to FIG. 3B.

The device scheduler 258 may be used to arbitrate control and manage the usage of one or more shared devices on the gaming machine. A “shared device” may refer to a physical device on the gaming machine that may be used in different contexts for multiple purposes. For instance, the display 34 may be used to output the results of a game of chance generated on the gaming machine via the game manager 221 and may be used to output player tracking content from player tracking ECI 226. The game manager process 221 and the ECI 226 may at times use the display 34 at the same time to control a varying portion of the display including a control of the entire display area. The device scheduler 258 may be used to determine which process under what circumstances is given access to how much of the display 34.

As described above with respect to FIG. 3C, the device scheduler 258 process may arbitrate requests, in particular concurrent requests, to use a shared gaming device, such as the display 34, from the different gaming processes executed by the gaming operating system or requests from processes executed on a host and determine which entity is given access to the shared gaming device, based on priority settings. For example, processes related to the output of the game of chance may be given a higher priority than ECI processes. Thus, when the game manager 221 needs control of the entire display 34, the ECI process 226 may lose access to the display 34 or may not be given access to the display in the first place.

In a particular embodiment, player inputs may affect access to a shared device. In one embodiment, an input switch or other type of input mechanism may be provided on the gaming machine that enables an ECI to be displayed or hidden. Thus, when a player actuates the switch, the gaming machine may allow or not allow the ECI to access the shared display. The gaming machine may have a default position, such as to allow an ECI to be generated or not generated in response to a player input, which may be changed by an input received on the gaming machine. The gaming machine may return to the default position after certain events, such as but not limited to the credits reaching zero on the gaming machine, a player tracking card being inserted/removed, determining that a player playing the gaming machine has changed or after a time period has expired.

In some instance, the gaming machine may override the player's selection not to provide the ECI. For instance, when input has been provided that indicates the player does not wish to see the ECI, the gaming machine may allow an ECI to access particular resources, such as a display, intermittently, such as in response to certain events. Thus, briefly or for some time period, the gaming machine may allow the ECI to generate its interface and then after the time period is expired, not allow the ECI to generate its interface. For instance, after a cash out request, the gaming machine may allow an ECI that provides promotional credits that may keep the player playing to be displayed even though an input had previously been received at the gaming machine indicating that the player didn't wish to see an ECI.

The device scheduler 258 may also include logic for determining when to route information received from a physical device 105 via the hardware/software interface 101 to a host. For example, after an ECI process is launched and access is granted to a portion of touch screen display, input from the touch screen corresponding to the portion of the display controlled by the ECI may need to be routed to a host remote. Although, as previously noted with respect to at least FIGS. 1A-1C, the ECI may also include information handling capabilities that allow it to process and route information received from one of the physical devices.

In FIG. 3C, raw data received from a device, such as the touch screen 35 or card reader 24, may be posted as an event to the event manager 262 via a device driver in 259 for the touch screen or card reader and a device interface 255, such as a touch screen device interface 241 or card reader interface 245. As an example, the device scheduler 258 may see the event and determine that touch screen input has been received and post an event indicating that this information is to be copied and sent to a host. The communication manager 223 may see the event posted by the device scheduler 256 and send the information to a host using an appropriate communication protocol 211. For example, a host A may communicate using the host A protocol 203 while a host B may communicate using the host B protocol 205. The gaming devices of the present invention may be operable to implement wireless and wired protocols of both a proprietary nature (e.g., Netplex, which is an IGT proprietary protocol) or non-proprietary nature (USB, Wi-fi, IEEE 1394-compatable, Ethernet as well as protocols approved by the Gaming Standards Association-GSA, Fremont, Calif., such as SAS, G2S or S2S).

The device scheduler 262 may incorporate logic of varying degrees of complexity to route information received from an input device to a host. For example, in one embodiment, after an ECI has been instantiated and its relation to one or more devices determined, the scheduler 262 may check to determine whether input has been received from the one or more devices of interest to the host. When input is received from one or more devices of interest to the host associated with the ECI, such as the touch screen input described in the preceding paragraph, the input may be routed to host.

After the host receives the input, it determines whether the input is of interest and what response to make. For example, the host may not control the portion of the display from which the input was received and, thus, determine a response is not necessary. On the other hand, as described with respect to at least FIGS. 1A to 1C, the host may determine that the input is from an area on the display controlled by the host via the ECI, then send new content to the ECI to displayed on the gaming machine and/or additional instructions to the ECI control what content it is to output (e.g., the content may have already been downloaded to the gaming machine that is needed for output in response to the touch screen input and the host may instruct the ECI to output it).

In addition to sending content and/or instructions to the ECI 226 in response to receiving input from a physical device, the host may send instructions to the gaming machine that affect its operation. The host may send an event that is routed via the event manager 262 to one or more other processes. For example, the host may send an instruction to add credits to the gaming machine, which may cause a credit meter to increment and a display of the credits to be adjusted. As previously described, with at least respect to FIG. 2, the gaming machine may provide logic (not shown) for checking whether the host is allowed to provide a particular event. For example, all hosts may not be allowed to increment credits on the gaming machine. In another embodiment, the host may send an event that triggers a feature in a game to be unlocked, which affects the output of the game on the game interface. The game manager 221 may receive this information via the event manager 262 and event distribution.

As noted above, the device scheduler 258 or some other process executing on the gaming machine, may include more complex logic for determining what information received from a physical device to route to the host. For instance, for each device of interest to the host, the device scheduler 258 may have the capability to examine the input information and determine whether it of interest to the host. For example, the device scheduler may be able to determine whether the touch screen input is in the area controlled by the host and only route input received from this area. In another example, the host may be providing player tracking services but not ATM services, thus when a player tracking card is inserted into the card reader 24, the device scheduler 258 may determine that it is a player tracking card and route it to the host. When a credit card is inserted into the card reader 24, the device scheduler 258 may determine, the card is credit card and not route the information to the host.

In a particular embodiment, for each shared gaming device, a separate device scheduler process 258 may be used to arbitrate control of the shared gaming device, assess information received from the shared gaming device and direct the information to other processes and host devices. As another example, a device scheduler process 258 may be used to arbitrate control of multiple shared gaming devices. In general, a gaming machine may include multiple device scheduler processes that each manage one or more shared gaming devices.

As described in more detail below, the device scheduler 258 may listen to and respond to game events passed through the event manager 262 and event distribution 225 and more specifically to events that are requests for any of its known contexts to enter or exit. A context may be described as a situation defined in logic where a process may request control of a particular shared gaming device. A process, such as a via one or more process threads, may generate contexts for more than shared gaming device. For instance, the ECI process 226 in conjunction with processes with its associated host may generate contexts for the display 34, the touch screen 35, the card reader 24 and the light panel 44. The display 34, the touch screen 35, the card reader 24 and the light panel 44 may all be shared gaming devices. There are at least two circumstances under which the shared device manager 115 may grant control of the shared gaming device: 1) the current context is finished using the shared gaming device or 2) a higher priority context requires access to the shared gaming device.

Event based requests are one method of controlling access to a shared gaming device. Another method is arbitrated requests that are sent directly to a device scheduler 258 or a similar process. In embodiments of the present invention, event based request, arbitrated request or combinations thereof may be used.

The display 34 is one example of a gaming device that may also be a shared gaming device. Contexts that may request access to the display screen 34 include but are not limited to: a) a menu context that displays machine menu for maintenance situations, b) a tilt context that displays tilts including hand pays for tilt situations, c) a game context that displays regular game play, bonus games and cash outs, d) an attract context that displays attract menus in attract situations, and e) a main menu context that displays a game selection menu and other game service menus available on the gaming machine. The contexts for the display 34 may be generated by various gaming processes active on the gaming machine. For instance, in one embodiment, game service menu contexts may be generated by one or more ECIs, such as the player tracking ECI process 226. As another example, the game manager process 226 may generate the game context. Thus, the display 34 may be a device that may be shared multiple times. A practical limit may be applied to the display 34 or any other shared gaming device to keep the resource from being entirely exhausted.

The contexts described above for the display 34 may be prioritized. In one embodiment, the priorities for the display may be prioritized in descending order from highest to lowest, as the machine menu context, the tilt context, the game context, bonus game context, ECI context, the attract context and the main menu context. When the display is divided into different areas all or a portion of the contexts listed above may apply. For instance, the tilt context may apply for all areas. Thus, when the gaming machine enters a tilt state the tilt context may take over the entire display including all areas in which the display has been sub-divided. As another example, certain games or bonus games may use the entire screen at certain times and may be given priority over an ECI context or attract context for the portion of the screen used by the ECI context. In other embodiments, the game context and bonus game context may use a dedicated portion of the display 34 and may not compete with the ECI context for display resources.

In general, the priorities assigned to contexts for a shared gaming device are fixed. However, variable priorities may also be used for some contexts of the shared gaming device. As an example, the priorities of attract mode contexts generated by different ECIs may be increased or decreased as a function of time to emphasize a particular game service. Thus, a priority for an attract mode context for a particular game service provided by a ECI may be increased at particular times such that the attract mode context is displayed more often than other attract mode contexts generated by other ECI processes during the time when its priority is increased. For example, an attract mode context that enables a patron to make a dinner reservation or an entertainment reservation may be emphasized more by increasing its priority in the early afternoon or at other times when the patron may desire these services.

Returning to FIG. 3C, the gaming machine software 201 may comprise communication protocols 211, an event manager 262 and event distribution 225, device interfaces 255, device drivers 259, the game manager 221 which interfaces with gaming processes used to generate the game of chance, game resources such as a power Hit Detection Manager 229, which monitors gaming power, the NV-RAM manager 229 and the communication manager 223, which may be used by other processes, the ECI's, such as ECI 226, the device scheduler process 258 that arbitrates control of one or more shared gaming devices and the resource partition manager 256, which monitors resource usage by different resource partitions as described with respect to FIG. 3A.

The software modules comprising the gaming machine software 201 may be loaded into memory of the master gaming controller 46 (see at least FIGS. 3A and 6) of the gaming machine at the time of initialization of the gaming machine. The game operating system (OS) may be used to load and unload the gaming software modules from a mass storage device on the gaming machine into RAM for execution as processes on the gaming machine. The gaming OS may also maintain a directory structure, monitor the status of processes and schedule the processes for execution. During game play on the gaming machine, the gaming OS may load and unload processes from RAM in a dynamic manner. The gaming OS, associated processes and related gaming data may be authenticated in verified on the gaming machine. Details of the authentication method and apparatus that may be used with the present invention are described in U.S. Pat. Nos. 5,643,086, 6,149,522, 6,620,047, 6,106,396, by Alcorn, et, al., each of which is incorporated by reference and for all purposes. Details of software verification methods that may be used with the present invention are described in U.S. Pat. No. 6,685,567, entitled, "Process verification," filed Aug. 8, 2001, which is incorporated herein by reference and for all purposes.

The NV-RAM manager 229 may be a protected process on the gaming machine to maintain the integrity of the non-volatile memory space on the gaming machine. All access to the non-volatile memory may be through the NV-RAM manager 229 via a defined API. During execution of the gaming machine software 100, the non-volatile manager 229 may receive access requests via the event manager 262 from other processes, including a resource partition manager 256, a game manager 221, an ECI process 226 and one or more device interfaces 255 to store or retrieve data in the physical non-volatile memory space. Other software units that request to read, write or query blocks of memory in the non-volatile memory are referred to as clients.

The device interfaces 255, including a key pad 235, a display 237, a card reader 245, a coin acceptor 251, a bill validator 243 and a touch screen 241, are software units that provide an interface between the device drivers and the gaming processes active on the gaming machine. The device interfaces 255 may receive commands from virtual gaming peripherals requesting an operation for one of the physical devices. For example, in one context, the player tracking ECI process 226 may send a command to the display interface 237 requesting that a message of some type be displayed on the display 34. The display interface 237 sends the message to the device driver for the display 34. The device driver for the display communicates the command and message to the display 34 enabling the display 34 to display the message. When the display 34 may be controlled by more than one gaming process (e.g., the game manager 221 may use the display 34 to present the game of chance), the device scheduler 258 or a similar process may assign a priority to the context generated by the player tracking ECI process 226 and grant control of the display 34 to the context depending on whether the display 34 is currently in use. If the display 34 is in use, the device scheduler 258 may determine whether the current context using the device should be switched out for the context generated by the player tracking ECI process 226.

The device interfaces 255 also receive events from the physical devices. In general, events may be received by the device interfaces 255 by polling or direct communication. The solid black arrows indicate event paths between the various software units. Using polling, the device interfaces 255 regularly communicate with the physical devices 105 via the device drivers 259 requesting whether an event has occurred or not. Typically, the device drivers 259 do not perform any high level event handling. For example, using polling, the card reader 245 device interface may regularly send a message to the card reader physical device 24 asking whether a card has been inserted into the card reader.

Using direct communication, an interrupt or signal indicating an event has occurred, may be sent to the device interfaces 255 via the device drivers 259 when the physical devices need to communicate information. For example, when a card is inserted into the card reader, the card reader 24 may send a "card-in message" to the device interface for the card reader 245 indicating a card has been inserted which may be posted to the event manager 262. The card-in message may be an event. Other examples of events which may be received from one of the physical devices 105 by a device interface, include 1) Main door/Drop door/Cash door openings and closings, 2) Bill insert message with the denomination of the bill, 3) Hopper tilt, 4) Bill jam, 5) Reel tilt, 6) Coin in and Coin out tilts, 7) Power loss, 8) Card insert, 9) Card removal, 10) Promotional card insert, 11) Promotional card removal, 12) Jackpot, 13) Abandoned card and 14) touch screen activated.

Typically, the event may be an encapsulated information packet of some type posted by the device interface. The event has a "source" and one or more "destinations." Each event contains a standard header with additional information attached to the header. The additional information may be typically used in some manner at the destination for the event.

As an example, the source of the card-in game event may be the card reader 24. The destinations for the card-in game event may be a bank manager (not shown), which manages credit transfers to the gaming machine, the communication manager 223 and the player tracking ECI 226. The communication manager 223 may communicate information read from the card to one or more devices located outside the gaming machine, such as a host. When the magnetic striped card is used to deposit credits into the gaming machine, the bank manager may prompt the card reader 24 via the card reader device interface 255 to perform additional operations. When the magnetic striped card is used to initiate a player tracking session, the player tracking ECI 226 or a host may prompt the card reader 24 via the card reader device interface 255 to perform additional operations related to player tracking. Since multiple contexts may be applied to the card-in event, a device scheduler, such as 258, may be used to determine which context is granted control of the gaming device. For example, the device scheduler 258 may grant control of the card reader to either bank manager 222, the ECI 226 or the host (not shown).

An event may be created when an input is detected by one of the device interfaces 255. Events may also be created by one process and sent to another process. For example, when the device scheduler 258 grants control of one shared gaming device to a context, an event may be generated. Further, as previously described, events may also be generated from entities located outside the gaming machine. For example, a host may send an event to the gaming machine, via the communication manager 223. The events may be distributed to one or more destinations via a queued delivery system using the event distribution software process 225. However, since the game events may be distributed to more than one destination, or simply broadcast to the processes executing, the events differ from a device command or a device signal which is typically a point to point communication such as a function call within a program or inter-process communication between processes.

Since the source of the event, which may be a device interface or a host outside of the gaming machine, is not usually directly connected to destination of the event, the event manager 262 acts as an interface between the source and the one or more event destinations. After the source posts the event, the source returns back to performing its intended function. For example, the source may be a device interface polling a hardware device. The event manager 262 processes the game event posted by the source and places the game event in one or more queues for delivery. The event manager 262 may prioritize each event and place it in a different queue depending on the priority assigned to the event. For example, critical game events may be placed in a list with a number of critical game transactions stored in the NV-RAM as part of a state in a state-based transaction system executed on the gaming machine.

After the event manager receives an event, the event may be sent to event distribution 225 in the gaming system 213. Event distribution 225 broadcasts the event to the destination software units that may operate on the event. The operations on the events may trigger one or more access requests to the NV-RAM via the NV-RAM manager 229. Further, when one or more software units may request control of a shared gaming device in response to the event, then a device scheduler, such as 258, may be used to arbitrate the request.

As another example of event processing, when a player enters a bill into the gaming machine using the bill validator 30, this event may arrive at the bank manager after the event has passed through the device drivers 259, the bill validator device interface 240, the event manager 262, and the event distribution 225 where information regarding the event such as the bill denomination may be sent to the NV-RAM manager 229 by the event manager 262. After receiving the event, the bank manager evaluates the event and determines whether a response is required to the event. For example, the bank manager 222 may decide to increment the amount of credits on the machine according to the bill denomination entered into the bill validator 30. Further, the bank manager 222 may request control of the bill validator. When the bill validator 30 is a shared gaming device, the device scheduler 258 may arbitrate the request to use the bill validator 30. Thus, one function of the bank manager software and other software units that are executed as processes on the gaming machine may be as an event evaluator.

More generally, in response to the event, the bank manager or other processes on the gaming machine may 1) generate a new event and post it to the event manager 262, 2) send a command to the device interfaces 255, 3) send a command or information to the host via the communication manager using one of the communication protocols, 4) do nothing or 5) perform combinations of 1), 2) and 3).

Non-volatile memory may be accessed via the NV-RAM manager 229 via commands sent to the gaming machine from devices located outside of the gaming machine. For instance, an accounting server or a wide area progressive server may poll the non-volatile memory to obtain information on the cash flow of a particular gaming machine. The cash flow polling may be carried out via continual queries to the non-volatile memory via game events sent to the event manager 262 and then to the NV-RAM manager 229. The polling may require translation of messages from the accounting server or the wide area progressive server using communication protocol translators 211 residing on the gaming machine.

The communication protocols typically translate information from one communication format to another communication format. For example, a gaming machine may utilize one communication format while a host providing ECI services may utilize a second communication format. The communication protocols 211 may translate the information from one communication format to another enabling information to be sent and received from the server.

The power hit detection process 229 monitors the gaming machine for power fluctuations. The power hit detection process 229 may be stored in a memory different from the memory storing the rest of the gaming machine software 103. When the power hit detection software 229 detects that a power failure of some type may be imminent, an event may be sent to the event manger 230 indicating a power failure has occurred. This event may be posted to the event distribution software 225, which broadcasts the message to all of the processes and devices within the gaming machine that may be affected by a power failure. If time is available, the event may also be sent to processes executing on a host.

Device interfaces 255 are utilized with the gaming machine software 213 so that changes in the device driver software do not affect the gaming system software 213 or even the device interface software 255. For example, the gaming events and commands that each physical device 105 sends and receives may be standardized so that all the physical devices 105 send and receive the same commands and the same gaming events. Thus, when one of the physical devices 105 is replaced, a new device driver 259 may be required to communicate with the physical device. However, device interfaces 255 and gaming machine system software 213 remain unchanged. When the new physical device requires a different amount of NV-RAM from the old physical device, an advantage of the NV-RAM manager 229 may be that the new space may be easily allocated in the non-volatile memory without reinitializing the NV-RAM. Thus, the physical devices 105 utilized for player tracking services may be easily exchanged or upgraded with minimal software modifications.

The various software elements described herein (e.g., the device drivers, device interfaces, communication protocols, etc.) may be implemented as software objects or other executable blocks of code or script. In a preferred embodiment, the elements are implemented as C++ objects. The event manager, event distribution, software player tracking unit and other gaming system 213 software may also by implemented as C++ objects. Each are compiled as individual processes and communicate via events and/or interprocess communication (IPC). Event formats and IPC formats may be defined as part of one or more Application Program Interfaces (APIs) used on the gaming machine. This method of implementation is compatible with the QNX operating system.

The operating system and its components have been described in the context of a gaming machine. A master gaming controller 46 on the gaming machine may include the operating system (see at least FIG. 6). The present invention is not so limited. Gaming processes may also be activated by operating systems executed by logic devices different from the master gaming controller on the gaming machine. For instance, a gaming peripheral, such as a player tracking unit, mounted to a gaming machine may include a logic device that executes an operating system. The operating system on the gaming peripheral may be the same or different from the operating system executing on the master gaming controller on the gaming machine.

The gaming peripheral may comprise one or more gaming devices. Like the gaming machine activating a process that controls gaming devices located on the gaming peripheral, the logic device on the gaming peripheral may activate processes that control gaming devices located on the gaming peripheral and the gaming machine. Further, like the gaming machine, the gaming machine may execute ECI processes under control of a host. In another embodiment, the gaming peripheral may act as a host to an ECI process executed on the gaming machine. For instance, a player tracking unit coupled to the gaming machine may act as the host for the player tracking ECI process 226 executed on the gaming machine. In yet another embodiment, the gaming machine may act as a host to an ECI process executing on another gaming device, such as another gaming machine.

Host—Gaming Machine Interaction

Figure 4A:
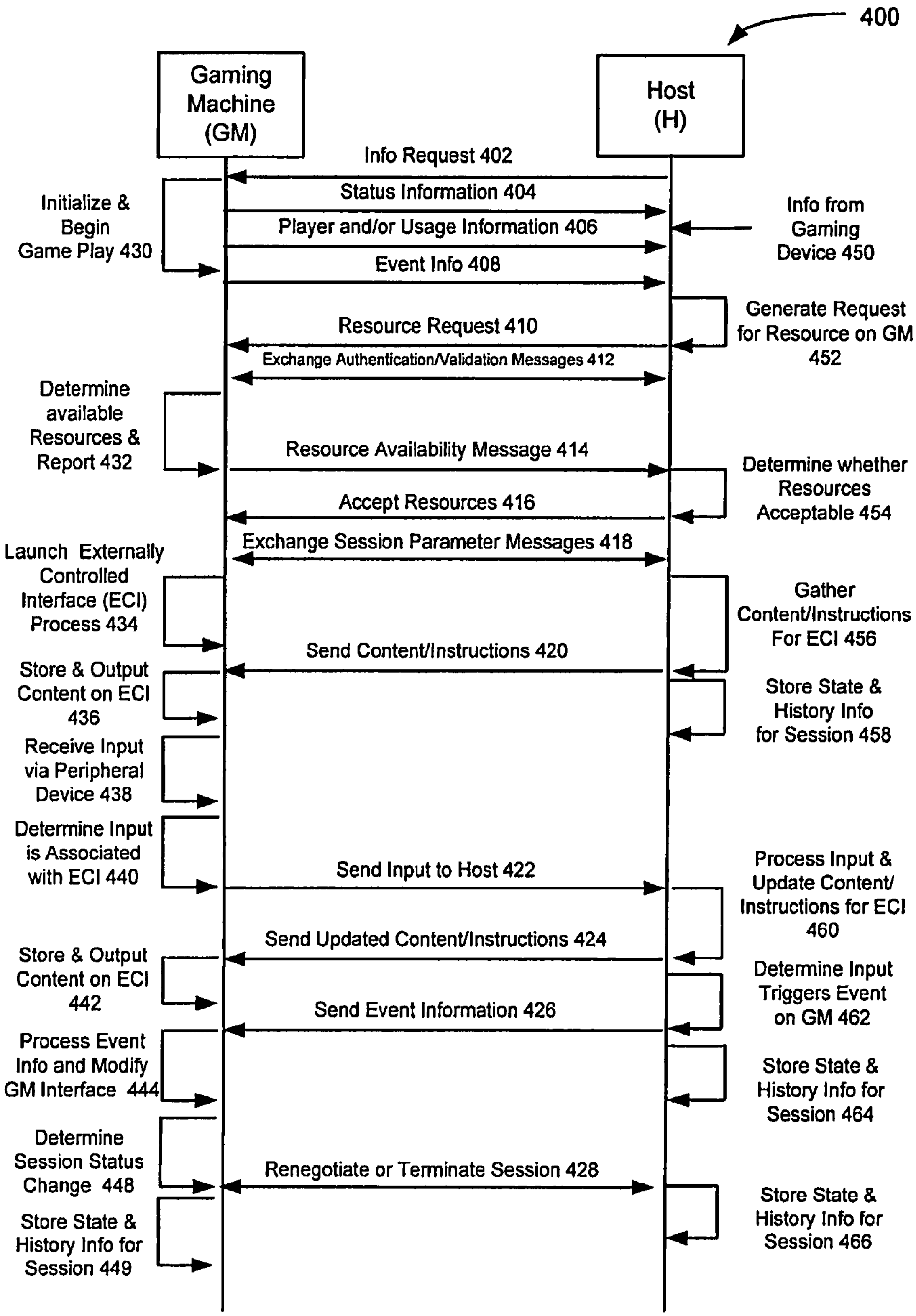
FIG. 4A is an interaction diagram between a host and gaming machine for one embodiment of the present invention.

FIG. 4A is an interaction diagram 400 between a host and gaming machine for one embodiment of the present invention. The gaming machine may be operable to provide access to resources that may be controlled by the host, e.g., as part of an ECI described above with at least respect to FIGS. 1A to 3C. In 430, the gaming machines powers up and becomes available for game play. At some time, the gaming machine may establish a relationship with a host. For example, in one embodiment, as part of an initialization phase on the gaming machine, a communication link may be established between gaming machine and the host. When a communication link is established between the gaming machine and the remote, the gaming machine and host may exchange authentication/validation messages 412 that enable both the gaming machine and the host to determine that the communications are from a valid source. This process may utilize methods known in the art, such as exchanging information encrypted or signed with public and private key pairs.

After a communication link is established between the host and the gaming machine, information may be exchanged between the devices that may be used to determine when to trigger an instantiation of an ECI on the gaming machine. In different embodiments, information requests may be initiated by a host in 402 or may be initiated by the gaming machine. The information requests may be event driven, may occur at regular intervals as a result of polling messages initiated at the host or the gaming machine, may occur according to an agreed upon schedule or combinations thereof.

Different types of information needed to determine when to instantiate an ECI may be communicated. For instance, in 404, the gaming machine may send status information regarding its current status, such as idle or active, to the host. As another example, in 406 the gaming machine may send player and/or usage information, such as coin-in and coin-out, to the host. In yet another example, the event information, such as a request for a game service on the gaming machine, may be sent to the host that triggers a launch of the ECI.

In particular embodiment, the host may receive useful information indirectly. For example, a player tracking session may be initiated on the gaming machine that causes a communication link to be established between the gaming machine and a player tracking server. In response, the gaming machine may send information indicating that a player tracking session has been initiated. In response, the host may contact the player tracking server and in 450 receive information from the player tracking server. In another embodiment, after a communication link may be established with the gaming machine, the player tracking server may automatically contact the host and send information to the host in 450.

The information received from the player tracking server may be used to determine whether to launch an ECI on the gaming machine. Further, when the ECI is launched, the information received from the player tracking server and/or the gaming machine may be used to customize the content output by the ECI on the gaming machine. For example, the content may be customized according to known player preferences. In another example, the content may be customized according to a status of the player, which may be determined from their game play history. Further, the player tracking server may send or the host may store operator preferences regarding content or promotions that the operator wants to output via the ECI. The operator preferences may also be used to customize the ECI on the gaming machine.

In another embodiment, the gaming machine may send information to servers in which it does not have an established formal communication relationship. For example, when the gaming machine is idle, the gaming machine may broadcast its status to one or more hosts on a local area network. In response to the broadcast, one or more hosts may determine that they wish to output content on the gaming machine during the idle period and contact the gaming machine. In 402, the hosts may contact the gaming machines to request additional information, which may be publicly available to devices on the network or in 410, the host may initiate a resource request 410 for control of resources on the gaming machine. Prior to exchanging information regarding parameters of the resource request, such as a status of resources that may be available for control by the host in 414, the gaming machine and the host may exchange information used by each device for authentication and validation purposes. Further details of interactions between the host and the gaming machine are described in the figure for one embodiment of the present invention.

In 454, the host may evaluate the resource limitations provided by the gaming machine and determine whether it can provide content that is suitable for the resource limitations available on the gaming machine. When the host determines the resource limitations are acceptable, in 416, it may send a message indicating it wishes to initiate a session between the host and the gaming machine.

In 418, after receiving this message, the host and the gaming machine may exchange one or more session parameter messages including information such as a time stamp, clock information so that their clocks may be synchronized, device identification etc. In one embodiment, the information in the one or more session parameter messages may be utilized to identify state information stored on the host pertaining to the session between the host and the gaming machine in a manner that allows the state of the gaming machine and the state of an ECI generally corresponding to the state of gaming at a particular time or during a particular event to be determined.

After a session between the gaming machine and the host is initiated, in 434, the gaming machine load and execute an ECI process if it is not already executing and begin communication gaming machine transaction information to the host. The gaming machine transaction information may include information regarding a state of a game played on the game, player identification information, money handling information, etc. The gaming machine transaction information received from the gaming machine may affect dynamically the content the host sends to the gaming machine. Examples of gaming transaction information that may be transmitted are described in the G2S protocol approved by the Gaming Standards Association (Fremont, Calif.) although the present invention is not limited to the communicating the information described in the protocol or in the format described by the protocol.

In particular embodiments, the host may be simultaneously in sessions with a plurality of gaming machines where each gaming machine is receiving content that is being dynamically adjusted by the host based on information received from the gaming machines, i.e., the content is customized for the particular game state of each gaming machine. Further, the host may be operable to customize content based upon a "group" state. In a group state, information received from a group of gaming machine may be combined to define a state of the group. The host may be operable to dynamically adjust content sent to one or more gaming machines in a group based upon a group state. Thus, at a particular time, the content sent from the host to the gaming machine may be 1) affected by the state of the gaming machine, 2) unaffected by the state of the gaming machine, 3) affected by the state of a group of gaming machine, 4) unaffected by the state of the group of gaming machines, 5) affected by the state of another gaming machine (e.g., in a tournament situation, the host may adjust its content to reflect that another gaming machine different the gaming machine has won the tournament or another gaming machine has won a particular jackpot), 6) unaffected by the state of another gaming machine, or 7) combinations thereof.

In the preceding paragraph, a gaming machine to which the host is sending content may or may not provide information that affects a particular group state at a given time. For example, the host or another host may provide a progressive game with a progressive jackpot to a group of gaming machines. The gaming machine to which the host is sending content may be operable to play the progressive game but may not be currently participating in the progressive game at a particular time and thus not contributing to the jackpot, which in this example is one indicator of the group state of the gaming machine in the group. When the progressive jackpot reaches a certain level, the host may send information to the gaming machine to indicate that the jackpot has reached a certain threshold to entice a player on the gaming machine to join the progressive game. Thus, the host may dynamically adjust content sent to the gaming machine based upon a group state for a group of gaming machines that the gaming machine is currently not affecting.

In 456, the host may select its initial content to send to the gaming machine, including commands, instructions and/or data that are already stored on the remote to the gaming machine in 420. If needed, the host may generate all or a portion of the content to send to the gaming machine in real time. In a particular embodiment, the gaming machine may store content from previous interactions with the host or other hosts that were used by an ECI. In this case, the gaming machine may be operable to gather information on content stored on the gaming machine and send it to the host. The gaming machine or the host may initiate this interaction. If the gaming machine is storing content that is useful to the host, such as content it may need to send to the gaming machine in the absence of its presence on the gaming machine, the host may be operable to send only needed content without reduplicating content the content it may use that is already stored on the gaming machine In 458, the host may store information regarding the state it is controlling on the ECI, which may be affected by the content it is sending. In 436, the gaming machine may store and/or output content via the ECI. In 438, the gaming machine may receive input from a peripheral device, such as a touch screen sensor or generate information that may affect the content provided by the host. In 440, the gaming machine may determine that this information is of interest to the host and/or to the ECI. In one embodiment, the information may be routed to the ECI for additional processing, which may then send the information to the host or in 422, the gaming machine send the information directly to the host.

In 460, the host may process the information received from the gaming machine and send new content including commands, instructions and/or data to the gaming machine in 424. In 442, the gaming machine may store and/or output the new content via the ECI. In 462, the host determines that an event has been triggered, which may be related to the content it has sent in 424. For example, the event may be the award of a 2 times bonus and the content it sent in 424 may be a presentation for this award. Thus, in 426, event information may be sent to the gaming machine, such as instructions, to the master gaming controller to double an award for the current game and update the credit meter accordingly.

In 444, in response to the event information, the gaming machine may modify the gaming machine interface. For example, in the case of the 2 times bonus award described in the previous paragraph, the gaming machine may present a credit meter scrolling up in response to the award.

In 448, the gaming machine may determine that an event has occurred that may affect a status of the session. For instance, the gaming machine may have received a cash out command, a player may withdraw a player tracking card, the gaming machine may have reached zero credits, the gaming machine may have been idle for a period, the gaming machine has received a request for resources from another host wishing to provide an ECI, the gaming machine has received an input signal indicating a desire to close a window associate with the ECI provided by the remote, a malfunction has occurred on the gaming machine, a tilt condition has occurred on the gaming machine, the resources available on the gaming machine have changed.

In response to the particular event, in 428, the gaming machine may renegotiate or terminate the session. For example, when the gaming machine has been idle for a period, the gaming machine may terminate the current session with the host or the gaming machine may renegotiate the session parameters, such as to provide an attract feature on an ECI associated with the host. In 449 and 466, the gaming machine and the host may each respectively store state information, such as information indicating the session was terminated or was renegotiated.

The interaction diagram was provided for illustrative purposes only and the present invention is not to be limited by the types of interactions or order of interactions described in FIG. 4. Accordingly, it should be appreciated that in one embodiment, the present disclosure provides a gaming device including a primary game operable upon a wager by a player, at least one display device, at least one input device, and at least one local processor. The master gaming machine controller may be programmed to operate a host to enable the player to wager on a play of the primary game, generate or receive a primary game outcome for the play of the primary game, cause part of the display device to display the play of the primary game, and receive at least one request from the host to provide at least one remote controlled process on the display device. If at least one request to provide the remote controlled process is received, the local processor may be programmed to determine an availability of at least one gaming device resource. If the gaming device resource is available, the local processor may be programmed to accept the request to provide the remote controlled process; and enable the host to cause a portion of the display device to display the remote controlled process, wherein the remote controlled process will not affect the integrity of the play of the primary game and the remote controlled process may be displayed simultaneously with the play of the primary game and generated concurrently by the master gaming controller on the gaming machine. If the gaming device resource is not available, the local processor may be programmed to reject the request to provide the remote controlled process. It should be appreciated that maintaining the integrity of the play of the primary game includes, but is not limited to: ensuring that the game play speed of the primary game remains the same or substantially the same, ensuring that the quality of graphics of the primary game remains the same or substantially the same, ensuring that the quality of the audio of the primary game remains the same or substantially the same, ensuring that no corrupt images are displayed in association with the play of the primary game, ensuring that the correct outcomes are provided to the player in association with the play of the primary game, and/or ensuring that the functionality of the primary game remains the same or substantially the same.

In one such embodiment, if the externally controlled process is authorized by the master gaming controller, then the externally controlled process may provide (a) one or more services to the player; (b) one or more enhanced functions or features of the gaming machine to the player; (c) one or more outcomes to a player; or (d) a combination of such services, functions and outcomes to a player, wherein the externally controlled process is based, at least in part, on one or more aspects of the locally controlled games. In other embodiments, if the externally controlled process is authorized by the master gaming controller, then independent of the locally controlled games, the externally controlled process may provide (a) one or more services to the player; (b) one or more enhanced functions or features of the gaming machine to the player; (c) one or more outcomes to a player; or (d) a combination of such services, functions and outcomes to a player.

In one embodiment, the services provided to the player via the externally controlled process may include, but are not limited to one or more of the following:

(1) enabling a player to order food, drinks or coffee from the gaming machine (possibly to be delivered to the player at the gaming machine);

(2) enabling a player at a gaming machine to communicate with a person at another gaming machine;

(3) enabling a person at a gaming machine to communicate with a gaming establishment concierge, (4) enabling a player to learn information about various hotels, gaming establishments, restaurants, entertainment and/or travel services;

(5) enabling a player to make reservations, such as at a restaurant or for an event, from the gaming machine;

(6) enabling a player to transfer funds or manage a monetary account from the gaming machine;

(7) enabling a player to purchase a lottery ticket at the gaming machine;

(8) enabling a player to obtain change at a gaming machine;

(9) enabling a player to make a wager on an event or other unknown outcome, such as a sporting event, to monitor events, to receive results and to cash out a winning event ticket at the gaming machine;

(10) enabling a player to send and receive electronic messages, such as e-mails, at the gaming machine;

(11) enabling a player to purchase various vending items at the gaming machine;

(12) enabling a player to access internet enabled services;

(13) enabling a player to check and redeem player tracking points for merchandise, entertainment or services;

(14) enabling a player to receive information related to upcoming tournaments or other gaming establishment promotions;

(15) enabling a player to watch television or a movie at the gaming machine;

(16) enabling a player to listen to music at the gaming machine;

(17) enabling a player to access the player's gaming establishment account; and

(18) enabling a player to view promotions available to that player.

In one embodiment, the enhanced functions or features of the gaming machine provided to the player via the externally controlled process include, but are not limited to one or more of the following:

(1) displaying information relating to one or more aspects of the player's gaming experience;

(2) providing personalized audio and/or video content at the gaming machine;

(3) enabling a player to pick a game to play from a plurality of available games;

(4) enabling a player to place one or more side-bets;

(5) enabling a player to play for one or more progressive awards;

(6) enabling a player to participate in a gaming tournament;

(7) providing a virtual ATM at the gaming machine;

(8) providing a virtual entertainment center at the gaming machine;

(9) providing a virtual lottery machine at the gaming machine;

(10) providing a virtual change machine at the gaming machine;

(11) providing a virtual sports book at the gaming machine;

(12) providing a virtual communication center at the gaming machine;

(13) providing a virtual concierge at the gaming machine;

(14) providing a virtual vending machine at the gaming machine;

(15) providing a virtual internet kiosk at the gaming machine;

(16) enabling a player to customize one or more aspects of the content displayed on the display device;

(17) enabling a player to customize one or more aspects of gaming machine interface;

(18) enabling a player to enroll in a player tracking system;

(19) enabling a player to play a plurality of games simultaneously or substantially simultaneously at the gaming machine;

(20) enabling a player to access personal settings at the gaming machine;

(21) enabling a player to access a score card of accomplished events (such as which poker game outcomes has the player obtained and which poker game outcomes has the player not yet obtained);

(22) enabling a player to access a tournament leader board; and

(23) enabling a player to select a favorite type of award to play for.

In one embodiment, the outcomes provided to the player via the externally controlled process may include, but are not limited to one or more of the following:

(1) a value;

(2) a modifier;

(3) an entry in an award drawing;

(4) an entry in a tournament;

(5) an additional player tracking point;

(6) a session surprise award;

(7) a modifier of any primary game awards for a set amount of time;

(8) a number of free or discounted spins or activations of a game;

(9) a prize;

(10) a progressive award;

(11) a retrigger to be utilized in a game;

(12) a wild symbol to be utilized in a game;

(13) an anti-terminator to be utilized in a game;

(14) a bonus or secondary game;

(15) a nudge of one or more reels in a reel game;

(16) a hold of one or more reels in a reel game;

(17) a scatter type pay;

(18) one or more additional paylines in a reel game;

(19) one or more additional ways to win in a reel game;

(20) one or more additional ways to trigger a secondary game;

(21) one or more available promotions;

(22) one or more surveys; and

(23) one or more non-redeemable credits.

Figure 4B:
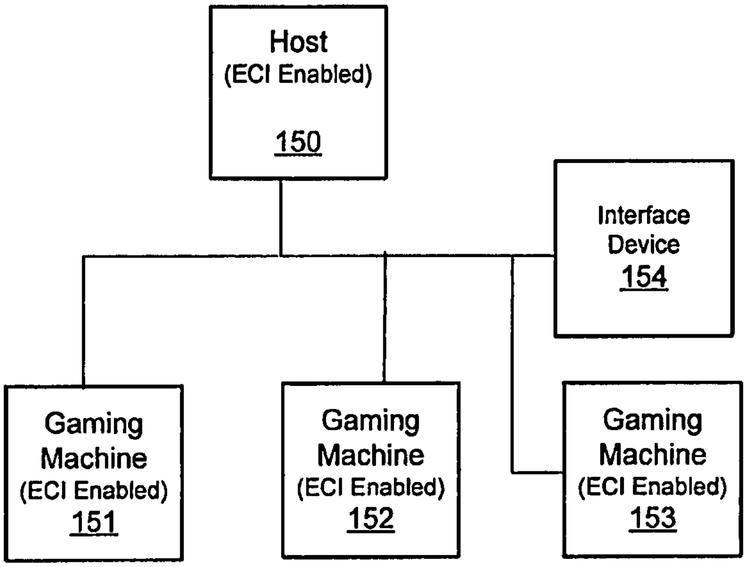
FIG. 4B is a block diagram of a host that is externally controlled interface (ECI) enabled in communication with a plurality of gaming machines that are ECI enabled for one embodiment of the present invention.

FIG. 4B is a block diagram of a host 150, which is externally controlled interface (ECI) enabled, connected to a plurality of gaming machines 151, 152 and 153, which are also ECI enabled, for one embodiment of the present invention. The host may also be connected to and operable to control a plurality of interface devices, such as 154. For instance, the host 150 may be operable to control overhead signage or other types of display devices near a bank of gaming machines to complement the content provide by an ECI on the gaming machines.

In particular embodiments, the gaming machines, 150, 151, 152, may be located proximate to one another, such as in a bank of gaming machines, at different locations in a gaming establishment or even located in different gaming establishments at different locations. Further, the present invention is not related to gaming machines. Player stations available at table games and signage near table games may also be ECI enabled such that utilization by the host 150 is allowed. Thus, in a particular embodiment, the host may be operable to provide ECI enabled services to players at table games and gaming machines including shared games that involve a mixture of players at table games and gaming machines, such as slot machines.

The host 150 via an ECI on each of the gaming machines may be able to coordinate content on two or more gaming machines, such as two or more of 152, 153 and 153. For instance, if two or more gaming machines share a similar theme it may be desirable to coordinate content on the two machines, such that a theme is matched. In another example, if two of more gaming machines are located in a similar location, where advertising or merchandising for a particular product or service is desirable, then the advertising or the merchandising on similarly located gaming machines may be coordinated, i.e., receive related content. In general, any content or activity that is described in relation to a single gaming device herein may be extended in a coordinated or targeted manner to a group of gaming devices.

In another embodiment, content on groups of gaming machines may be coordinated according to characteristics of the players at a group of gaming machines. For instance, the host may enable a group of friends and/or family to communicate with one another and play a shared game with their group while playing games on different gaming devices. For instance, the group may play a tournament game or a bonus game with each other. As an another example, the host may provide ECIs that allow the group to receive related content that is of interest to the group, such as a notification for the group or a part of the group that a dinner reservation or some other activity is about to start.

In general, the players in a group may share some common interest and are not limited to being known to each other. When player's have provided preference information in regards to preferences towards gaming activities and/or a gaming establishment has collected information in regards to a player's interests and gaming activities, then the host may provide content that is targeted toward a group of player's with similar interests. As an example, when a group of players is playing on gaming devices that are ECI enabled and a subset of the group has shown an interest in tournament games, such as past participation in tournament games, then the host may only send tournament information to the subset of the group that it has determined may be interested in tournament games.

In another embodiment, the remote 150 may coordinate groups of ECIs to generate coordinated effects that span multiple gaming machines. For instance, gaming machines 151, 152 and 153 may be collocated (e.g., side-by-side), video displays on gaming machines 151, 152 and 153 may utilized in a manner such that video content on the displays appears to span multiple gaming machines. For instance, a graphic may appear to move from a first gaming machine to a second, gaming machine to a third gaming machine in a sequential fashion under control of the host via an ECI on each gaming machine. If a peripheral interface device 154, such as an overhead sign is employed, then the host may be also operable to move the graphic from the overhead sign to the gaming machines and vice versa.

In another example, the host may coordinate content on a group of gaming machines to provide an activity, such as a shared bonus game or a tournament. In this example, this example, the host may both coordinate and customize content. For instance, a tournament may involve a group of players playing a common game provide under control of ECIs receiving information from the host. Although a game with the same rules may be played by each player, the host may be operable to allow each player to customize content of the ECI, such as allowing each player to select a preferred type of slot game for the ECI-based tournament.

In yet other embodiments, coordinated and customized content may be generated simultaneously on a group of gaming machines. For instance, in the example in the preceding paragraph, the gaming machines may include primary and secondary displays that may each be utilized in conjunction with an ECI. On each of the primary displays, the host may affect the content via ECIs such that it varies with events (e.g., a particular player being identified or a particular game play event occurring, etc.). Thus, the content that is affected by the host may be different on each gaming machine. In conjunction to the ECIs provided on the primary displays, the host may control ECIs on each of the secondary displays to provide a shared bonus game played on each gaming machine. Thus, the host coordinates the content via the ECIs on the secondary displays to provide a shared bonus game. In this example, the gaming machines may be proximate to one another or at widely varying locations.

In the example in the preceding paragraph, the activities on one of the gaming machines participating in the shared bonus game may affect the content provided via the ECIs on the other gaming machines participating in the shared bonus game. For instance, the gaming machines, 151, 152 and 153, may all provide slot games where an outcome occurring on only one of the slot games may be communicated to the host 150. In response to this outcome, the content for the bonus game provided on each of the gaming machines may be altered in some manner.

In some implementations of the invention, it may be useful to distinguish between different types of hosts. For example, it may sometimes be convenient to make a distinction between "remote hosts" and "local hosts."

In some such implementations, the term "local host" or the like may be used to describe a host that provides content and/or services pertaining to local events, activities, etc. For example, a local host may include one or more devices configured to provide information and/or services pertaining to local tournaments, local restaurants, local activities, local social events, local sporting events, local wager gaming events, local retail opportunities, etc. In some implementations, a "local host" may refer to one or more devices (e.g., servers) used by a gaming establishment to implement features specific to that gaming establishment. Alternatively, or additionally, in some implementations a "local host" may be configured to provide information and/or services regarding a resort, a city, a region, etc. The information may be provided in the form of video, audio and/or other data.

As used herein, a "remote host" may not necessarily be remote in the geographic sense, but it may or may not provide information or services regarding local events. For example, one could consider one or more servers used by the Las Vegas Sun™ to host news content as a "remote host" with respect to a gaming machine that is located in the same building, even though some of the news content involves local events, local issues, etc. However, another server in the same building may be considered a "local host" if it were configured to provide services, content, etc., to the gaming machine.

It will be apparent to those of skill in the art that there can be some overlap between the terms "local host" and "remote host," such that the functionality of a particular host device may not fall squarely into one category or the other. For example, a local device may be configured, inter alia, to facilitate the transmission of content to a gaming device. Likewise, a remote host could provide gaming information and/or services to gaming devices in a gaming establishment, e.g., regarding a player loyalty system, a multi-site bonusing system, a jackpot or other central determination system, etc. Accordingly, the term "host" may be used generically herein to encompass what is referred to herein as a "local host" and what is referred to herein as a "remote host." In the parent application, the term "remote host" was used broadly and could encompass both terms.

Figure 4C:
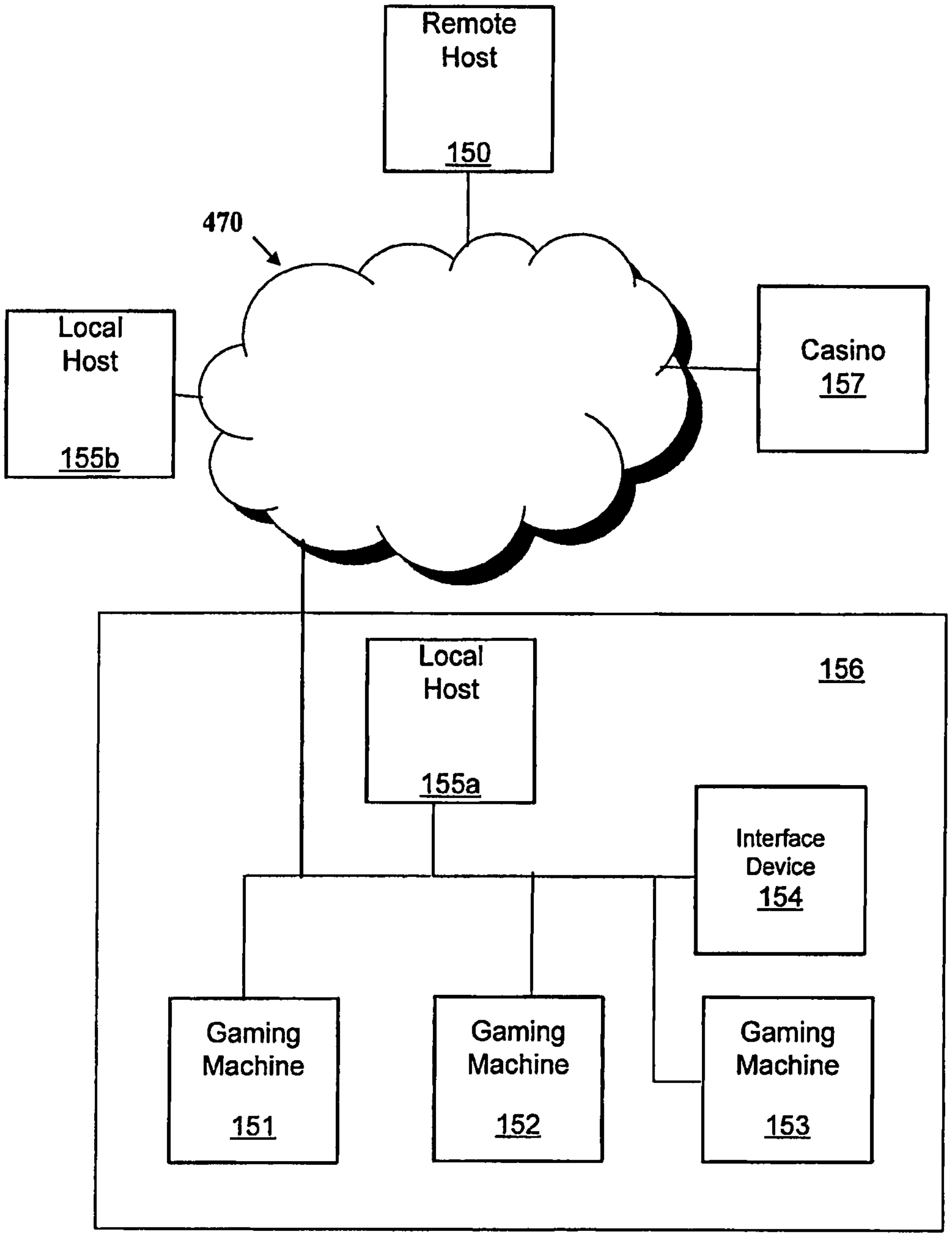
FIG. 4C is a block diagram of a remote host and local hosts in communication with a plurality of gaming machines according to some embodiments of the present invention.

In the example depicted in FIG. 4C, gaming establishment 156 is located in Reno and gaming establishment 157 is located in Las Vegas. In this embodiment, remote host 150 is located in Los Angeles, Calif. and is operated by, or on behalf of, a content provider. Accordingly, remote host 150 is configured to provide content via network 470. Here, remote host 150 is merely one example of many hosts, which may be located anywhere in the world, that could potentially be configured to provide information and/or services to devices in gaming establishments 156 and 157. These devices include, but are not limited to, gaming machines 151, 152 and 153.

The content provided by remote host 150 may comprise, for example, news content, weather content, business-related content such as stock quotes, sports-related content such as sports scores, weather information, music, movies, etc. The content may be provided in the form of video, audio and/or other data, e.g., as described elsewhere herein. In this example, network 470 is the Internet, but any convenient network may be used.

Local host 155*a* is associated with gaming establishment 156 and is configured to provide content, services, etc., associated with the gaming establishment. For example, local host 155*a* may be configured to provide game services, bonus services or any of the other information or services described herein that may be provided by hosts associated with a gaming establishment. In some implementations, local host 155*a* may provide information regarding events and/or opportunities pertaining to gaming establishment 156, such as tournaments, specific types of wagering games (e.g., to facilitate wagering games between known "high rollers"), dining opportunities, entertainment opportunities, social opportunities (including but not limited to dating opportunities), etc. These and other examples of events and/or opportunities pertaining to gaming establishment that may be provided, at least in part, by a local host are described in more detail below. In this example, host 155*a* is actually located within gaming establishment 156, but this need not be the case.

Here, local host 155*b* is located the vicinity of gaming establishment 156 and is operated by an entity that cooperates with the entity that operates gaming establishment 156 to provide information and/or services to casino patrons. For example, local host 155*b* may be operated by (or on behalf of) a local country club, spa or other resort, a local restaurant, a local night club, a local entertainment venue, a local sports arena, a local ski area, a local affiliated gaming establishment, etc. As described in more detail below, patrons may receive information regarding local events and/or opportunities associated with such entities via a local host. In some such implementations, patrons may receive information according to stated or inferred patron preferences.

ECI Features

Figure 5A:
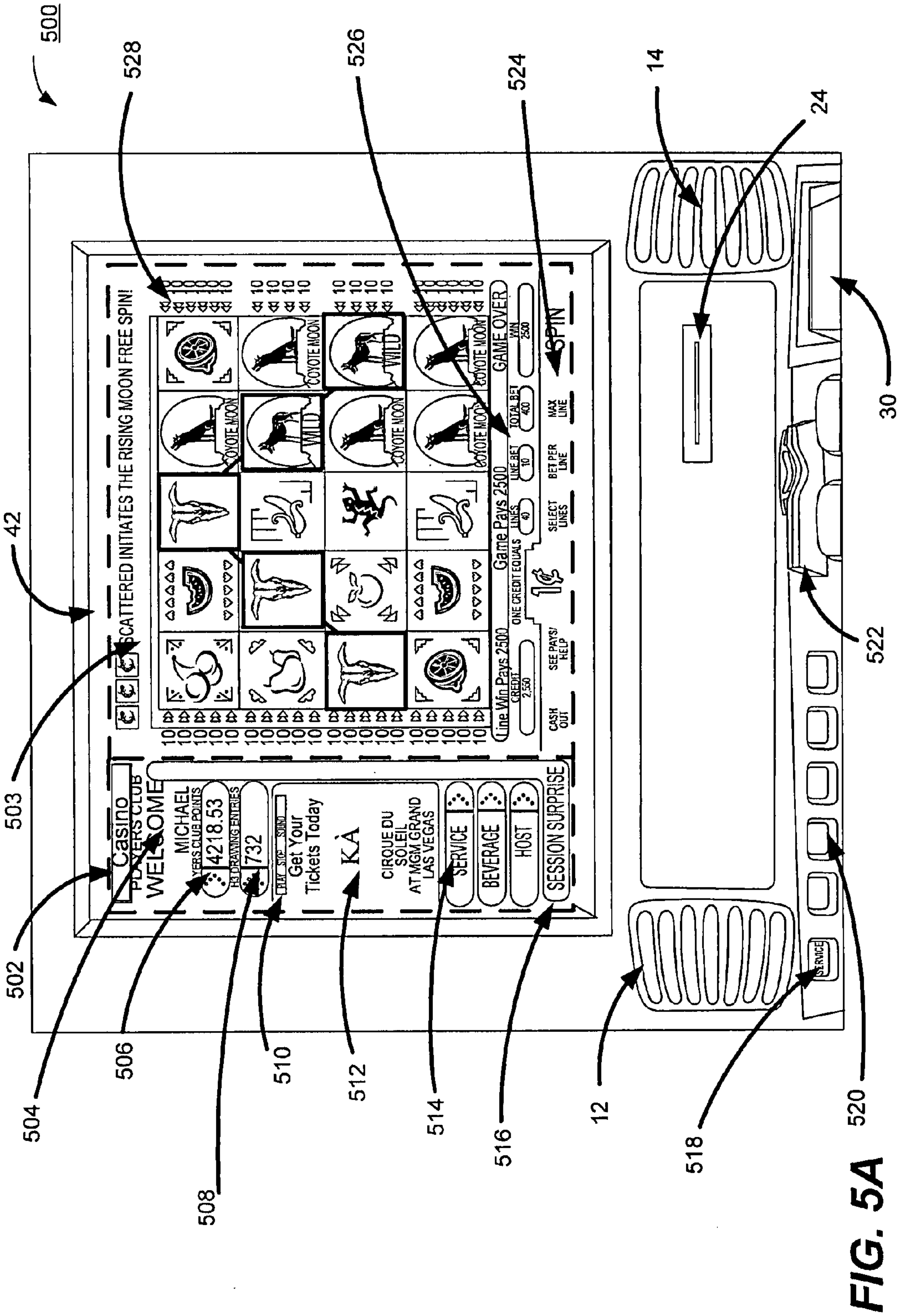
FIGS. 5A and 5B are block diagrams illustrating features of an externally controlled interface (ECI) on a gaming machine for embodiments of the present invention.
Figure 5B:
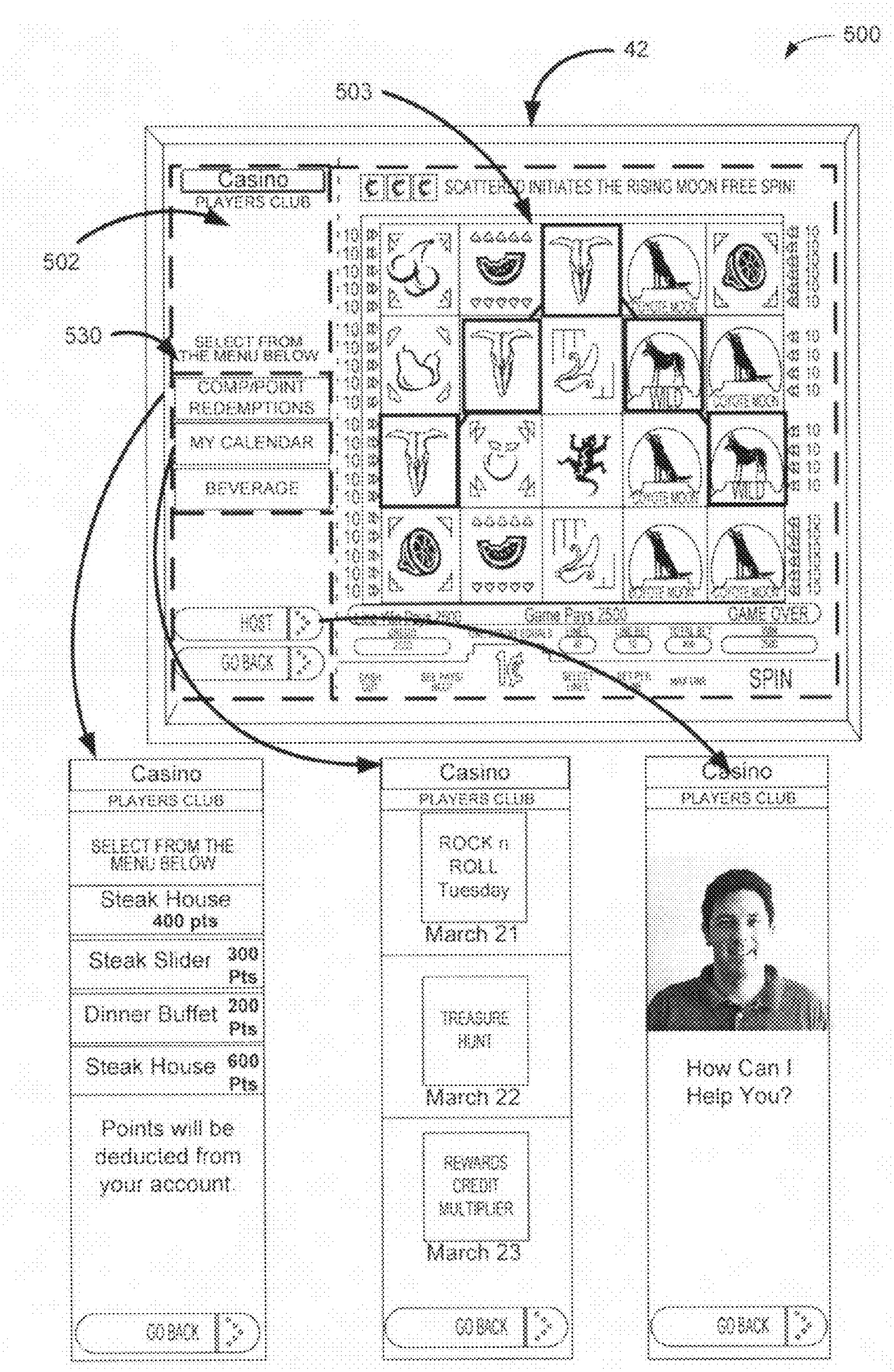

FIGS. 5A and 5B are block diagrams illustrating features of an externally controlled interface (ECI) on a gaming machine for embodiments of the present invention. In FIG. 5A, a game interface 503 comprising a portion of the touch screen display 34, speakers 12 and 14, service button 518, mechanical input buttons 520, payment or coin acceptor 28 and bill validator 30 are illustrated. The game interface 503 enables wagers to be made on a game of chance on the gaming machine 500. The game interface portion of the display 503 comprises a multi-line payline slot game during one state of the game, payline indicators 528 on the left and right of the slot game, game information 526 and game touch screen input buttons. The game interface 503 may be scaled to use a portion of the display 34. In general, the game interface 503 may be scaled to use many different sized portions of the display in different locations of the display. Further the gaming machine is not limited to a single gaming interface and the display may be divided into multiple portions to enable a plurality of games to be played simultaneously.

An ECI 502 also utilizes a portion of the display 502. In one embodiment, when the master gaming controller receives an input signal indicating the service button 518 has been depressed, the ECI 502 may be activated. Prior to activation of the ECI 502, the game interface 503 may occupy the entire display 34. In the example in the FIG. 5A, the ECI 502 utilizes a portion of the touch screen display 502 and the speakers 12 and 14. In different embodiments, the ECI transitions to utilize a portion of the display via a sliding window transition, via a swapping of windows transition, via an overlay of windows transition, via a scaling of windows transition, via one or more hidden windows or via any suitable transition. In other embodiments, the game interface 503 may utilize other devices coupled to the gaming machine including but not limited to the bill validator 30, card reader 24, payment acceptor 28, mechanical input buttons 520 and service button.

The ECI 502 comprises a number of components. Player information 504 including a player's name and loyalty program account information including points in a loyalty program may be output to display 34. The player information and the loyalty account information may be obtained after a player inserts a player tracking card in the card reader 24. By activating the touch screen proximate to the oval in which the club points are displayed, the player may access additional loyalty program account information or additional menus relating to player tracking. After the touch screen proximate to the oval has been activated, the format of the ECI 502 on display 34 may change to enable the additional information to be output or the information may be output via an alternate means, such as via the speakers 12 or 14 or another display on the gaming machine.

In one embodiment, the host controlling ECI 502 may act as a player tracking server and have the player loyalty account information locally available. In another embodiment, the host 502 may contact another gaming device to obtain any needed loyalty account information associated with a player. In the case where the player is not a member of the loyalty program, the ECI 502 may output information asking the player to join and providing instructions regarding how to join.

Another component of the ECI 502 may be bonus drawing information 508. As a result of their game play, the player may earn entries in a bonus drawing. A portion of the ECI display outputs bonus drawing information 508. By pressing the touch screen proximate to the oval displaying the bonus drawing information, the player may learn additional information, such as their number of drawing entries, a list of the numbers associated with each bonus drawing ticket and/or when the next bonus drawing is going to occur.

In one such embodiment, the host provides players with one or more entries into a bonus award drawing based on a player's gaming activity. The host tracks one or more aspects of the player's gaming activity and based on such tracked gaming activity, the host provides the player one or more entries into a bonus drawing for one or more awards or prizes. In different embodiments, the number of entries provided to each player may be predetermined, randomly determined, determined based on the player's status (such as determined through a player tracking system), determined based on a generated symbol or symbol combination, determined based on a random determination by the host, determined based on a random determination at the gaming machine, determined based on one or more side wagers placed, determined based on the player's primary game wager, determined based on time (such as the time of day) or determined based on any other suitable method or criteria. In one embodiment, at a designated time or upon a designated event occurring, the host (or other suitable system) randomly selects one or more of the drawing entries and provides the player's associated with such selected drawing entries the appropriate awards. For example, the host provides a player with an entry into a bonus award drawing for each cherry symbols generated in the game. In another embodiment, the host provides players with one or more entries into a bonus award drawing based on one or more events independent from the player's gaming activity. For example, the host provides a player with an entry into a bonus award drawing for every $10 wagered.

Yet another component of the ECI 502 may be advertising 512 and attract features. Based upon information known about a player, the advertising and attract features may be personalized to an individual player preferences. In FIG. 5A, advertising for a show is presented. When ECI touch screen buttons 510 are activated, additional information about the show may be presented, such as a movie clip, show times and seat availability. When the movie is presented, ECI touch screen buttons 510, enable the progress of the movie to be controlled and to be played with or without sound. In one embodiment, the ECI 502 may enable the player to make reservations for the show and print tickets for the show or print a receipt that enables a player to pick up tickets for the show.

Other components of the ECI 502 are menu buttons 514 for additional services. An activation of the touch screen proximate to the oval for each of the menu buttons 514 causes the ECI 502 to display additional information regarding services, beverages or communications with a host that may be obtained on the gaming machine. In response to the activation of one of the menu buttons 514, the ECI 502 may display additional menus and information, which is described in more detail with respect to at least FIG. 5B.

Finally, a last component of the ECI 502 for this example may be a bonus status information 516. During game play, the player may progress towards an additional bonus award. The progression may depend on factors, such as but not limited to a wager amount, how many games they initiate and events that are randomly triggered during their game play. The bonus status information 516 may be a meter that displays their progress to the additional award.

In one embodiment of the ECI being utilized to provide an additional bonus award, the gaming system disclosed herein provides players with one or more bonus awards based on a player's gaming activity during a single gaming session. In one embodiment, a single gaming session may be measured by a player carding-in and carding-out through a player tracking system. In one embodiment, a gaming session award may be triggered based on one or more game play events, such as a symbol-driven trigger, which occurs during the single gaming session. In other embodiments, a gaming session award triggering event or qualifying condition may be triggered by exceeding a certain amount of game play (such as number of games, number of credits, or amount of time), or reaching a specified number of points earned during game play of the single gaming session. In another embodiment, a gaming device may be randomly or apparently randomly selected to provide a player of that gaming device one or more gaming session awards during a single gaming session. In one such embodiment, the gaming device does not provide any apparent reasons to the player for winning a gaming session award, wherein winning the gaming session award may not be t triggered by an event in or based specifically on any of the plays of any primary game during the single gaming session. That is, a player may be provided a gaming session award without any explanation or alternatively with simple explanations. In another embodiment, a player may be provided a gaming session award at least partially based on a game triggered or symbol triggered event during the single gaming session, such as at least partially based on the play of a primary game.

Figure 8:
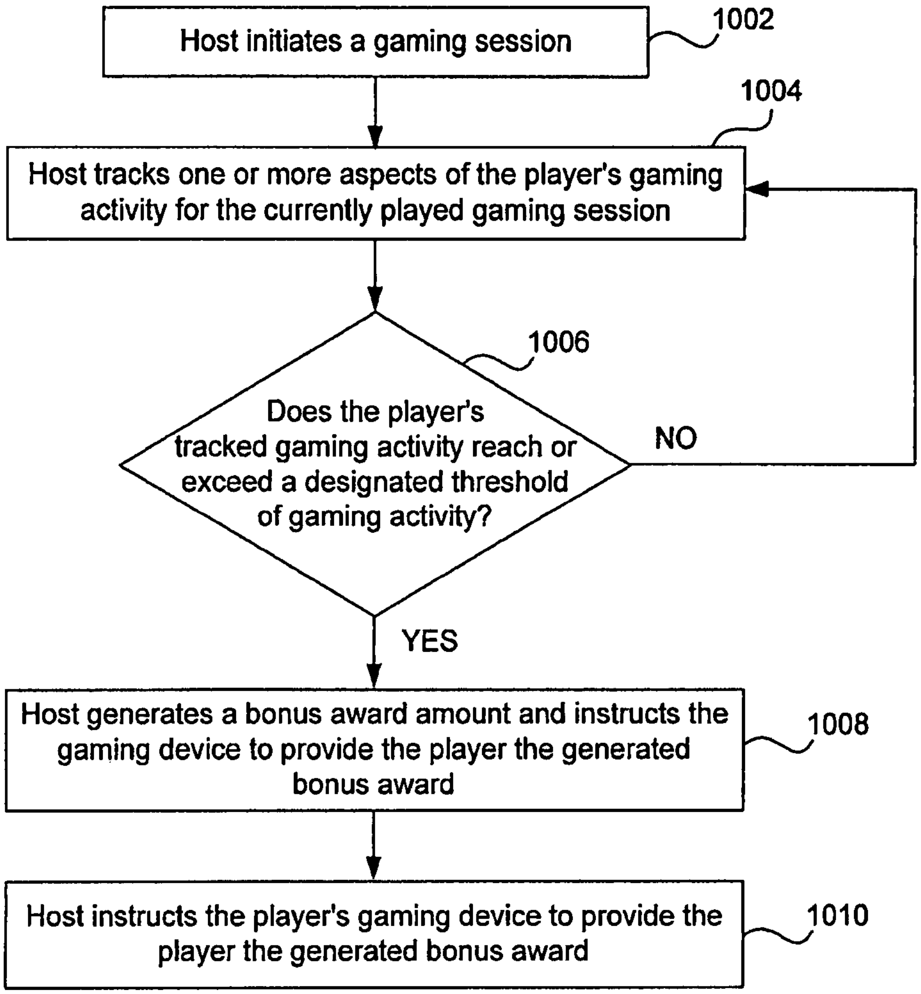
FIG. 8 is a flowchart of one embodiment of the present invention, illustrating a host device proving a player a bonus award based on the player's gaming activity for the currently played gaming session.

In one such embodiment, as indicated in block 1002 of FIG. 8, upon a player inserting a player tracking card, the host may initiate a gaming session at the player's currently played gaming device. Upon the initiation of the gaming session, as indicated in block 1004, the host may track one or more aspects of the player's gaming activity for the currently played gaming session. In different embodiments, the host may track the amount of coin-in, any player tracking points accumulated, the number of games played, the number and types of outcomes obtained, the currency inserted into the gaming device, the amount of time since the session began, the amount of time between the generation of certain outcomes, and/or any other suitable gaming activity. It should be appreciated that in these embodiments, the gaming system may integrate certain aspects of the player's currently played gaming session to the ECI in a direct, positive feedback loop. That is, as a player continues playing one or more games, the amount of coin-in wagered and the number of player tracking points accumulated may be communicated from the gaming device to the host, wherein the host integrates this communicated data as part of the content utilized by the ECI.

In one embodiment, the host may tracks the same aspect of gaming activity for each gaming session. For example, the host may track the number of games played by each player in each gaming session. In another embodiment, the host may track different aspects of gaming activity for different gaming sessions. For example, the host may track the number of games played by each player in a first gaming session and may track each player's coin-in in a second gaming session. In different embodiments, which aspect of gaming activity the host will track may be predetermined, randomly determined, determined based on the player's status (such as determined through a player tracking system), determined based on a generated symbol or symbol combination, determined based on a random determination by the host, determined based on a random determination at the gaming machine, determined based on one or more side wagers placed, determined based on the player's primary game wager, determined based on time (such as the time of day) or determined based on any other suitable method or criteria.

In one embodiment, the host may track the same aspect of gaming activity for each player. In another embodiment, the host may track different aspects of gaming activity for different players. For example, the host may track the number of games a first player plays in a first gaming session, but may track a second player's coin-in for the first gaming session. In different embodiments, which aspect of gaming activity the host will track for different players is predetermined, randomly determined, determined based on the player's status (such as determined through a player tracking system), determined based on a generated symbol or symbol combination, determined based on a random determination by the host, determined based on a random determination at the gaming machine, determined based on one or more side wagers placed, determined based on the player's primary game wager, determined based on time (such as the time of day) or determined based on any other suitable method or criteria.

In one embodiment, each players gaming activity may be uniformly tracked by the host. For example, a first player's wager of $1.00 counts toward the gaming session threshold the same as a second player's wager of $1.00. In another embodiment, different players gaming activity may be tracked differently. For example, a first player's wager of $1.00 may count more toward the gaming session threshold than a second player's wager of $1.00. In different embodiment, each player's gaming activity may be tracked based on the player's status (such as determined through a player tracking system), based on a generated symbol or symbol combination in the underlying game, based on a random determination by the host, based on a random determination at the gaming machine, based on one or more side wagers placed, based on the player's primary game wager, based on time (such as the time of day) or based on any other suitable method or criteria.

In one embodiment, as indicated in diamond 1006 of FIG. 8, the host may determine if the player's tracked gaming activity reaches or exceeds a designated threshold of gaming activity. In one embodiment, the designated threshold of gaming active may be the same for each gaming session. In another embodiment, the designated threshold of gaming activity may be different for each gaming session. In different embodiments, the designated threshold of gaming activity for each gaming session is predetermined, randomly determined, determined based on the player's status (such as determined through a player tracking system), determined based on a generated symbol or symbol combination, determined based on a random determination by the host, determined based on a random determination at the gaming machine, determined based on one or more side wagers placed, determined based on the player's primary game wager, determined based on time (such as the time of day) or determined based on any other suitable method or criteria.

If the player's gaming activity does not reach or exceed the designated threshold of gaming activity, the host may continue tracking the player's gaming activity and may return to block 1004. If the player's gaming activity reaches or exceeds the designated threshold of gaming activity for the currently played gaming session, as indicated in blocks 1008 and 1010 of FIG. 8, the host may generate a bonus award amount or event and may instruct the local gaming device processor to provide the player the generated bonus award or event. For example, if a player's coin-in during a single gaming session is at least equal to a designated threshold coin-in level, a host may generate a bonus award amount and may instruct the gaming device to provide the player the generated bonus award. In another embodiment, upon the player's tracked gaming activity reaching or exceeding a designated threshold of gaming activity for the currently played gaming session, the host may generate a plurality of bonus awards and may instruct the gaming device to provide the player the generated bonus awards. It should be appreciated that the gaming session bonus award may be any suitable award, including, but not limited to: a value, a modifier, a modifier of any primary game awards for a set amount of time, a number of free or discounted spins or activations of a game, a bonus or secondary game, a prize, a progressive award, a number of bonus award drawing tickets, a service or comp, a number of player account points, a temporary change in the player's account status, a number of redeemable prize points, a number of rounds in a tournament, and an entry into a group play bonus event.

In another embodiment, different features on the gaming device (accessible via the ECI) may become available to the player upon the player's gaming activity reaching or exceeding the designated threshold of gaming activity. For example, if the player's gaming activity reaches or exceeds a designated threshold of gaming activity, the gaming device may enable the player to listen to a favorite song or genre of songs while playing the gaming device. In another embodiment, different services available to the player (and accessible via the ECI) may be activated upon the player's gaming activity reaching or exceeding a designated threshold of gaming activity. For example, if a player's gaming activity reaches or exceeds a designated threshold of gaming activity, the player may be offered a free drink. In one embodiment of this example, the gaming system may alert a gaming establishment attendant to ask the player if they would like a free drink. In another embodiment of this example, the gaming system may activate a drink-order button on the player's gaming device. As mentioned above, this activated drink-order button may either access a live dispatcher or may summon a gaming establishment attendant.

In one embodiment, as seen in FIG. 5A, the player's currently played gaming device displays information to the player 516 regarding their tracking gaming activity and the designated threshold. In one embodiment, the gaming device may display to the player the amount of the player's tracked gaming activity, such as via one or more meters, but does not display information regarding the designated gaming activity threshold. In another embodiment, the gaming device may display to the player information regarding the designated gaming activity threshold, but does not display information about the amount of the player's tracked gaming activity.

In one embodiment, the gaming session bonus award may be the same for each of the players. In another embodiment, the gaming session bonus award may be different for different players. In one such embodiment, different players may play for different gaming session bonus awards based on each player's status (such as determined through a player tracking system). For example, the gaming session bonus award for a bronze level player may be the first level progressive award of an MLP, while the gaming session bonus award for a silver level player may be the second level progressive award of the MLP and the gaming session bonus award for a gold level player may be the third level progressive award of the MLP. In different embodiments, the gaming session bonus award each player may play for is predetermined, randomly determined, determined based on a generated symbol or symbol combination, determined based on a random determination by the host, determined based on a random determination at the gaming machine, determined based on one or more side wagers placed, determined based on the player's primary game wager, determined based on time (such as the time of day) or determined based on any other suitable method or criteria.

In one embodiment, upon a determination to provide a player a bonus award for a gaming session, the host may select a player to provide an accumulated value progressive award. In another embodiment, upon the player's tracked gaming activity reaching or exceeding a designated threshold of gaming activity, the host may randomly select a bonus award from a prize pool and may instruct the gaming device to provide the player the selected bonus award. In one such embodiment, upon a determination to provide a player a bonus award for a gaming session, the host may select a bonus award from a prize pool that is based on the player's status (such as determined through a player tracking system). For example, a gaming session bonus award for a bronze player may be selected from a first prize pool, a gaming session bonus award for a silver player may be selected from a second, different prize pool and a gaming session bonus award for a gold player may be selected from a third, different prize pool. In different embodiments, upon a determination to provide a player a bonus award for a gaming session, the host may select a bonus award from a prize pool that is based on a generated symbol or symbol combination, based on a random determination by the host, based on a random determination at the gaming machine, based on one or more side wagers placed, based on the player's primary game wager, based on time (such as the time of day) or based on any other suitable method or criteria.

In one such embodiment a promotional prize pool may include a plurality of inventoried items (which may include null items) and thus the prize pool is associated with a fixed cost. In this embodiment, the host may randomly select prizes from the pool and removes the prizes as they are provided to the players, wherein when the last prize is removed from the promotional prize pool, the promotion ends. It should be appreciated that in this embodiment, as more prizes are selected and removed from the prize pool, the probabilities of being selected associated with the remaining prizes change. In another embodiment, each bonus award is associated with a probability and the host randomly selects a bonus award based on these probabilities.

In another embodiment, upon the player's tracked gaming activity reaching or exceeding a designated threshold of gaming activity, the host may randomly determine, based on one or more probabilities, whether to provide the player a bonus award for the player's gaming session. In this embodiment, if the host determines to provide the player a bonus award for the player's gaming session, the host may generate a bonus award amount and may instruct the gaming device to provide the player the generated bonus award. On the other hand, if the host determines not to provide the player a bonus award for the player's gaming session, after a set interval (such as an amount of time or coin-in accumulated) the host may redetermine whether to provide the player a bonus award for the player's gaming session.

In one embodiment, the designated threshold of gaming activity may be the same for each player. In another embodiment, the designated threshold of gaming activity is different for different players. In one such embodiment, the designated threshold associated with each player's gaming activity may be based on the player's status (such as determined through a player tracking system). For example, a bronze player may have a threshold of gaming activity higher than a silver player, which may have a threshold of gaming activity higher than a gold player. In different embodiments, the designated threshold for each player may be predetermined, randomly determined, determined based on a generated symbol or symbol combination, determined based on a random determination by the host, determined based on a random determination at the gaming machine, determined based on one or more side wagers placed, determined based on the player's primary game wager, determined based on time (such as the time of day) or determined based on any other suitable method or criteria.

After providing the player a bonus award for the player's gaming session, the host may reset the tracked gaming activity for the player's gaming session and restarts tracking the player's gaming activity. By resetting or restarting the tracking of the player's gaming activity (after providing the player a gaming session bonus award), the gaming system disclosed herein provides the player the opportunity to win multiple gaming session bonus awards during a single gaming session. It should be appreciated that by utilizing the master gaming controller, including a gaming device CPU or processor for at least one award determination (i.e., the game of chance outcome described above) and by utilizing the host for at least one award determination (i.e., the gaming session bonus award), the gaming system disclosed herein may be operable to provide a plurality of awards to a player wherein at least one award is determined locally and at least one award is determined remotely.

It should be appreciated that in one embodiment wherein the ECI is utilized to provide a player an additional award, the gaming system disclosed herein may be capable of providing players different types of awards based on the player's player tracking information, wherein player's wagers fund different player tracking based incentives or awards. That is, the gaming system may provide a single player a gaming session bonus award (wherein the player's gaming activity is based on the player's player tracking information) and may also provide the player a bonus drawing award (wherein the player's entries into the drawing are based on the player's player tracking information). In this embodiment, the gaming system may be operable to simultaneously run a plurality of different promotions wherein a player's standing or equity in each promotion is individually displayed to the player. Such a configuration provides increased entertainment and enjoyment for players by enabling players to win additional awards based on their player tracking status.

In another embodiment, the utilization of a dynamic game interface and a separate dynamic ECI generated on only a single display device or generated on separate displays, provides that a gaming device, which may part of a gaming system, may be operable to simultaneously display, substantially simultaneously display or sequentially display and execute multiple games wherein at least one game outcome may be determined locally by the gaming device processor (i.e., the game of chance associated with the game interface) and at least one outcome is determined remotely by a host (i.e., the outcome provided via the ECI). In another embodiment, the utilization of a dynamic game interface and a separate dynamic ECI generated only a single display device or generated on multiple displays, provides that a gaming device, which may be part of the gaming system disclosed herein, may be operable to display the results of a plurality of different determinations wherein at least one determination is based on one or more generated symbols or symbol combinations, at least one determination is independent of any game play events and at least one determination is based on a promotional offering. In one such embodiment, at least one determination is executed in a 'thin client' configuration (i.e., the player of a primary game which is controlled by the host and displayed by the gaming machine or a session surprise bonus award determined by the host and displayed by the gaming machine) and at least one determination is executed in a 'thick client' configuration (i.e., a game of chance award determined by the master gaming controller, wherein the game of chance may have been downloaded from the host).

In one embodiment, when the ECI is utilized to provide a player an outcome or award in addition to a locally determined game award where the ECI based award is determined at a host, the remotely determined award and the locally determined game award are each determined independently. In another embodiment, the remotely determined award is based, at least in part, on the locally determined award. In another embodiment, the locally determined outcome and associated award is based, at least in part, on the remotely determined outcome.

In another embodiment when one or more ECIs are utilized to provide players one or more additional outcomes or awards via one or more promotions, the gaming system disclosed herein tracks each of the promotions provided via an ECI. In this embodiment, the gaming system compares the actual provided promotional outcomes or awards to a theoretical amount of promotional outcomes or awards. That is, the gaming system compares each gaming device's actual promotional return to a theoretical return, which may have been contemplated by a gaming establishment operator when setting up the initial promotion. Based on these comparisons, the gaming system may be enabled to change or modify one or more criteria required to obtain a promotional outcome or award to align the actual promotional return with the contemplated theoretical promotional return.

It should be appreciated that in one embodiment the gaming system disclosed herein provides an open-ended rules engine for gaming establishments to create and provide any suitable promotion to one or more players. In one such embodiment, the gaming system enables gaming establishments to set up one or more rules, wherein if an event occurs (wherein the event is either related to game play or independent of game play), then based on the set up rules, certain features, services, outcomes or functions may be provided to or otherwise made available to one or more players. In one embodiment, the gaming system may enable a gaming establishment to set up or input rules related to the different criteria for a player winning an award, the different types of awards available to players, or combinations thereof, to achieve an average expected payback for one or more promotions and/or any combination thereof. As described above, the one or more promotions may be provided via ECIs executing on one or more gaming devices. Accordingly, the open-ended rules engine provides increased flexibility to a gaming establishment operator to further define and configure different aspects of a player's gaming experience.

In such one embodiment, the gaming system disclosed herein may enable a gaming establishment operator to configure the open-ended rules engine by defining different criteria for a player winning an award. In different embodiments, the criteria may be based on a player's player tracking status, based on if a player has a player tracking card in a gaming device of the gaming system, based on a player's amount of game play over a designated period of time, based on the generation of a designated symbol combination at a designated wager level, based on one or more side wagers placed, based on the player's primary game wager, based on time (such as the time of day) or based on any other suitable method or criteria. For example, a gaming establishment operator may utilize the open-ended rules engine to establish that if a player's currently played gaming device generates a designated symbol combination which includes three cherry symbols, and if the player has wagered at least one credit on each available payline, then the player is eligible for a gaming establishment defined promotion.

In another such embodiment, the gaming system disclosed herein may enable a gaming establishment operator to configure the open-ended rules engine by defining what type of award a player may win. In different embodiments, the type of award a player may win includes, but is not limited to, a monetary award, a non-monetary prize, an offer to purchase an item, an entry in a promotion, a modifier, a modifier of any primary game awards for a set amount of time, a number of free or discounted spins or activations of a game, a bonus or secondary game, a progressive award, a number of bonus award drawing tickets, a service or comp, a number of player account points, a temporary change in the player's account status, a number of redeemable prize points, a number of rounds in a tournament, and an entry into a group play bonus event. Expanding on the example described above, if a player's currently played gaming device generated a designated symbol combination which included three cherry symbols and the player wagered at least one credit on each available payline, then the open-ended rules engine (previously set up by the gaming establishment operator) may be used to determine that the player is eligible to win an award of ten bonus award drawing tickets.

In another such embodiment, the open-ended rules engine may be used to determine and to display to a gaming establishment operator a theoretical payout or average expected payback of different selectable criteria for a player winning an award and different selectable types of awards, which may be provided to a player. In this embodiment, the open-ended rules engine may enable a gaming establishment operator to select different criteria to create different promotions, wherein the gaming system displays how changes of different criteria affect a promotion's theoretical payout or average expected payback. Using the example described above, the open-ended rules engine may be operable to inform the gaming establishment operator the different average expected paybacks if the gaming system includes a first promotion where a player is provided ten drawing tickets if the player's currently played gaming device generated a designated symbol combination which included three cherry symbols and the player wagered at least one credit on each available payline versus a second promotion where a player is provided eight drawing tickets if the player's currently played gaming device generated a designated symbol combination which included three cherry symbols and the player wagered at least one credit on each available payline. Accordingly, the utilization of the open-ended rules engine enables different gaming establishments to create and implement different promotional offers to differentiate themselves from other gaming establishments.

As indicated above, in one embodiment, the gaming system disclosed herein may be operable to display any suitable information, including progressive jackpot information, via one or more ECIs to the players through one or more displays on the gaming machines or additional information displays positioned near the gaming machines, such as above a bank of system gaming machines. This information may be used to entertain the players, inform the players about any aspect of game play occurring on one or more gaming devices in the gaming system or inform the player of any aspect of any promotional offering occurring on one or more gaming devices in the gaming system. It should be appreciated that such information can be provided to the players through any suitable audio, audio-visual or visual devices.

Player Interface

As seen in FIG. 5B, a few examples of menu navigation available with the ECI 502 are illustrated. In FIG. 5B, the ECI 502 outputs touch screen buttons 530. In response to an activation of the touch screen proximate to each menu button, the ECI 502 may output different media, including but not limited to video and audio based information. For example, when the play activates the comp/point redemptions, the ECI 502 may enable the player to redeem their points for merchandise, entertainment or services. In one embodiment, when the comp button is activated, a menu of restaurants and points required to obtain a meal at each restaurant. In another embodiment, when a selection of a restaurant is made, points may be deducted from the player loyalty account and the player may receive a receipt or a voucher indicating their award. In one embodiment, the ECI 502 may enable the player to obtain additional information about each restaurant and even make reservations. An activation of the "go back" button on the touch screen may cause the ECI 502 to return to a previous menu page.

An activation of the "my calendar" button on the touch screen may cause the ECI 502 to display information regarding upcoming events that may be of interest to the player on the ECI 502. An activation of the touch screen proximate to each event may cause the ECI to display additional information about the event. An activation of the "beverage" button on the touch screen causes the ECI 502 to display additional menu items regarding beverages that are available for the player to order (not shown). These menus may enable the player to place an order for the beverage which may be brought to the gaming machine 500.

An activation of the "host" button on the touch screen may cause the 502 to display an ECI for providing a communication interface. As is illustrated in FIG. 5B, the communication interface may initiate a "live" communication session with a casino host. A communication session including video and audio transmissions is shown. In general, the communication interface may be used to initiate communications with casino representatives, other players at gaming machines or even remote communications to cell phones and other communication devices. The communication interface may utilize video, audio, text or combinations thereof to provide the communications.

In a particular embodiment, the communication interface and the comp interface that shows the points needed to redeem a meal may be simultaneously instantiated as separate ECIs displayed simultaneously on one or more display screens. In this embodiment, the ECI providing the comps may communicate information to the ECI providing the communication interface, such as a restaurant selection that has been input. The host utilizing the communication may receive this information via the ECI for the communication interface and use it to provide the player a service, such as making a reservation for the player or communicating additional information about the restaurant.

Figure 9A:
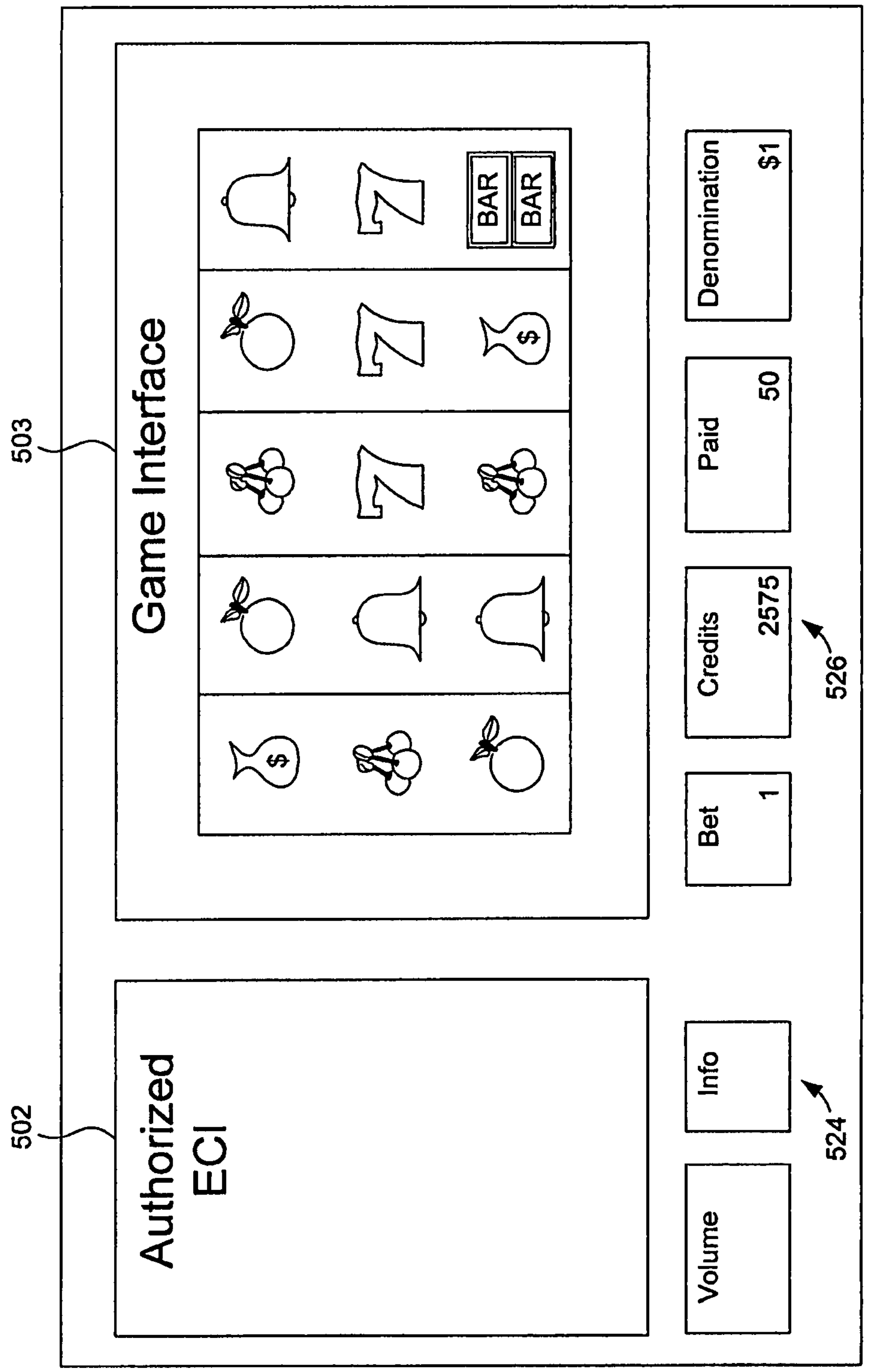
FIG. 9A is an enlarged elevation view of one embodiment illustrating a player interface and a separate game interface for the gaming machine invention herein.

In another embodiment, as illustrated in FIG. 9A, the gaming system enables one or more players at one or more gaming machines to interact with the gaming machine and/or the host via a customizable interface. In FIGS. 9A-9D, an ECI and a game interface are shown on a single display for illustrative purposes only. In various embodiments, on a single gaming device, one or more ECIs and/game interfaces may be distributed on a plurality of different displays where the number of ECIs and/or game interfaces generated and the distribution of the ECIs and/game interfaces on the plurality of different displays including a position/location on each display may vary with time. Further, although, in FIGS. 5A, 5B, 9A-9D, ECIs utilizing touch screen enabled displays are emphasized, the present invention is not so limited, and as described with at least respect to FIG. 3B, different combination of input and output devices not limited to touch screen enabled displays or even requiring a touch screen enabled display, may be utilized as components of an ECI.

Figure 9B:
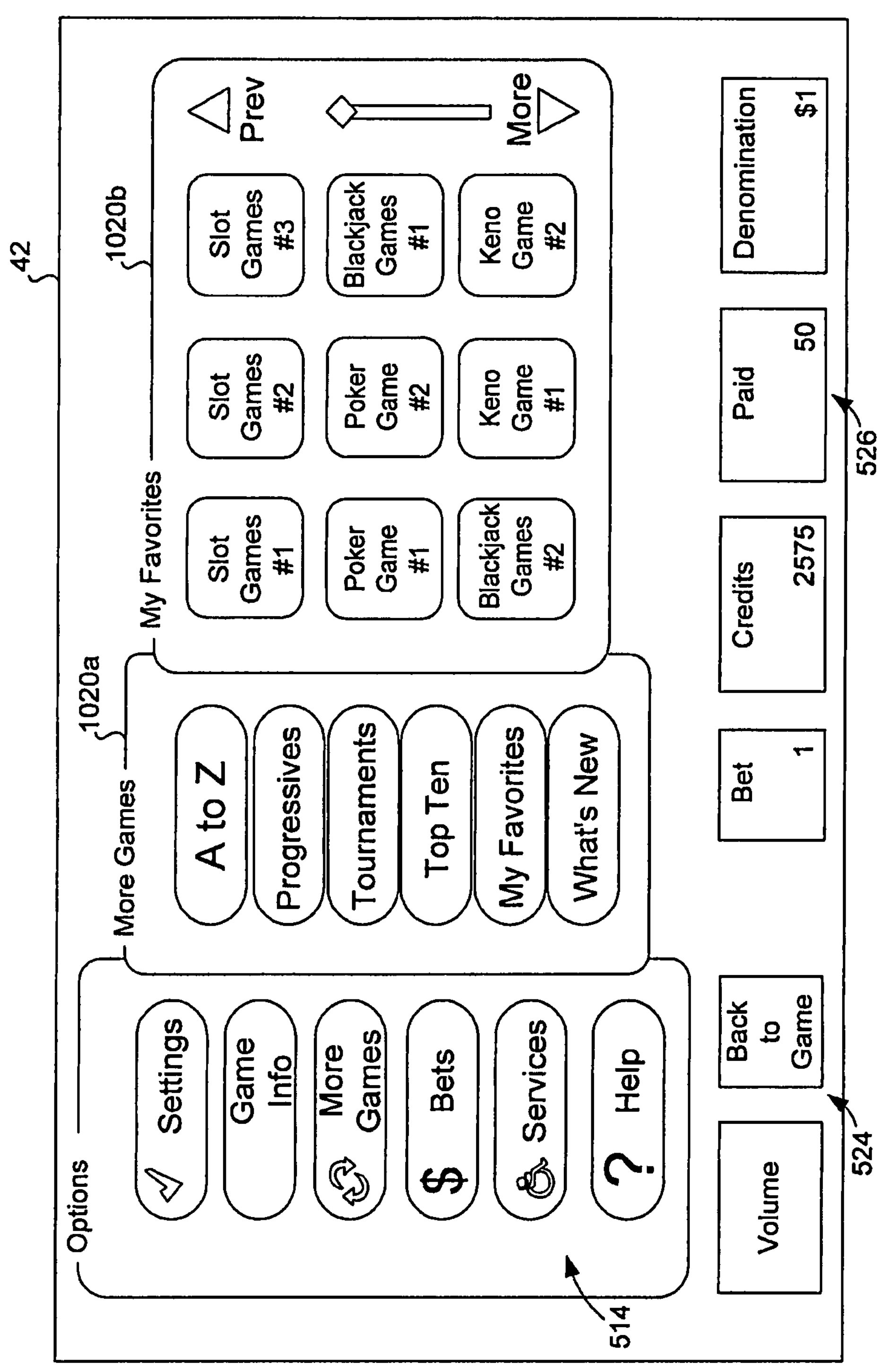
FIGS. 9B, 9C and 9D are enlarged elevation views of one embodiment of the present invention, illustrating a plurality of different nested menus and the different aspects of the player's gaming experience which may be modified utilizing the nested menus.
Figure 9C:
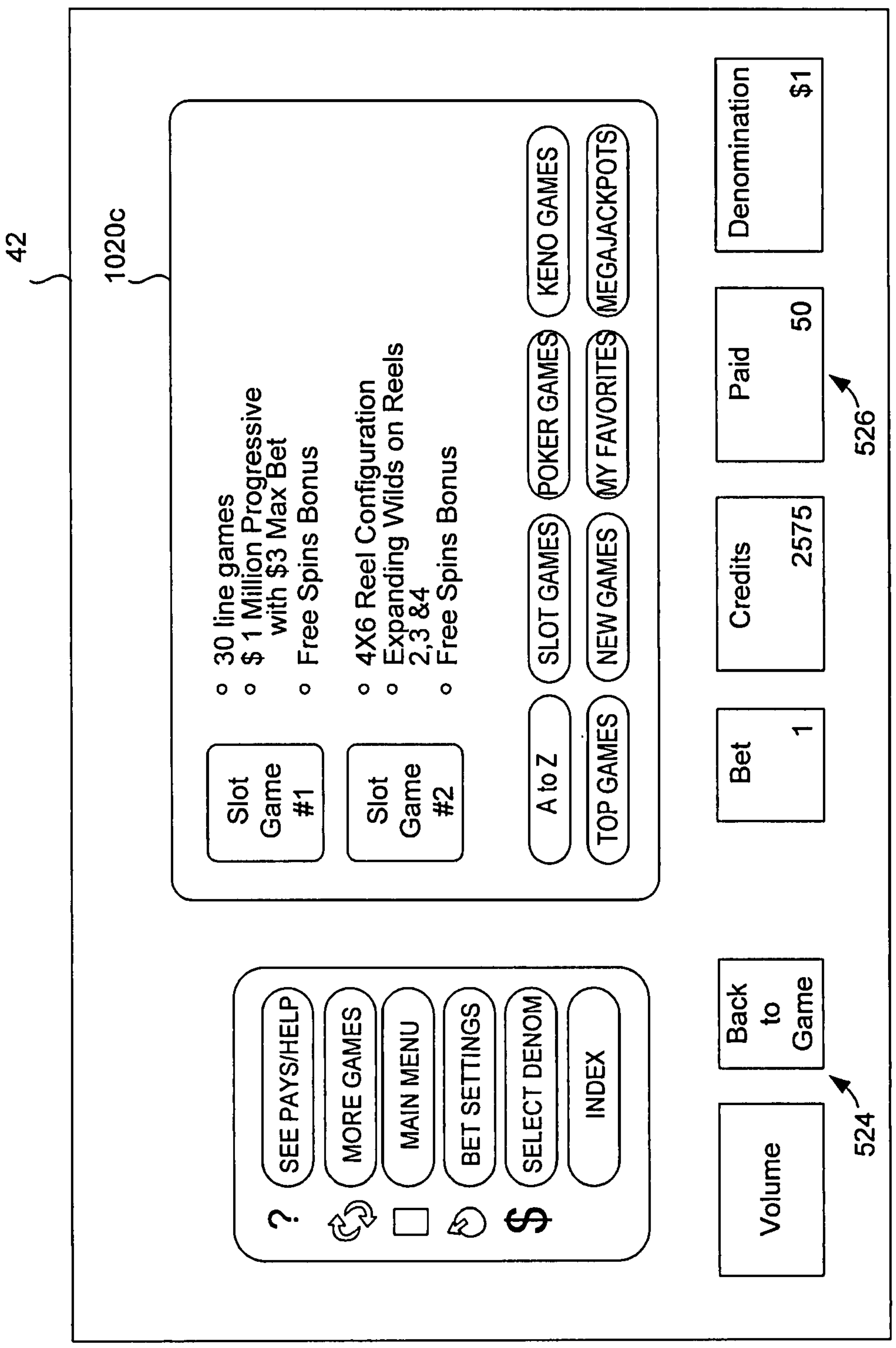
Figure 9D:
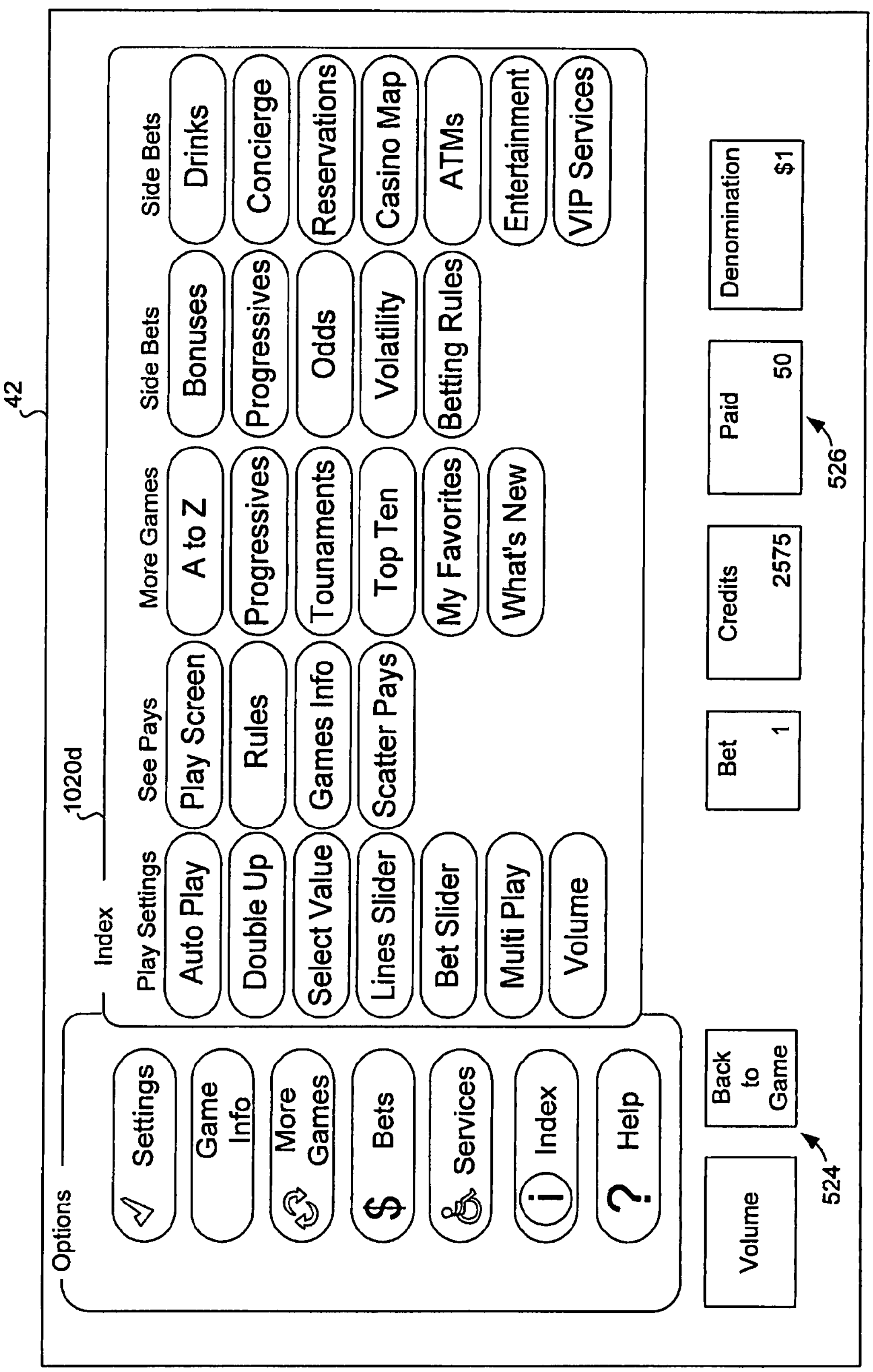

In one embodiment, one or more aspects of the customizable interface are associated with functions performed by the host (i.e., the player or ECI interface 502) and/or one or more aspects of the customizable interface are associated with functions performed by the gaming machine (i.e., the game interface 503). That is, as illustrated in FIG. 9D, the result of at least one player input that is detected on the gaming device may cause a change related to the locally controlled game (e.g., a player changing their bet amount via the bet slider input) and the result of at least another player input may cause a change related to the externally controlled process (e.g., a player notifying a gaming establishment concierge via the concierge input). In another embodiment, one or more aspects of the customizable interface may be independent of the game interface (controlled by the master gaming controller including a gaming machine processor) and/or one or more aspects of the customizable interface may be based on one or more events associated with the game interface. In different embodiments, the customizable interface is associated with information personal to the player, information relating to the plurality of different games available to the player, information communicated from a gaming establishment services system, information communicated from at least another gaming machine or information relating to any other suitable aspect of the player's experience at the gaming machine. This configuration may enable different customizable features performed by different processors at different locations to be simultaneously displayed and altered by the player, thus enhancing the player's gaming experience.

In a first setting of one embodiment of the gaming machine of the gaming system disclosed herein, the display device may be operable to display gaming outcomes. In a second setting of this embodiment, the display may be operable to shade the gaming outcomes and activate an interactive player menu from a single touch of a button. The button may be a touch screen activated button or mechanical button coupled to the gaming device. When this button is pressed, a menu may be displayed with a number of options that will bring up further menus, thus resulting in a number of nested menus 1020. As seen in FIGS. 9B, 9C & 9D, the plurality of nested menus 1020 may enable the player to navigate through different aspects of the interface in an efficient manner. Such an embodiment may provide the player a maximum amount of accessible information with a minimum number of player inputs. In different embodiments, the nested menus which are displayed and accessible by a player may be predetermined, determined based on the player's status (such as determined through a player tracking system), determined by the host, determined by the gaming machine processor, determined based on one or more side wagers placed, determined based on the player's primary game wager, determined based on time (such as the time of day) or determined based on any other suitable method or criteria. It should be appreciated that utilizing one or more nested menus optimizes the player's ease of use of the gaming machine by providing an interface wherein the features of the greatest interest are available from a single button. That is, to access the menus, the player may need only touch a single button from the base game and the menu bar will pop up giving the player immediate access to a number of features.

In one embodiment, as illustrated in FIGS. 9B and 9C, a first available submenu enables the player to interact with a host which stores a plurality of games. For example, by accessing a "More Games" submenu, the player accesses a database of available games. In this example, the gaming machine enables the player to choose a game to play, store one or more games as favorites, rate a game on a scale of some type (e.g., 3.5 our of 4 stars where is 1 is a poor game and 4 is an excellent game or 9 out of 10 wherein 1 is a poor game and 10 is a great game), or browse information pertaining to the different games available. Such a configuration provides the player the ability to select any game that is available to play at the player's current gaming machine and thus eliminating a player having to search for a specific machine in order to play a specific game. This submenu provides the player with a superior interface for interacting with the capabilities that the disclosed gaming system present. In a particular embodiment, the submenu may be in a "tabbed" format.

The rating information provided by the player may be stored for only the player, collected and combined with other players rating information or combinations thereof. The rating information provided by the player may be stored for only the player, collected and combined with other players rating information or combinations thereof. In one embodiment, combined rating information generated from player selections may utilized by a gaming operator to determine a distribution of games in a casino and not necessarily displayed to the player. In another embodiment, the combined rating information may be displayed to players. Players viewing the combined rating information may utilize the information as an aid in regards to selecting games to play.

The rating information may be displayed alone or in combination with other information. For instance, the rating information may be displayed in conjunction with ranking information such as the most played games, the games providing the most awards (hot games), the games providing the least awards (cool games). Further, the information including the rating information, ranking information may be categorized, such as according to game theme or game type. Further, the rating information may be sorted, such as from highest to lowest ranked or lowest to highest, top 10, top 3, etc. In particular embodiments, the rating and/or ranking information may be sorted within a category (e.g., the rankings and/or ratings of the game may be sorted on only data from the particular category) or the combinations of information may be sorted across all games for which data is available and then the data may be sorted according to category.

In another embodiment, a second submenu enables the player to access designated information personal and exclusive to the player. For example, the player accesses this submenu via a "Services" button. From this menu, the gaming machine of the gaming system enables the player to access their casino account, redeem comps, check on their points, update their information, redeem qualified promotions or bonuses, or perform any other beneficial function for the player or gaming establishment. In one such embodiment, the account store game preference information (such as denomination, games, paylines, etc.) that will automatically load onto the gaming machine.

In another embodiment, a third available submenu enables the player to instruct the gaming machine processor to interact with a gaming establishment services system. From this menu, as described above, the player is enabled to connect the gaming machine with certain gaming establishment services, such as order a drink, make a reservation for dinner, make entertainment reservations, call a host or employee, report a malfunction, call for service, or perform any other gaming establishment service function that would be beneficial to the player or to the gaming establishment.

In another embodiment, a fourth available submenu available enables the player to instruct the gaming machine processor to interact with at least another gaming machine. In this embodiment, utilizing such a submenu, the player could connect with another gaming machine for purposes of shared game play, wagering on the outcome of another gaming machine, communication, participating in different bonus games not available on their own gaming machine, create their own groupings of player to participate in a bonus event, or any other possible game function. Such a configuration enables the player to enhance their gaming experience by connecting with other gaming machines, searching for a specific player/machine, join specific tournaments or progressive events or group with other players to form a group that may be associated with their own bonus event.

In another embodiment, a fifth available submenu enables the player to modify the function of at least one setting for the gaming machine. In this embodiment, possible play settings that may be modified include, but are not limited to an autoplay setting, a double-up setting, a value selection setting, a payline selection setting, a wager selection setting, a multiplay selection setting, a volume selection setting, or any other appropriate modification to the settings. This embodiment enables the player to essentially customize the gaming machine to their own personal preferences and settings. It should be appreciated that this feature may hooked into a player tracking database wherein the player could store their preferences and use this sub-menu to enact them.

In another embodiment, a sixth available submenu enables the player to display pay table information. Possible displayed information includes, but is not limited to pay screen information, game rule information, game type information, scatter pay information, winning combination information, pay table information or any other appropriate information relating to the game pay or game pay statistics. This embodiment enables the player to learn more about the game they are playing, understand what the payout/winning combinations are, and gain a feel for the game's play.

In another embodiment, a seventh available submenu enables the player to modify the function of at least one side bet setting for the gaming machine. In this embodiment, a gaming establishment may have multiple progressives running at the same time, wherein by providing the player access to a special side bet section, the gaming system enables the player to choose which progressives they wish to participate in and place a side wager. It should be appreciated that any other gaming events associated with a side wager could be linked into this submenu as well.

It should be appreciated that to build one or more of the menus described above, the host utilizes information specific to each gaming device, such as how the games on a designated gaming device are configured, what games are stored locally on a designated gaming device, which player is playing a designated gaming device and what promotional features is the player qualified for. In one embodiment, the player's currently played gaming device communicates information to the host and the host builds one or more menus based on this communicated information. In another embodiment, when the host communicates or downloads information relating to the currently played game program of the gaming device, the host logs in the appropriate information. In this embodiment, when determining to build one or more menus, the host accesses this logged in information to determine one or more menus for the player's currently played gaming device. In another embodiment, the host periodically checks which games are being played on one or more gaming devices and stores information or data relating resulting from these checks. In this embodiment, when building one or more menus, the host accesses this stored information to determine one or more menus for the player's currently played gaming device.

In the examples described above, ECIs that may be utilized by a player are described, the present invention is not limited to ECIs utilized by a player. In other embodiments, ECIs may be provided that are meant to be only accessible to a gaming operator, such as configuration, game download, metering, hand pays, jackpot verification, tax forms, or diagnostic menus, history for a particular gaming device. To access an ECI meant to be accessed by a gaming operator, the gaming device may require additional information to be entered and verified, such as a PIN number/password, a special card to be inserted in a card reader, biometric information, information from a host, such as an authorization or combinations thereof.

Gaming Machine

Figure 6:
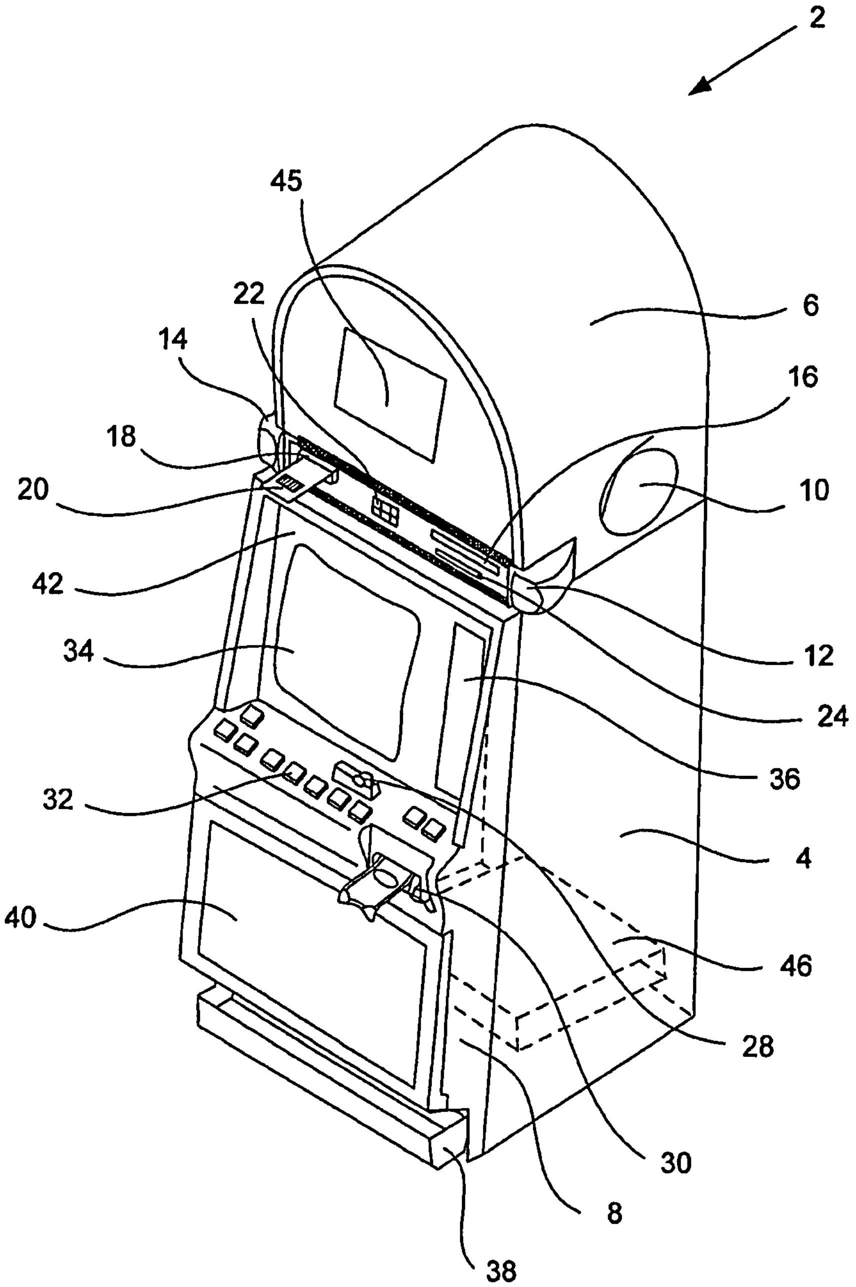
FIG. 6 illustrates a perspective view of one embodiment of a gaming machine.
Figure 7:
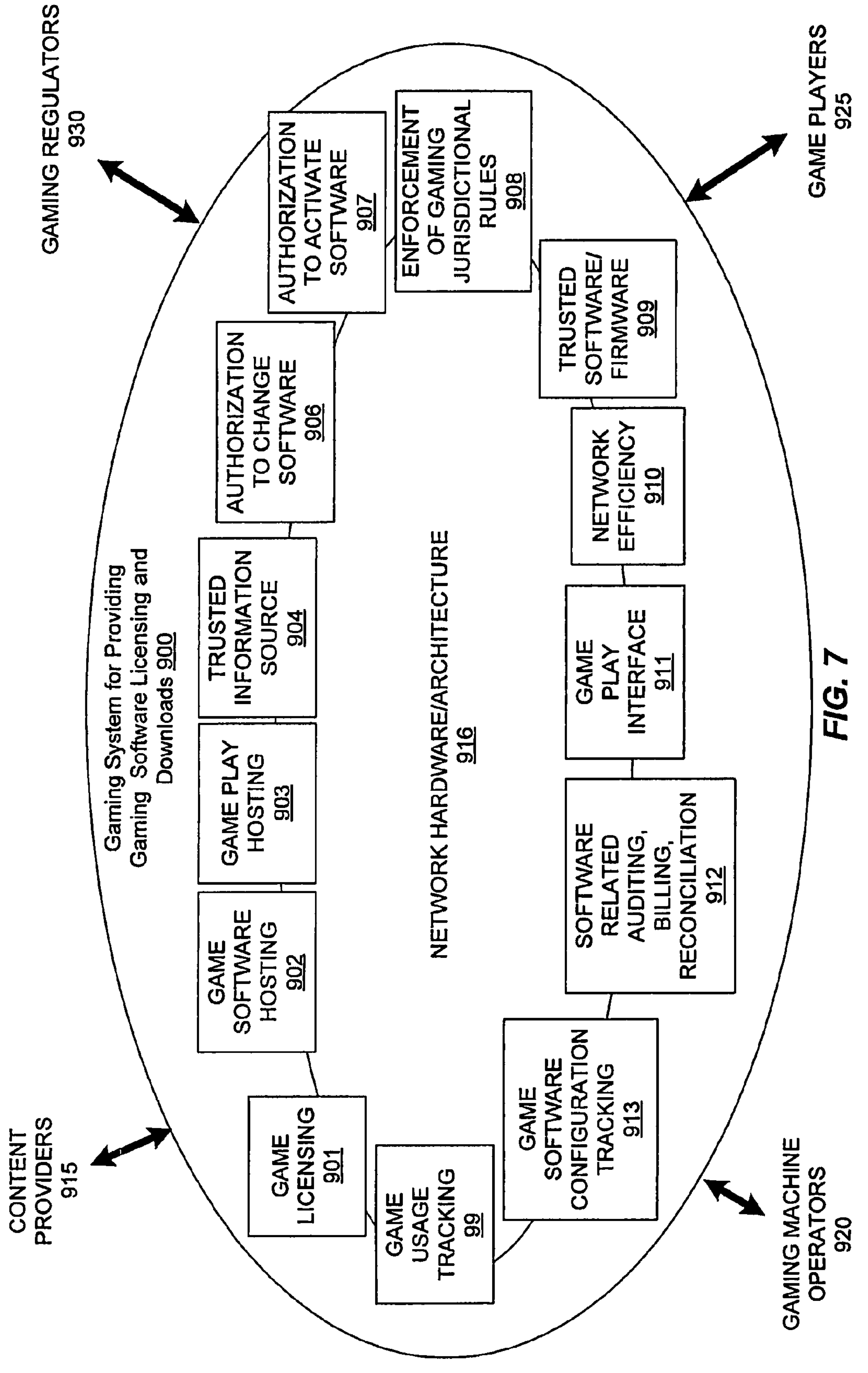
FIG. 7 illustrates a block diagram of a gaming system for embodiments of the present invention.

FIG. 6 shows a perspective view of a gaming machine 2 in accordance with a specific embodiment of the present invention. The gaming devices and gaming functions described with respect to at least FIG. 6 may be incorporated as components of the ECI's described above with respect to at least FIGS. 1 thru 5B and 9A-9D. Further, the gaming devices may be operated in accordance with instructions received from a host in communication with the gaming machine. In some instance, a host-controlled process executed on the gaming machine may share a gaming device with a process controlled by the master gaming controller 46 on the gaming machine.

As illustrated in the example of FIG. 6, machine 2 includes a main cabinet 4, which generally surrounds the machine interior and is viewable by users. The main cabinet includes a main door 8 on the front of the machine, which opens to provide access to the interior of the machine.

In one embodiment, attached to the main door is at least one payment acceptor 28 and a bill validator 30, and a coin tray 38. In one embodiment, the payment acceptor may include a coin slot and a payment, note or bill acceptor, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming machine. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming machine. In one embodiment, money may be transferred to a gaming machine through electronic funds transfer. When a player funds the gaming machine, the master gaming controller 46 or another logic device coupled to the gaming machine determines the amount of funds entered and displays the corresponding amount on the credit or other suitable display as described above.

In one embodiment attached to the main door are a plurality of player-input switches or buttons 32. The input switches can include any suitable devices which enables the player to produce an input signal which is received by the processor. In one embodiment, after appropriate funding of the gaming machine, the input switch is a game activation device, such as a pull arm or a play button which is used by the player to start any primary game or sequence of events in the gaming machine. The play button can be any suitable play activator such as a bet one button, a max bet button or a repeat the bet button. In one embodiment, upon appropriate funding, the gaming machine may begin the game play automatically. In another embodiment, upon the player engaging one of the play buttons, the gaming machine may automatically activate game play.

In one embodiment, one input switch is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input switch is a bet max button (not shown), which enables the player to bet the maximum wager permitted for a game of the gaming machine.

In one embodiment, one input switch is a cash-out button. The player may push the cash-out button and cash out to receive a cash payment or other suitable form of payment corresponding to the number of remaining credits. In one embodiment, when the player cashes out, the player may receive the coins or tokens in a coin payout tray. In one embodiment, when the player cashes out, the player may receive other payout mechanisms such as tickets or credit slips redeemable by a cashier (or other suitable redemption system) or funding to the player's electronically recordable identification card. Details of ticketing or voucher system that may be utilized with the present invention are described in co-pending U.S. patent application Ser. No. 10/406,911, filed Apr. 2, 2003, by Rowe, et al., and entitled, "Cashless Transaction Clearinghouse," which is incorporated herein by reference and for all purposes.

In one embodiment, one input switch is a touch-screen coupled with a touch-screen controller, or some other touch-sensitive display overlay to enable for player interaction with the images on the display. The touch-screen and the touch-screen controller may be connected to a video controller. A player may make decisions and input signals into the gaming machine by touching the touch-screen at the appropriate places. One such input switch is a touch-screen button panel.

In one embodiment, the gaming machine may further include a plurality of communication ports for enabling communication of the gaming machine processor with external peripherals, such as external video sources, expansion buses, game or other displays, an SCSI port or a key pad.

As seen in FIG. 6, viewable through the main door is a video display monitor 34 and an information panel 36. The display monitor 34 will typically be a cathode ray tube, high resolution flat-panel LCD, SED based-display, plasma display, a television display, a display based on light emitting diodes (LED), a display based on a plurality of organic light-emitting diodes (OLEDs), a display based on polymer light-emitting diodes (PLEDs), a display including a projected and/or reflected image or any other suitable electronic device or display. The information panel 36 or belly-glass 40 may be a static back-lit, silk screened glass panel with lettering to indicate general game information including, for example, a game denomination (e.g. $0.25 or $1) or a dynamic display, such as an LCD, an OLED or E-INK display. In another embodiment, at least one display device may be a mobile display device, such as a PDA or tablet PC, that enables play of at least a portion of the primary or secondary game at a location remote from the gaming machine. The display devices may be of any suitable size and configuration, such as a square, a rectangle or an elongated rectangle.

The display devices of the gaming machine are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like. In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia. In another embodiment, the display device may include an electromechanical device adjacent to a video display, such as a video display positioned in front of a mechanical reel. In another embodiment, the display device may include dual layered video displays which co-act to generate one or more images.

The bill validator 30, player-input switches 32, video display monitor 34, and information panel are gaming devices that may be used to play a game on the game machine 2. Also, these devices may be utilized as part of an ECI provided on the gaming machine. According to a specific embodiment, the devices may be controlled by code executed by a master gaming controller 46 housed inside the main cabinet 4 of the machine 2. The master gaming controller may include one or more processors including general purpose and specialized processors, such as graphics cards, and one or more memory devices including volatile and non-volatile memory. The master gaming controller 46 may periodically configure and/or authenticate the code executed on the gaming machine.

In one embodiment, the gaming machine may include a sound generating device coupled to one or more sounds cards. In one embodiment, the sound generating device includes at least one and preferably a plurality of speakers or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machine may include a sensor, such as a camera that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In another embodiment, the gaming devices on the gaming machine may be controlled by code executed by the master gaming controller 46 (or another logic device coupled to or in communication with the gaming machine, such as a player tracking controller) in conjunction with code executed by a remote logic device in communication with the master gaming controller 46. As described above with respect to at least FIGS. 1A to 5B and 7, 8, 9A-9D, the master gaming controller 46 may execute ECI processes that enable content generated and managed on a host to be output on the gaming machine. The gaming machine may receive and send events to a host that may affect the content output on an instantiation of a particular ECI. The master gaming controller 46 may be configured to limit the resources that can be utilized by the ECI processes executing on the gaming machine at any given time and may constantly monitor resources utilized by the ECI processes to ensure that gaming experience on the gaming machine is optimal.

Games Played

Many different types of games, including mechanical slot games, video slot games, video poker, video black jack, video pachinko and lottery, may be provided with gaming machines of this present invention. In particular, the gaming machine 2 may be operable to provide a play of many different games of chance. The games may be differentiated according to themes, sounds, graphics, type of game (e.g., slot game vs. card game), denomination, number of paylines, maximum jackpot, progressive or non-progressive, bonus games, etc.

In one embodiment, the gaming machine 2 may be operable to enable a player to select a game of chance to play from a plurality of different games available on the gaming machine. For example, the gaming machine may provide a menu with a list of the different games that are available for play on the gaming machine and a player may be able to select from the list a first game of chance that they wish to play. In one such embodiment, a memory device of the host stores different game programs and instructions, executable by a gaming machine processor, to control the gaming machine. Each executable game program represents a different game or type of game, which may be played on one or more of the gaming machines in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming machine) or vice versa.

In one such embodiment, each gaming machine includes at least one or more display devices and/or one or more input switches for interaction with a player. A local processor, such as the above-described gaming machine processor or a processor of a local server, is operable with the display device(s) and/or the input switch(s) of one or more of the gaming machines. In operation, the host is operable to communicate one or more of the stored game programs to at least one local gaming machine processor. In different embodiments, the stored game programs are communicated or delivered by embedding the communicated game program in a device or a component (e.g., a microchip to be inserted in a gaming machine), writing the game program on a disc or other media, downloading or streaming the game program over a dedicated data network, internet or a telephone line. In different embodiments, the stored game programs are downloaded in response to a player inserting a player tracking card, a player selecting a specific game program, a player inserting a designated wager amount, the host communicating data to the gaming device regarding an upcoming tournament or promotion or any other suitable trigger. After the stored game programs are communicated from the host, the local gaming machine processor executes the communicated program to facilitate play of the communicated program by a player through the display device(s) and/or input switch(s) of the gaming machine. That is, when a game program is communicated to a local gaming machine processor, the local gaming machine processor changes the game or type of game played at the gaming machine.

In particular embodiments, the master gaming controller 46 may provide information to a host providing content to an ECI on the gaming machine 2 that enables the host to select graphical and audio themes for the ECI content that matches the theme of the game graphics and game sounds currently played on the gaming machine 2.

In one embodiment, the various games available for play on the gaming machine 2 may be stored as game software on a mass storage device in the gaming machine. In one such embodiment, the memory device of the gaming machine stores program codes and instructions, executable by the gaming machine processor, to control the games available for play on the gaming machine. The memory device also stores other data such as image data, event data, player input data, random or pseudo-random number generators, pay-table data or information and applicable game rules that relate to the play of the gaming machine. In another embodiment, the games available for play on the gaming machine may be generated on another gaming device, such as a game server, but then displayed on the gaming machine.

In one embodiment, the gaming machine 2 may execute game software, such as but not limited to video streaming software that enables the game to be displayed on the gaming machine. When a game is stored on the gaming machine 2, it may be loaded from the mass storage device into a RAM for execution. In some cases, after a selection of a game, the game software that enables the selected game to be generated may be downloaded from another gaming device, such as a server or another gaming machine.

As illustrated in the example of FIG. 6, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a display 16 (e.g., a video LCD display) for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 6. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller 46) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others may have multiple displays.

Networks

In various embodiments, a gaming device may be connected to a host via a network of some type such as a local area network, a wide area network, an intranet or the Internet. In one such embodiment, a plurality of the gaming machines may be capable of being connected together through a data network. In one embodiment, the data network is a local area network (LAN), in which one or more of the gaming machines are substantially proximate to each other and an on-site host as in, for example, a gaming establishment or a portion of a gaming establishment. In another embodiment, the data network is a wide area network (WAN) in which one or more of the gaming machines are in communication with at least one off-site host. In this embodiment, the plurality of gaming machines may be located in a different part of the gaming establishment or within a different gaming establishment than the off-site host. Thus, the WAN may include an off-site host and an off-site gaming machine located within gaming establishments in the same geographic area, such as a city or state. The WAN gaming system may be substantially identical to the LAN gaming system described above, although the number of gaming machines in each system may vary relative to each other.

In another embodiment, the data network is an internet or intranet. In this embodiment, the operation of the gaming machine can be viewed at the gaming machine with at least one internet browser. In this embodiment, operation of the gaming machine and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, the gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a gaming device to render an image from a virtual camera in a 3-D gaming environments stored on the gaming device and to display the rendered image on a display located on the gaming device. In addition, various combinations of gaming devices are possible on the gaming machine. For example, some gaming machines only accept cash, cashless vouchers or electronic fund transfers and do not include coin acceptors or coin hoppers. Thus, those of skill in the art will understand that the present invention, as described below, can be deployed on most any gaming machine now available or hereafter developed.

In another embodiment, the gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming machine as disclosed herein may be a device that has obtained approval from a regulatory gaming commission or a device that has not obtained approval from a regulatory gaming commission.

Gaming Machine vs. General-Purpose Computer

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that enables the first state to be reconstructed is stored. This feature enables the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

In particular embodiments, a state of a gaming device may be reconstructed from game history information stored in multiple locations. For instance, in one embodiment, a gaming device operable to provide an ECI and a game interface simultaneously may not store state information for the ECI but only for the game interface. Thus, to reconstruct the state of gaming device including the ECI in a dispute, after a malfunction or after a power-failure, game history information may have to be retrieved from a local memory source on the gaming device and a remote memory source located on a host that provides the ECI. For example, the remote and gaming machine may store correlation information, such as timing information or referential information, that allows events on the gaming machine to be correlated to events occurring on the host. The correlation information stored at the gaming machine and/or host may be used to synchronize the reconstruction of a game state on the gaming machine. In a particular embodiment, a host that provides ECI services to a gaming device may provide an ECI that allows archival information regarding ECIs displayed on a gaming device to be retrieved.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not enable modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is enabled to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a gaming machine environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Game Play

Returning to the example of FIG. 6, when a user wishes to play the gaming machine 2, he or she inserts a ticket or cash through the payment or coin acceptor 28 or bill validator 30. Additionally, the bill validator may accept a printed ticket voucher, which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

In one embodiment, as described above, the gaming machine can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, a base or primary game may be a slot game with one or more paylines. The paylines may be horizontal, vertical, circular, diagonal, angled or any combination thereof. In this embodiment, the gaming machine includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels, which may be combined and operably coupled with an electronic display of any suitable type. In another embodiment, if the reels are in video form, one or more of the display devices, as described above, display the plurality of simulated video reels. Each reel displays a plurality of indicia or symbols, such as bells, hearts, fruits, numbers, letters, bars or other images, which preferably correspond to a theme associated with the gaming machine. In another embodiment, one or more of the reels are independent reels or unisymbol reels. In this embodiment, each independent or unisymbol reel generates and displays one symbol to the player. In one embodiment, the gaming machine awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming machine determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming machine provides the player one award for that occurrence of the generated winning symbol combination. For example, if one winning symbol combination is generated on the reels, the gaming machine will provide a single award to the player for that winning symbol combination (i.e., not based on paylines that would have passed through that winning symbol combination). It should be appreciated that because a gaming machine with wagering on ways to win provides the player one award for a single occurrence of a winning symbol combination and a gaming machine with paylines may provide the player more than one award for the same occurrence of a single winning symbol combination (i.e., if a plurality of paylines each pass through the same winning symbol combination), it is possible to provide a player at a ways to win gaming machine more ways to win for an equivalent bet or wager on a traditional slot gaming machine with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming machine with at least one symbol generated in an active symbol position. For example, a three reel gaming machine with three symbols generated in active symbol positions on each reel includes 27 ways to win (i.e., 3 symbols on the first reel×3 symbols on the second reel×3 symbols on the third reel). A four reel gaming machine with three symbols generated in active symbol positions on each reel includes 81 ways to win (i.e., 3 symbols on the first reel×3 symbols on the second reel×3 symbols on the third reel×3 symbols on the fourth reel). A five reel gaming machine with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming machine may enable a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming machine uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming machine provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming machine provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming machine individually determines if a symbol generated in an active symbol position on a first reel forms part of a winning symbol combination with or is otherwise suitably related to a symbol generated in an active symbol position on a second reel. In this embodiment, the gaming machine classifies each pair of symbols, which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming machine classifies the two cherry symbols as a string of related symbols because the two cherry symbols form part of a winning symbol combination.

After determining if any strings of related symbols are formed between the symbols on the first reel and the symbols on the second reel, the gaming machine determines if any of the symbols from the next adjacent reel should be added to any of the formed strings of related symbols. In this embodiment, for a first of the classified strings of related symbols, the gaming machine determines if any of the symbols generated by the next adjacent reel form part of a winning symbol combination or are otherwise related to the symbols of the first string of related symbols. If the gaming machine determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming machine adds the related cherry symbol generated on the third reel to the previously classified string of cherry symbols.

On the other hand, if the gaming machine determines that no symbols generated on the next adjacent reel are related to the symbols of the first string of related symbols, the gaming machine marks or flags such string of related symbols as complete. For example, if the first string of related symbols is the string of related cherry symbols and none of the symbols of the third reel are related to the cherry symbols of the previously classified string of cherry symbols, the gaming machine marks or flags the string of cherry symbols as complete.

After either adding a related symbol to the first string of related symbols or marking the first string of related symbols as complete, the gaming machine proceeds as described above for each of the remaining classified strings of related symbols which were previously classified or formed from related symbols on the first and second reels.

After analyzing each of the remaining strings of related symbols, the gaming machine determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming machine marks each of the remaining pending strings of related symbols as complete.

When each of the strings of related symbols is marked complete, the gaming machine compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming machine enables the player to play a conventional game of video draw poker and initially deals five cards all face up from a virtual deck of fifty-two card deck. Cards may be dealt as in a traditional game of cards or in the case of the gaming machine, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming machine compares the final five-card hand to a payout table which utilizes conventional poker hand rankings to determine the winning hands. The gaming machine provides the player with an award based on a winning hand and the credits the player wagered.

In another embodiment, the base or primary game may be a multi-hand version of video poker. In this embodiment, the gaming machine deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming machine displays a plurality of selectable indicia or numbers on at least one of the display devices. In this embodiment, the player selects at least one or a plurality of the selectable indicia or numbers via an input device such as the touch screen. The gaming machine then displays a series of drawn numbers to determine an amount of matches, if any, between the player's selected numbers and the gaming machine's drawn numbers. The player is provided an award based on the amount of matches, if any, based on the amount of determined matches.

In one embodiment, in addition to winning credits or other awards in a base or primary game, as described above, the gaming machine may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game. In other embodiments, the triggering event or qualifying condition may be by exceeding a certain amount of game play (such as number of games, number of credits, amount of time), or reaching a specified number of points earned during game play.

In another embodiment, the gaming machine processor or host randomly provides the player one or more plays of one or more secondary games. In one such embodiment, the gaming machine does not provide any apparent reasons to the player for qualifying to play a secondary or bonus game. In this embodiment, qualifying for a bonus game is not triggered by an event in or based specifically on any of the plays of any primary game. That is, the gaming machine may simply qualify a player to play a secondary game without any explanation or alternatively with simple explanations. In another embodiment, the gaming machine (or host) qualifies a player for a secondary game at least partially based on a game triggered or symbol triggered event, such as at least partially based on the play of a primary game.

In one embodiment, the gaming machine includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Gaming System Components

FIG. 7A shows a block diagram illustrating components of a gaming system 900 which may be used for implementing various aspects of the present invention. In FIG. 7A, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 7A, only one instance of each function is shown. The functions of the components may be combined. For example, a single device may comprise the game play interface 911 and include trusted memory devices or sources 909. The described components and their functions may be incorporated various embodiments of the servers and clients described with respect to at least FIGS. 1A and 6.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 7A. The game software license host 901 may be a server in communication with a number of gaming devices that provides licensing services to the gaming devices. For example, in other embodiments, the license host 901 may 1) receive token requests for tokens used to activate software executed on the gaming devices, 2) send tokens to the gaming devices, 3) track token usage and 4) grant and/or renew software licenses for software executed on the gaming devices. The token usage may be used in utility based licensing schemes, such as a pay-per-use scheme.

In another embodiment, a game usage tracking host 99 may track the usage of game software on a plurality of devices in communication with the host. The game usage tracking host 99 may be in communication with a plurality of game play hosts and gaming machines. From the game play hosts and gaming machines, the game usage tracking host 99 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, “Gaming Terminal Data Repository and Information System,” filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC’s and PDA’s. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to enable the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other’s identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of the present invention may include devices 906 that provide authorization to download software from a first device to a second device and devices 907 that provide activation codes or information that enable downloaded software to be activated. The devices, 906 and 907, may be remote servers and may also be trusted information sources. One example of a method of providing product activation codes that may be used with the present invention is describes in previously incorporated U.S. Pat. No. 6,264, 561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC’s, of particular software components and compare them with an approved digital signature value stored on the gaming jurisdictional rule server.

Further, the gaming jurisdictional rule server may scan the gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to remain viable. Thus, in the present inventions, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 7A. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of the present invention.

Gaming System Configuration

In one embodiment, as described above, the present invention may be implemented in various configurations for gaming machines, including but not limited to: (1) a dedicated gaming machine, wherein the computerized instructions for controlling any games (which are provided by the gaming machine) are provided with the gaming machine prior to delivery to a gaming establishment; and (2) a changeable gaming machine, where the computerized instructions for controlling any games (which are provided by the gaming machine) are downloadable to the gaming machine through a data network when the gaming machine is in a gaming establishment. In another embodiment, the computerized instructions for controlling any games are communicated from the host, the central server or central controller to a gaming machine local processor and memory devices. In such a "thick client" embodiment, the gaming machine local processor executes the communicated computerized instructions to control any games (or other suitable interfaces) provided to a player.

In one alternative embodiment, the computerized instructions for controlling any games are executed by a host, a central server or central controller. In such a "thin client" embodiment, the host remotely controls any games (or other suitable interfaces) and the gaming machine is utilized to display such games (or suitable interfaces) and receive one or more inputs or commands from a player. In one embodiment, one or more gaming machines in a gaming system may be thin client gaming machines and one or more gaming machines in the gaming system may be thick client gaming machines. In another embodiment, certain functions of the gaming machine are implemented in a thin client environment and certain other functions of the gaming machine are implemented in a thick client environment. In one such embodiment, computerized instructions for controlling any primary games are communicated from the host to the gaming machine in a thick client configuration and computerized instructions for controlling any secondary games or bonus functions are executed by a host in a thin client configuration. It should be appreciated that one, more or each of the functions of the host as disclosed herein may be performed by one or more gaming machine processors. It should be further appreciated that one, more or each of the functions of one or more gaming machine processors as disclosed herein may be performed by the host.

In one embodiment, the gaming machine randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming machine generates the award or other game outcome to be provided to the player based on the associated probabilities. In this embodiment, since the gaming machine generates outcomes randomly or based upon one or more probability calculations, there is no certainty that the gaming machine will ever provide the player with any specific award or other game outcome.

In an alternative embodiment, the host maintains one or more predetermined pools or sets of predetermined game outcomes. In this embodiment, the host receives the game outcome request and independently selects a predetermined game outcome from a set or pool of game outcomes. The host flags or marks the selected game outcome as used. Once a game outcome is flagged as used, it is prevented from further selection from the set or pool and cannot be selected by the host upon another wager. The provided game outcome can include a primary game outcome, a secondary game outcome, primary and secondary game outcomes, or a series of game outcomes such as free games.

The host communicates the generated or selected game outcome to the initiated gaming machine. The gaming machine receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the host and communicated to the initiated gaming machine to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming machines based on the results of a bingo, keno or lottery game. In this embodiment, each individual gaming machine utilizes one or more bingo, keno or lottery games to determine the predetermined game outcome value provided to the player for the interactive game played at that gaming machine. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming machine is enrolled in the bingo game, such as upon an appropriate wager or engaging an input device, the enrolled gaming machine is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming machines, the same element may be present on all four of the bingo cards while another element may solely be present on one of the bingo cards.

In operation of these embodiments, upon providing or associating a different bingo card to each of a plurality of enrolled gaming machines, the host randomly selects or draws, one at a time, a plurality of the elements. As each element is selected, a determination is made for each gaming machine as to whether the selected element is present on the bingo card provided to that enrolled gaming machine. This determination can be made by the host, the gaming machine, a combination of the two, or in any other suitable manner. If the selected element is present on the bingo card provided to that enrolled gaming machine, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming machine requires the player to engage a daub button (not shown) to initiate the process of the gaming machine marking or flagging any selected elements.

After one or more predetermined patterns are marked on one or more of the provided bingo cards, a game outcome is determined for each of the enrolled gaming machines based, at least in part, on the selected elements on the provided bingo cards. As described above, the game outcome determined for each gaming machine enrolled in the bingo game is utilized by that gaming machine to determine the predetermined game outcome provided to the player. For example, a first gaming machine to have selected elements marked in a predetermined pattern is provided a first outcome of win $10 which will be provided to a first player regardless of how the first player plays in a first game and a second gaming machine to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming machine will provide a predetermined winning game outcome to a player. It should be appreciated that other suitable methods for selecting or determining one or more predetermined game outcomes may be employed.

In one example of the above-described embodiment, the predetermined game outcome may be based on a supplemental award, in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming machine may be provided a supplemental or intermittent award regardless of if the enrolled gaming machine's provided bingo card wins or does not win the bingo game as described above.

In another embodiment, the game outcome provided to the player is determined by a host and provided to the player at the gaming machine. In this embodiment, each of a plurality of such gaming machines are in communication with the host. Upon a player initiating game play at one of the gaming machines, the initiated gaming machine communicates a game outcome request to the host. In one embodiment, the host receives the game outcome request and randomly generates a game outcome for the primary game based on probability data. In another embodiment, the host randomly generates a game outcome for the secondary game based on probability data. In another embodiment, the host randomly generates a game outcome for both the primary game and the secondary game based on probability data. In this embodiment, the host is capable of storing and utilizing program code or other data similar to the processor and memory device of the gaming machine.

In another embodiment, one or more of the gaming machines are in communication with a host for monitoring purposes. That is, when not communicating with the host regarding any ECIs, each individual gaming machine randomly generates the game outcomes to be provided to the player and the host monitors the activities and events occurring on the plurality of gaming machines. In one embodiment, the gaming network includes a real-time or on-line accounting and gaming information system in communication with a host. The accounting and gaming information system of this embodiment includes a player database for storing player profiles, a player tracking module for tracking players and a credit system for providing automated casino transactions.

In another embodiment, a plurality of gaming machines at one or more gaming sites may be networked to the host in a progressive configuration, as known in the art, wherein a portion of each wager to initiate a base or primary game may be allocated to one or more progressive awards. In one embodiment, a progressive gaming system host site computer is in communication with a plurality of the hosts at a variety of mutually remote gaming sites for providing a multi-site linked progressive automated gaming system. In one embodiment, a progressive gaming system host site computer may serve gaming machines distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each host computer may be responsible for all data communication between the gaming machine hardware and software and the progressive gaming system host site computer. In one embodiment, an individual gaming machine may trigger a progressive award win. In another embodiment, a host (or the progressive gaming system host site computer) determines when a progressive award win is triggered. In another embodiment, an individual gaming machine and a remote host (or progressive gaming system host site computer) may work in conjunction with each other to determine when a progressive win is triggered, for example through an individual gaming machine meeting a predetermined requirement established by the host.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming machine is randomly or apparently randomly selected to provide a player of that gaming machine one or more progressive awards. In one such embodiment, the gaming machine does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, the gaming system maintains at least one progressive award by allocating a percentage of a player's wager into the player's own progressive award or pool (i.e., a personal progressive award). In this embodiment, upon the occurrence of an event (either associated with game play or independent of game play), the gaming system provides the player their personal progressive award. In one such embodiment, the gaming system displays, via one or more ECI's (as described above), information related to their personal progressive award.

In another embodiment, a plurality of players at a plurality of linked gaming machines in a gaming system participate in a group gaming environment. In one embodiment, a plurality of players at a plurality of linked gaming machines work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming machines compete against one another for one or more awards. In one such embodiment, a plurality of players at a plurality of linked gaming machines participate in a gaming tournament for one or more awards. In another embodiment, a plurality of players at a plurality of linked gaming machines play for one or more awards wherein an outcome generated by one gaming machine affects the outcomes generated by one or more linked gaming machines.

Figure 10:
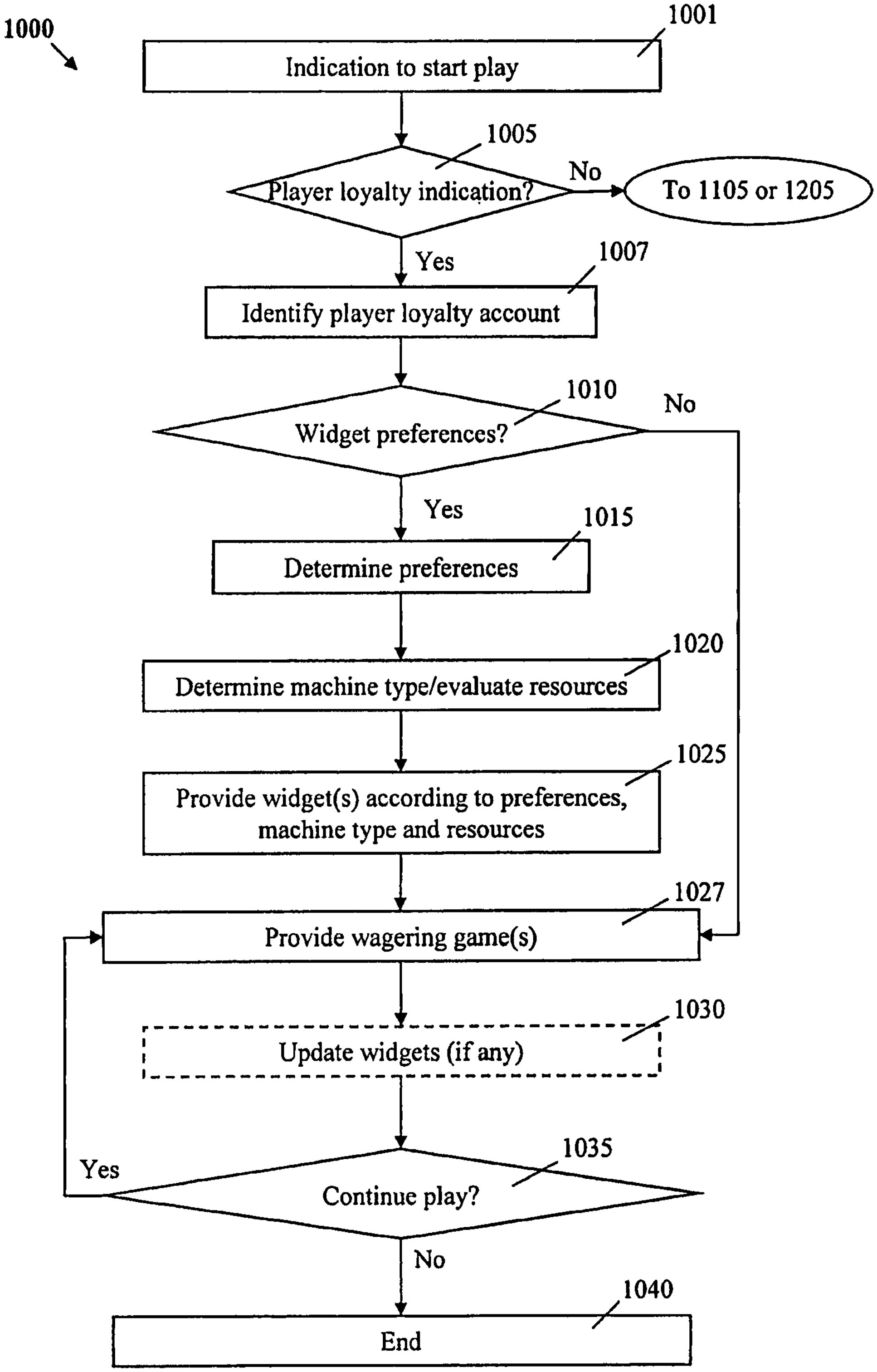
FIG. 10 is a flow chart that outlines some methods of the invention.

Alternative implementations of the invention will now be described with reference to FIG. 10 et seq. The steps of method 1000 may be performed, at least in part, by a wager gaming machine. The steps of method 1000, like those of other methods described herein, are not necessarily performed in the sequence indicated. Moreover, some indicated steps may be optional and other steps may be involved that are not expressly indicated.

Various implementations of the invention will now be described that pertain to obtaining information and/or services via hosts, in the context of wager gaming. In some such implementations, information and/or services will be provided via what will sometimes be referred to herein as "widgets." As known by those of skill in the art, a widget is a virtual tool, normally implemented via software, for providing various information and/or services to a user. Some widgets are interactive and may, for example, provide virtual controls with which a user may interact. A widget may have a characteristic appearance or "skin," which may or may not relate to its functionality.

Some widgets known in the art include Yahoo! Widgets™ and the Dashboard™ widgets provided by Apple™. Such widgets may provide news, weather, a language translator, etc. Although the general concept of a widget is known, the use of widgets in a wager gaming context is believed to be new. This is not surprising in view of the special requirements of wager gaming machines, including but not limited to security requirements and the need to dedicate wager gaming machine resources for providing an exciting and responsive wager gaming experience.

Some implementations of the invention allow players to select and/or customize widgets according to player preferences. The present invention encompasses various methods and devices that allow players to select and/or customize widgets. Method 1000 of FIG. 10, which involves determining such preferences from player loyalty account data, is an example of one such method.

Figure 11:
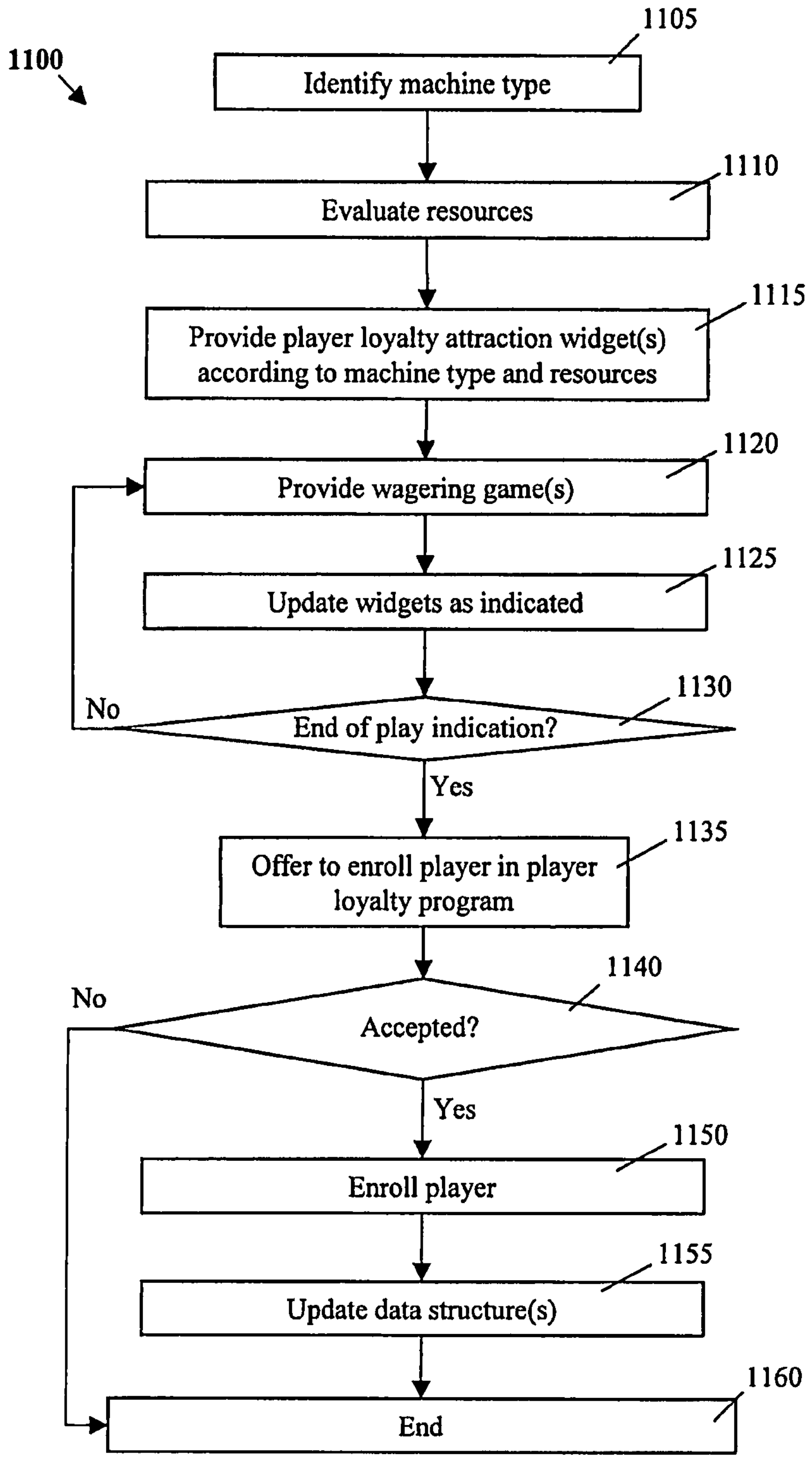
FIG. 11 is a flow chart that outlines alternative methods of the invention.

In step 1001, an indication to start play is received. For example, a wager gaming machine may receive cash or other indicia of credit, may receive a game selection, etc. In step 1005, it will be determined whether the player has indicated player loyalty account information. For example, the wager gaming machine may obtain player loyalty account information by reading a player loyalty card or other player loyalty instrument. Alternatively, the player may be prompted to insert a player loyalty card, to input player loyalty account information on a keypad or other input device, etc. If no player loyalty account information is received, the process will continue along an alternate path, e.g., via continuing to step 1105 of method 1100 (see FIG. 11) or to step 1205 of method 1200 (see FIG. 12).

However, if player loyalty account information is received, the player account may be identified and the type of gaming device being used by the player may be indicated, e.g., to a server of a player loyalty system. (Step 1007.) Data associated with the player loyalty account will be accessed to determine whether player preference data are associated with the player loyalty account. In some implementations of the invention, players may indicate widget preferences and cause such preference data to be stored. In some such implementations, customized widgets may be created according to indicated player preferences. Some methods of indicating such preferences and of associating preference data will be described in more detail below.

In step 1010, it is determined (in this example, by reference to data associated with a player loyalty account) whether the player has previously indicated any widget preferences. Step 1010 may involve, for example, querying a database maintained by a player loyalty system. In this example, if no such widget preferences are determined, the process continues to step 1027.

However, if widget preferences are indicated, they are determined (step 1015). Preferably, the type of device to be used for wager gaming is also determined, along with the indicated resources for that device. (Step 1020.) One or more widgets will be enabled, according to indicated player preferences, machine type and available resources. (Step 1025.) If there are regulatory limits on widget types, numbers, sizes, etc., widgets should be enabled only within such limits.

In some preferred implementations, at least a threshold level of one or more wager gaming machine resources (e.g., CPU usage, memory usage, graphics processing usage, network bandwidth usage, sound card usage, video card and/or display device usage, power usage and/or peripheral device usage) will be made available to wager game presentations and related functions. The threshold levels may vary according to the device type and/or the game theme, in part because different device types may have differing levels of available resources and game themes may require different levels of machine resources.

For example, a cabinet-type wager gaming machine is likely to have a larger area available for display devices than a portable gaming device. Such a wager gaming machine may include 3 or more display devices that could potentially be used for displaying widgets, e.g., a first display that is primarily used for game presentations, a second display that is primarily used for graphics associated with a game theme and a third display that is primarily used for a player loyalty program. The second display may, for example, be one of the types of display devices described in U.S. patent application Ser. No. 11/517,861, entitled "CASINO DISPLAY METHODS AND DEVICES" and filed Sep. 7, 2006, which is hereby incorporated by reference in its entirety.

Accordingly, some implementations may impose more stringent limits on displaying widgets on mobile gaming devices, such as PDAs, cellular telephones or the like, than on full-sized wager gaming machines. Some such implementations may place limits on the number of widgets that may be displayed, the percentage of the display that may be occupied by widgets, etc. The limits may be imposed, for example, according to software executing on the gaming device itself, on a device (e.g., a server) used for implementing a player loyalty program, etc.

As wagering games are provided (step 1027), the widgets (if any) are updated. (Step 1030.) This process may vary according to the type of widget(s) that are active. For example, some widgets may comprise media players for providing a stream of selected audio and/or video content, such as music, videos, webcasts, etc. Other widgets, such as those that provide weather information, traffic information, business/financial information (e.g., stock quotes), etc., may be updated at predetermined time intervals.

Figure 14A:
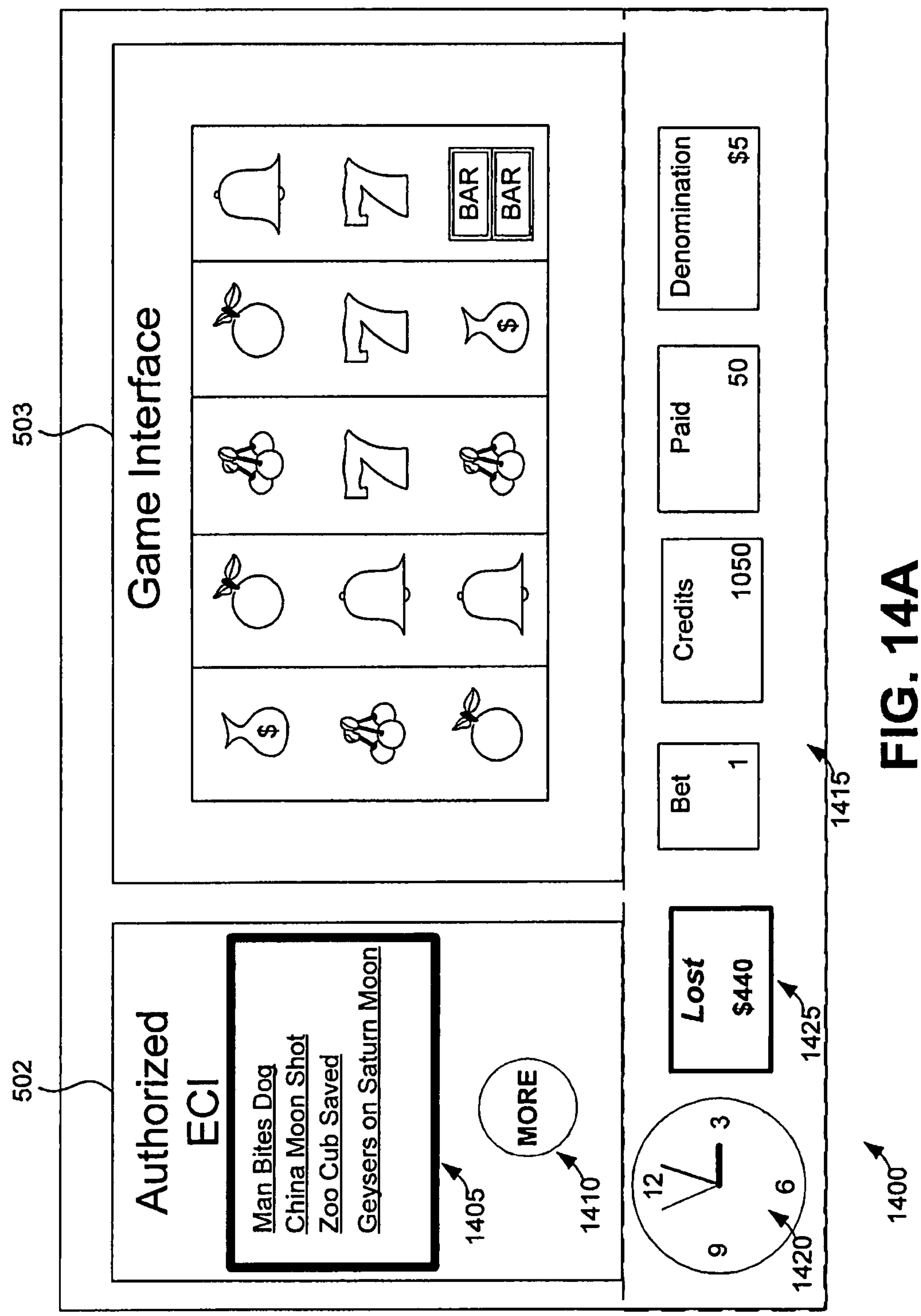
FIGS. 14A and 14B illustrate some graphical user interfaces that may be used to implement some aspects of the invention.

Still other widgets may comprise "feed readers" or "aggregators," which may periodically check a user's subscribed feeds (e.g., web logs, news feeds, or podcasts) to determine whether any of the selected feeds have new content. If so, the widget will be updated with the new content, a link to that content, etc. Such widgets may require only occasional updating or may require frequent updating, according to the frequency at which new content becomes available. The selections of news type or other information type may be made according to a player's preferences. An example of a widget for implementing such an aggregator widget in the wager gaming context is shown in FIG. 14A and described below.

Some widgets may be updated to indicate local news, conditions, etc. As noted elsewhere, some such widgets may indicate local traffic conditions, weather conditions, skiing conditions, etc. Other widgets may indicate local activities and/or opportunities, some of which may be determined according to player preferences. The offers could be for admission to a popular club, for seats at a show, etc. The offers may or may not necessarily be for "comps," related to a player loyalty program, but could simply be informing a player of opportunities known to be desirable to the player. For example, a player who is known to enjoy high-end dining and wines may be informed that, e.g., that the player's favorite restaurant is down to its last bottle of Stag's Leap Vineyard™ SLV 1997, that a table is currently available, etc.

Some widgets may facilitate group gaming. For example, a widget may be configured to inform a player when there are enough poker players who play and/or bet at the player's level, are in the casino and who want to start a game. A widget may also be configured to reserve a table for such games.

In some such implementations, widget could verify the player's historic wagering patterns (e.g., could verify that a player is a "high-roller") according to data in a player loyalty account. Some such player loyalty accounts may include not only data regarding play at wager gaming machines, but also data regarding table game play. Examples of such player loyalty systems are described in U.S. patent application Ser. No. 11/225,299, entitled "Universal Casino Bonusing Systems and Methods" and filed Sep. 12, 2005, which is hereby incorporated by reference.

Various other types of social interaction widgets are provided according to the present invention. Players who are golfers, tennis players, etc., could be matched up with other local players who are at a similar skill level to facilitate satisfactory group play. For example, a widget could match golfers' handicaps to ensure that matched players are at approximately the same skill level. Tee times and/or tennis court reservations could be monitored to determine availability time. Alternatively (or additionally) blocks of tee times or court reservations could be allocated for this service. Some such implementations may also involve retail angle "tie ins," e.g., golf or tennis gear, lessons, etc. While a player is wagering on a gaming machine, the widget may be gathering data regarding possible partners.

A widget may gather data regarding other types of potential partners, e.g., regarding potential dates who are currently in the locale. Some players, whether local or "just passing through," may preferentially patronize a casino that offered such opportunities for meeting potential romantic partners. Moreover, a casino is a relatively safe environment in which to meet strangers because of the ubiquitous security features.

Some widgets may be updated according to wager gaming events, e.g., at a machine used by the player, at another machine and/or player on which a player has placed a "back bet," in response to tournament-related events, etc. For example, a helper/game play widget could monitor play and suggest the ideal way of playing a given hand of poker, blackjack, etc. A tax widget may keep track of winnings or losses, determine a player's estimated tax liability, etc. A "hotness" widget that could control a display to indicate a color, pattern, etc., indicating how well a player is doing at a particular wager gaming machine.

Various other features and services may be enabled via one or more widgets. In some implementations, player loyalty attraction widgets may be used to encourage players to join a player loyalty program. One such method is outlined in FIG. 11. Method 1100 may begin, for example, after it is determined in step 1005 (see FIG. 10) that there is no indication that a player is a member of a player loyalty account. Preferably, the gaming machine type is identified (step 1105) and its resources are evaluated (step 1110).

In step 1115, one or more player loyalty attraction widgets are enabled, according to the machine type and resources. For example, a widget may be enabled that keeps track of player loyalty points that the player would be accumulating if the player were a member of the player loyalty program. Preferably, the widget is visible and the player can see the points accumulating. If the player reaches a level at which the points would be redeemable for a "comp," the player could be informed that the comp would be available if the player joined the player tracking program.

In addition, the player may be prompted occasionally regarding different matters of interest until at least one positive response is obtained. For example, a display device (e.g., a display device normally used for a player loyalty program) and/or a speaker may ask the player, e.g., "Are you interested in a romantic encounter?" or "Are you interested in playing a high-stakes poker game?" It may be preferable to offer services that require some degree of input if the offer is accepted, so that the player has made a time investment and has some additional motivation for enrolling in the player loyalty program.

The widgets are updated (step 1130) until there is some indication that the player wishes to end game play (e.g., a zero credit balance, no activity for a predetermined time, etc.). (Step 1130.) An offer may then be made for the player to enroll in the player loyalty program. (Step 1135.) For example, the player may be encouraged to enroll in the player loyalty program in order to retain the points that already have been earned, e.g., "Congratulations! You are only 55 points from winning a steak dinner at our restaurant! If you join our program now, you can keep all these points and will get 50 bonus points!" Preferably, this is not the only time that an offer is made to enroll in the player loyalty program. For example, the player may be prompted to enroll in the player loyalty program during game play, e.g., when the player has attained, or has nearly attained, enough points for a "comp."

If the player accepts the offer, the player may be enrolled. (Step 1150.) In some implementations, a player may be enrolled by inputting information via a wager gaming machine, a kiosk, etc. Alternatively, a casino worker may be summoned to enroll the player. Data structures are updated accordingly. (Step 1155.) If appropriate, player preference information obtained from the player, whether prior to enrollment or during the enrollment process, is saved and associated with the player loyalty account.

In some implementations of the invention, widgets may be enabled to make offers to a player, e.g., based on the player's game play, wagering, etc., even if the player does not agree to join a player loyalty system. The offers could be for travel (e.g., to another affiliated casino), for seats in a restaurant, seats at a show, etc. For example, a casino may determine that at least some non-member players (e.g., "high rollers") may be presented such offers. In this fashion, a casino may provide a real-time and localized version of a player loyalty system in which players may participate, at least to some degree, without actively joining.

According to the implementation, points accrued during a non-member's gaming session may or may not persist after the gaming session. In implementations wherein the points can persist, a wager gaming machine may be configured to encode point data on a portable medium, such as a "cashout" ticket. Similarly, a wager gaming machine may be configured to read point data from such an encoded medium.

Some implementations of the invention may display widgets to non-members if a predetermined threshold of at least one wager gaming criterion has been attained during wager game play. According to such implementations, non-members of interest may be identified and targeted for marketing, offers (possibly including offers to join a player loyalty program), etc.

Figure 12:
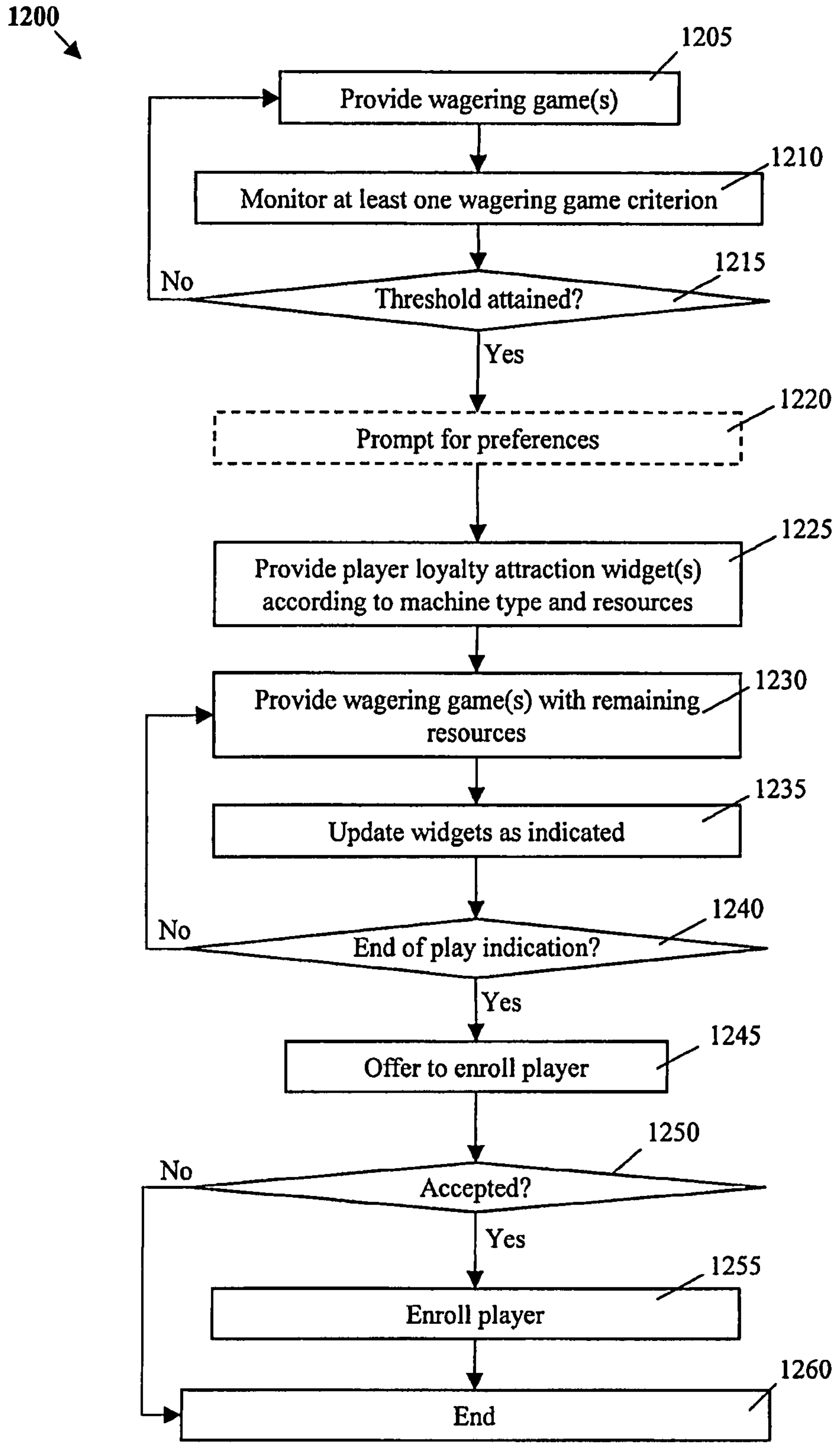
FIG. 12 is a flow chart that outlines other methods of the invention.

Method 1200 of FIG. 12 is one such method. The method begins after some form of wager game initiation, e.g., as described above, when there is no indication that the player is a member of the player loyalty program. While wagering games are provided (step 1205), at least one wager gaming criterion is monitored. (Step 1210.) For example, the amount of credit provided may be monitored, the level of wagering may be monitored, the time of a wager gaming session may be monitored, etc. The monitoring step may be performed in any convenient manner, e.g., by software executing on a wager gaming machine. In some implementations, player loyalty points may be accrued and recorded, although the point totals may or may not be displayed to the player. Some implementations may use player loyalty points as a wager gaming criterion.

In step 1215, it is determined whether a predetermined threshold of at least one wager gaming criterion has been attained. If so, at least one type of player attraction widget will be displayed, preferably with regard to the resources available on the device used for wager gaming. (Step 1225.) For example, a player loyalty point widget may be displayed, indicating the points that the player would have already accrued if the player were a member. As noted above, these points may have been accruing since the beginning of game play, although the point totals may or may have been displayed to the player.

The player may be prompted regarding interests and/or preferences, e.g., as described above with regard to FIG. 11. (Step 1220.) If so, the player may be presented with widgets according to the player's preferences.

The wagering game will be provided (step 1230) and the widget(s) will be updated, as indicated by the type of widget and the implementation details. (Step 1235.) At least when there is an indication that the player desires to end the wager gaming session (and preferably at other times during game play), the player is prompted to join the player loyalty program. (Step 1245.) The player may be offered bonus points, comps and/or other inducements, particularly if the player has been wagering at a high level.

If the player accepts (as determined in step 1250), the player will be enrolled and assigned a player loyalty account. (Step 1255.) If the player has indicated any preferences, these preferences are preferably associated with the player loyalty account and saved.

Some implementations of the invention allow widgets to be selected, customized, etc., via the Internet or another network. For example, a casino representative may browse a website hosted by a game provider such as IGT. The website may provide a series of menus pertaining to the selection and customization of widgets, e.g., for customizing a display relating to an IGT game. Any convenient widget toolkit(s) and/or widget engine(s) may be used to implement the desired functionality, such as Adobe Flash™, Adobe FleX™, XUL™, XUI™, Blackbase AJAX™, etc.

In this manner, provider-specific widgets, e.g., IGT Megajackpot™ widgets, may be created and distributed to casino operators. An operator may be able to have customized advertising widgets, special promotion widgets, etc., created according to a casino's preferences. Widgets created by, or on behalf of, casinos may or may not be customizable according to player preferences. In other words, certain features may be enabled by a casino (or by a game provider such as IGT) in a particular form that is not changeable by a player. However, a player may be able to turn off/deactivate some such widgets, e.g., if the player finds them to be distracting or annoying.

Other implementations of the invention allow a player to indicate widget preference data online and to associate the widget preference data with a player loyalty account. For example, a player may access a website hosted by a casino, log in as a member of a player loyalty program, then select and/or customize widgets.

Figure 13:
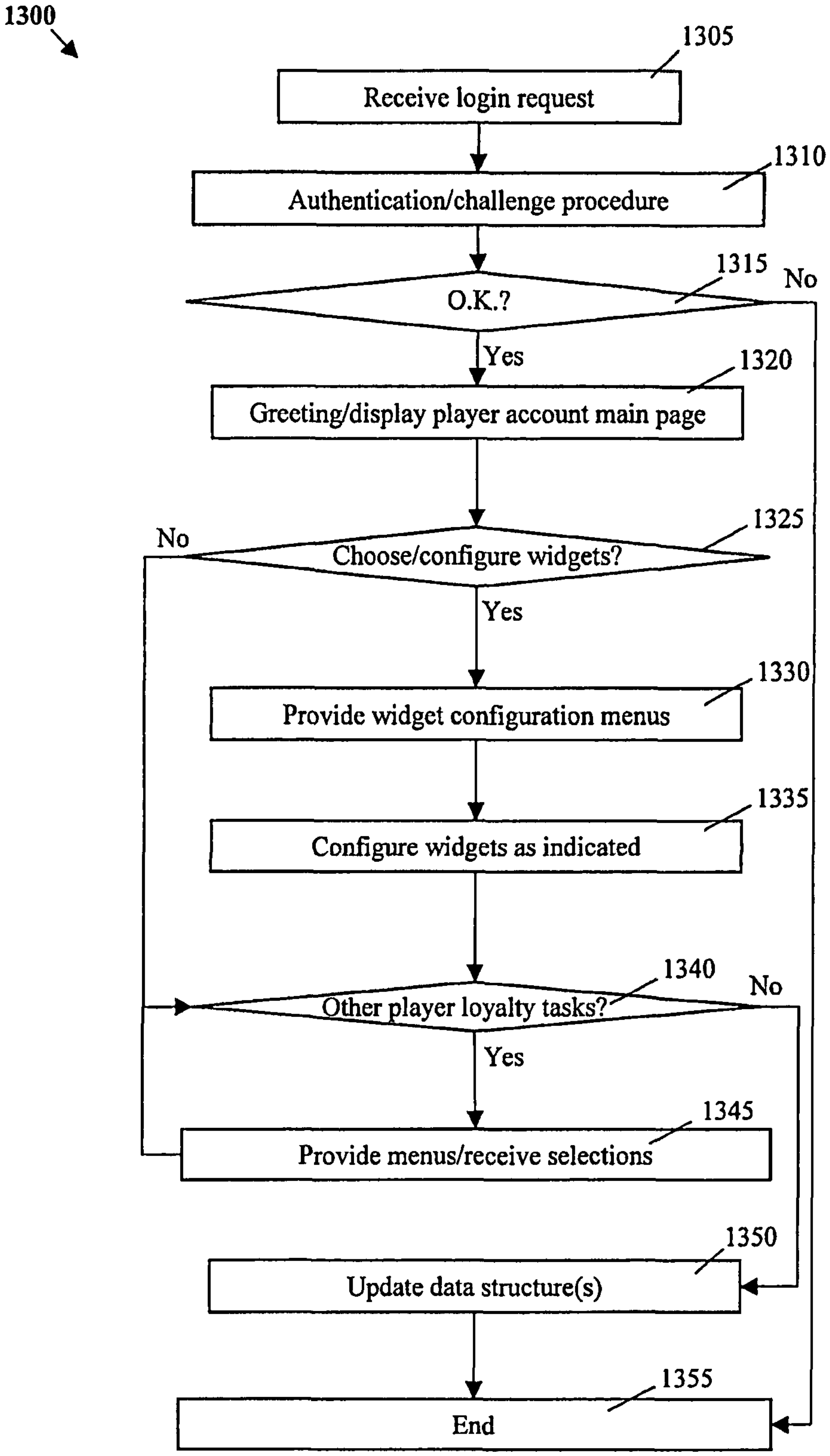
FIG. 13 is a flow chart that outlines yet other methods of the invention.

One such implementation will now be described with reference to FIG. 13. In method 1300, a device associated with a player loyalty program (in this example, a server) receives a player login request. (Step 1305.) In this example, the player has used a laptop computer to access the Internet via a wireless interface. The server requires some form of verification and/or authentication, such as a password. (Step 1310.) If the player provides a satisfactory response, a greeting will be presented and a main page of the player loyalty account will be presented. If the first response is not accepted, the player is preferably given more than one opportunity to provide a satisfactory response before the process ends.

If the player indicates (e.g., by interacting with a menu provided on the main page) a desire to choose and/or configure widgets (step 1325), special widget selection and/or configuration menus may be provided. (Step 1330.) If not, the player may perform other tasks relating to the player loyalty account, e.g., check point totals, apply points to an award of some kind, etc. (Step 1340.)

Figure 15:
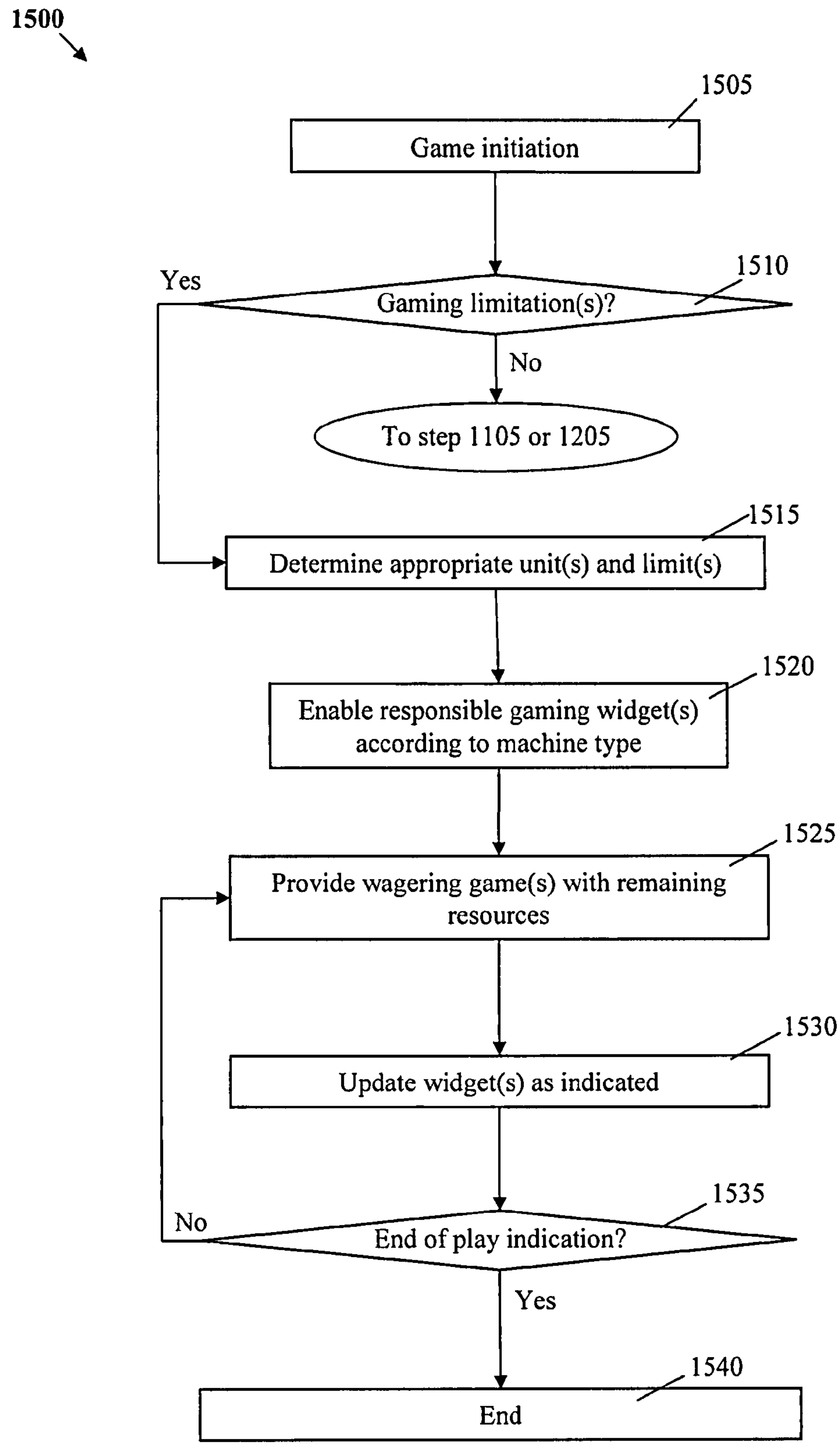
FIG. 15 is a flow chart that outlines still other methods of the invention.

In step 1330, players may be able to select widgets for, e.g., indicating the time/date, weather, etc. Widgets may be available that are specific to wager gaming, e.g., for indicating wins, losses, amount wagered, time elapsed during the gaming session, "helper" widgets for providing wager gaming advice, etc. Some widgets may relate to limits on wagering activities, whether these limits are set by the player (e.g., according to a predetermined budget for wager gaming), set according to jurisdictional limitations, etc. Some "responsible gaming" widgets, described below with reference to FIG. 15, can facilitate compliance with jurisdictional requirements.

A player may be prompted to complete a profile for certain types of widgets, e.g., for sports, dating, wager gaming and/or social interaction widgets. Widgets may also be offered according to demographics, indicated player preferences, known wagering amounts, etc. For example, if a player has selected a particular widget, one or more other widgets of a similar type could be offered. In one such example, a player may receive a prompt such as, "If you like the poker tournament widget, you may also like the high-stakes poker game widget!"

The menus provided in step 1330 may vary according to a player's level in the program. Widgets that pertain to different levels of a player loyalty program may have a different appearance and/or different functionality. For example, there may be a smaller number of widget types and/or widget "skins" available to a "bronze" level player than to a "gold" level player. Widgets for higher-level players may have distinctive skins that are associated with the players' higher status.

Moreover, certain types of information and/or services may be provided by widgets that are available only to higher-level players, e.g., "platinum" level players or the like. For example, some implementations may only allow "high stakes" wager gaming widgets (i.e., widgets for organizing high stakes wager games, such as high-stakes poker games) to be assigned to players with a history of high-level wagering. In some implementations, a player's social interaction widgets may indicate the player's status in the player loyalty program, wager levels, or even income level, if the player chooses to share such information. Many players would choose not to share this information. However, some players may prefer to date and/or socialize with other players who appear to have similar wager gaming habits and/or a similar economic status.

Widgets are selected and/or configured according to the player's indications. (Step 1335.) If a player desires to perform other tasks or obtain other information relating to the player loyalty program, appropriate screens and/or menus are provided. (Step 1345.) When the player has finished, the relevant data are stored and associated with the player's account. (Step 1350.)

As noted elsewhere herein, widgets may or may not be displayed on the same display device used for presenting wagering games, according to the device used, the particular implementation, etc. However, it will sometimes be desirable to present wagering games and widgets on the same display device.

Some such examples will now be described with reference to FIG. 14A. In this example, display 1400 includes ECI area 502, which functions generally as described elsewhere herein, and game interface area 503. Here, news aggregator widget 1405 is displayed in area 502. A player has previously indicated an interest in news relating to science, particularly space exploration and animals. Accordingly, news aggregator widget 1405 has retrieved links to news articles that fall into these categories. The player may display the articles by activating the links indicated in news aggregator widget 1405.

In this example, widgets may be displayed not only in area 502, but also in area 1415. Here, clock widget 1420 and responsible gaming widget 1425 are both active and displayed in area 1415. In this example, a player has set responsible gaming widget 1425 to alert the player if she loses a predetermined amount of money during a gaming session. The predetermined amount of money is $500 in this case. Controls and indicators relating to the game presentation are also displayed in area 1415.

In this example, a player has the option of displaying a subset of all of the player's widgets at any given time. The subset may be, for example, a subset of the player's customized widget set or of a global set of widgets.

Some implementations of the invention allow a player to activate or de-activate widgets during a wager gaming session. For example, if the player is on a diet, he or she may choose to de-activate a widget related to tempting restaurant opportunities, but might still be interested in special offers from a favorite retail establishment, show tickets, etc. Some such implementations provide a "hot button" or the like that allows a player to view other widgets that are not currently active and/or being displayed. Such implementations allow a player to have numerous widgets that may potentially be displayed, without needing to have them clutter the player's display screen(s) at all times.

Figure 14B:
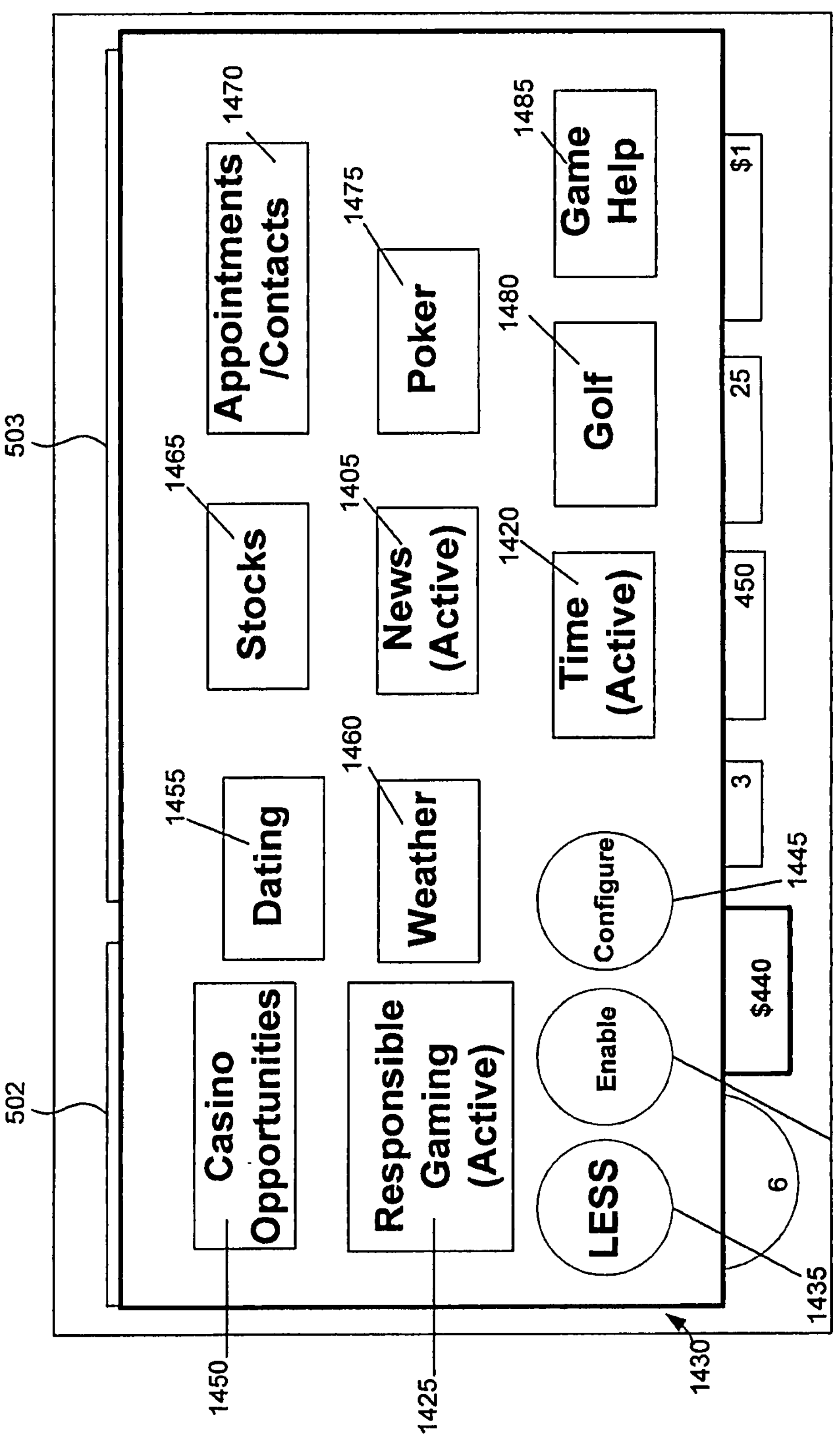

For example, if the player toggles control 1410, the player's other widgets may be displayed, e.g., as shown in FIG. 14B. Here, widget control panel 1450 displays the player's entire selection of widgets. In this example, game interface area 503 is obscured by widget selection panel 1450, but in other implementations game interface area 503 is not obscured.

Here, widget control panel 1450 includes control 1435 for hiding game interface area 503. Widget control panel 1450 also includes enabling control 1440 and configuring control 1445 for enabling and configuring the widgets indicated. Widget control panel 1450 indicates that only news aggregator widget 1405, time widget 1420 and responsible gaming widget 1425 are presently displayed during normal game play.

In this example, the player has previously chosen several other widgets which may be enabled or configured using widget control panel 1450. For example, when casino opportunities widget 1450 is enabled, it will alert the player regarding casino events and opportunities that correspond with the player's indicated preferences, such as wager gaming opportunities, dining opportunities, performance opportunities, etc. Dating widget 1455 has been configured to find potential dates according to the player's profile and to alert the player when such individuals are in the area, have expressed an interest in the player, etc., according to the configuration. Weather widget 1460 can display local weather conditions, road conditions, weather forecasts, etc. Stock widget 1465 can display stock quotes regarding publicly traded companies of interest and, in this example, is configured to display news regarding such companies.

Scheduler widget 1470 may be populated with contact data and may remind a player of scheduled activities. Poker widget 1475 is configured to organize games for the type of poker specified by the player, e.g., as described elsewhere herein. Golf widget 1480 is configured to seek other players who have a similar handicap and alert them and the player when they indicate a desire to play golf. Game help widget 1485 is configured to provide assistance, when enabled, regarding wagering games indicated by the player.

The player may choose to activate, de-activate or reconfigure widgets using widget control panel 1450. For example, the player may decide to reconfigure responsible gaming widget 1425. Responsible gaming widget 1425 may be configured to monitor various metrics, including but not limited to the duration of a wager gaming session, wager amounts, wins, losses, etc. Moreover, responsible gaming widget 1425 may be configured to provide different types of responses when an indicated threshold has been reached or is approaching. For example, responsible gaming widget 1425 may be configured to notify a player when a predetermined threshold is approaching, has been reached, etc. Alternatively, or additionally, responsible gaming widget 1425 may be configured to halt wager gaming on a wager gaming machine when a predetermined threshold has been reached.

For example, if the limit is a time-based limit (as implemented in Australia), a player may be prompted when the time is drawing near, e.g., "Your gaming session will end in 10 minutes." If the limit is a wager amount or a loss amount, the player may be advised of the amount of wagering left, how long the player will be able to play at the current wager rate, etc. For example, the player may be prompted as follows: "At your current wagering rate, it is likely that your gaming session will end in 5 minutes." The widget could issue a warning when, e.g., the time is up or the amount of loss has been attained.

Similarly, responsible gaming widget 1425 may be configured to help a player stay within a wager gaming budget (of time or money) that is established by the player, by the player's family, etc. For example, the widget could be configured to control a display device and/or an audio device to provide warnings when a predetermined limit is approaching, e.g., "You have $200 remaining in your budget for this evening." One implementation of a responsible gaming widget will now be described with reference to FIG. 15. In step 1505, a wager game is initiated. It is then determined (step 1510) whether there are any applicable wager gaming limitations. In this example, the determination may be made, in part, by referencing data associated with a player loyalty account. However, the determination of step 1510 may be made without reference to any player loyalty account. For example, the determination of step 1510 may be made with reference to the requirements of a particular jurisdiction.

If no wager gaming limitations apply, an unrestricted gaming session may take place. The process may, for example, continue to step 1105 or step 1205.

However, if there are any wager gaming limitations, the appropriate limits and units are established (step 1515). In this example, the limit is a $500 loss limit, with no indicated time limit. A responsible gaming widget is then enabled according to the indicated criteria and, preferably, according to the resources available on the gaming device being used. (Step 1520.) Here, the responsible gaming widget is configured to provide a warning when the player has lost $400, another warning when the player has lost $450 and to stop play if and when the player loses $500. Other widgets may be enabled, according to the particular implementation, player preferences and the available resources.

Wagering games are then provided (step 1525) and the widget or widgets are updated according to events and their function. The responsible gaming widget will provide the appropriate warnings if losses reach the levels indicated. The process continues until there is an indication to stop play. Here, the responsible gaming widget may provide an indication to stop a play if the player's losses reach $500. However, as described elsewhere, the process will also end if the player simply decides to stop playing, runs out of money before reaching the limit set by the responsible gaming widget, etc.

Although the foregoing present invention has been described in detail by way of illustration and example for purposes of clarity and understanding, it will be recognized that the above described present invention may be embodied in numerous other specific variations and embodiments without departing from the spirit or essential characteristics of the present invention. Certain changes and modifications may be practiced, and it is understood that the present invention is not to be limited by the foregoing details, but rather is to be defined by the scope of the appended claims.

We claim:

1. A wager gaming machine, comprising:
a video system including at least one display device;
an interface system including at least one interface configured to communicate with at least one remote host, the at least one remote host including at least one content provider;
a credit input mechanism configured to receive indicia of credit;
a credit output mechanism configured to output indicia of credit;
a memory system including a random access memory; and
a logic system configured to communicate, via the interface system, with the at least one remote host to:
execute a first process to output:
(i) a plurality of first video images to the video system, content of the first video images being controlled by the at least one remote host, and
(ii) a first skin to the video system;
receive from the at least one remote host first instruction to enable the first process to output the first video images;
execute a second process to:
(i) generate a game outcome of a wagered on play of a wager-based game, and
(ii) output a plurality of game play video images to the video system, said plurality of game play video images being related to the play of the wager-based game;
execute a third process to:
(i) monitor utilization of at least one wager gaming machine resource by the first process, and
(ii) limit utilization of the at least one wager gaming machine resource by the first process to a first process predetermined level, wherein said limited utilization of the at least one wager gaming machine resource by the first process ensures availability of a second process predetermined level of the at least one wager gaming resource for utilization by the second process to generate the game outcome of the wagered on play of the wager-based game and output the plurality of game play video images; and
separate information into:
(i) a first part including the first instructions that enable the first process to output the plurality of first video images, and
(ii) a second part including a plurality of secure gaming machine transactions including at least one of: at least one transaction related to at least one credit, at least one transaction related to money handling and at least one transaction related to a state of the wager-based game.

2. The wager gaming machine of claim 1, wherein the logic system is configured to select the first process from among a plurality of first processes according to a player preference indication.

3. The wager gaming machine of claim 1, which is associated with a player loyalty system configured to:
obtain player loyalty account information; and
determine player preference data pertaining to the first process and associated with the obtained player loyalty account information.

4. The wager gaming machine of claim 3, wherein player loyalty account information is obtained in association with a player loyalty card reader.

5. The wager gaming machine of claim 3, wherein the player loyalty account information is obtained in association with an input device.

6. The wager gaming machine of claim 1, wherein the plurality of first video images include at least one selected from the group consisting of: at least one stock quote image, at least one sports score image, at least one news image, and at least one weather image.

7. The wager gaming machine of claim 1, wherein the interface system includes at least one interface configured to communicate with a local host and the logic system is configured to:

execute another process to output:

(i) a plurality of second video images to the video system, content of the second video images being controlled by the local host, (ii) a second skin to the video system; and receive from the local host second instructions to enable the other process to output the second video images.

8. The wager gaming machine of claim 7, wherein the second video images include at least one selected from the group consisting of: at least one local tournament image, at least one local restaurant image, at least one local message image, at least one local social event image and at least one local wager gaming event image.

9. The wager gaming machine of claim 7, wherein the second video images includes at least one dating service image.

10. The wager gaming machine of claim 9, wherein the at least one dating service image includes information relating to a person operating another wager gaming machine in a gaming establishment that includes the wager gaming machine.

11. The wager gaming machine of claim 9, wherein the wager-based game is played by a first person in a gaming establishment, the at least one dating service image includes information relating to a second person in a vicinity of the gaming establishment and at least one characteristic of the second person matches those sought by the first person.

12. The wager gaming machine of claim 7, wherein the local host includes a server associated with a gaming establishment.

13. The wager gaming machine of claim 1, wherein for each of $N^{th}$ processes, the logic system is configured to output:

(i) a plurality of $N^{th}$ video images to the video system, content of the $N^{th}$ video images being controlled by the at least one remote host, and (ii) $N^{th}$ skin to the video system.

14. The wager gaming machine of claim 13, wherein the logic system is configured to determine the $N^{th}$ process according to profile data associated with a person.

15. The wager gaming machine of claim 14, wherein the logic system is configured to determine the $N^{th}$ process in association with a player loyalty device.

16. The wager gaming machine of claim 15, wherein the player loyalty device includes a player loyalty card reader.

17. The wager gaming machine of claim 14, wherein the interface system includes at least one interface configured to communicate with a server configured to provide the profile data.

18. The wager gaming machine of claim 1, wherein the at least one wager gaming machine resource is selected from the group consisting of: CPU usage, memory usage, graphics processing usage, network bandwidth usage, sound card usage, video card usage, display device usage, power usage and peripheral device usage.

19. The wager gaming machine of claim 1, which includes an audio system including at least one audio component, wherein the first process includes outputting first audio data via the audio system, content of the first audio data is controlled by the at least one remote host, the first audio data is associated with the first skin and the first instructions enable the first process to output the first audio data.

20. The wager gaming machine of claim 1, wherein the logic system is configured to receive a download of the first instructions while the wager-based game is being played and wherein the received download changes the content of the first video images.

21. The wager gaming machine of claim 1, wherein the logic system is configured to monitor the at least one wager gaming machine resource utilized by the first process and to prevent the first process from utilizing more than a predetermined amount of the at least one wager gaming machine resource.

22. The wager gaming machine of claim 21, where the at least one wager gaming machine resource is selected from the group consisting of: CPU usage, memory usage, graphics processing usage, network bandwidth usage, sound card usage, video card usage, power usage and peripheral device usage.

23. The wager gaming machine of claim 1, wherein the logic system includes at least one processor.

24. The wager gaming machine of claim 1, wherein the logic system is configured to send information to the at least one remote host indicating an amount of the at least one wager gaming machine resource that the first process is enabled to utilize while the game outcome is generated on the wager gaming machine.

25. The wager gaming machine of claim 1, which includes at least one peripheral device selected from the group consisting of: a touch screen sensor, a card reader, a bill validator, a bonus device, a mechanical button, a wireless interface, a ticket reader, a key pad, a radio frequency identification reader, a player loyalty device, an audio device, a display device and a coin acceptor.

26. The wager gaming machine of claim 25, wherein the first process is configured to communicate with the at least one peripheral device.

27. The wager gaming machine of claim 1, which includes a touch screen sensor coupled to a video display of the video system, wherein the first video images include at least one component corresponding to at least one active area of the touch screen sensor.

28. The wager gaming machine of claim 1, wherein the first process and the second process are configured to output video images to a single display device of the video system.

29. The wager gaming machine of claim 28, wherein the first process is configured to display the first video images in a first portion of the single display device and wherein the second process is configured to display the game play video images in a second portion of the single display device.

30. The wager gaming machine of claim 1, wherein the video system includes a first display device and a second display device, wherein the first process is configured to output the first video images to the first display device and wherein the second process is configured to output the game play video images to the second display device.

* * * * *

UNITED STATES PATENT AND TRADEMARK OFFICE

CERTIFICATE OF CORRECTION

PATENT NO. : 9,028,329 B2
APPLICATION NO. : 11/827060
DATED : May 12, 2015
INVENTOR(S) : Jacob Graham et al.

It is certified that error appears in the above-identified patent and that said Letters Patent is hereby corrected as shown below:

IN THE CLAIMS

In Claim 1, Column 108, Line 21, replace “instruction” with --instructions--.
In Claim 7, Column 109, Line 16, after “host,” insert --and--.
In Claim 9, Column 109, Line 28, replace “includes” with --include--.

Signed and Sealed this
Fourteenth Day of June, 2016

Michelle K. Lee
*Director of the United States Patent and Trademark Office*